(12) United States Patent
Akerib

(10) Patent No.: US 6,460,127 B1
(45) Date of Patent: *Oct. 1, 2002

(54) APPARATUS AND METHOD FOR SIGNAL PROCESSING

(75) Inventor: Avidan Akerib, Holon (IL)

(73) Assignee: Neomagic Israel Ltd., Netanya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 09/178,501

(22) Filed: Oct. 26, 1998

Related U.S. Application Data

(60) Continuation of application No. 09/052,164, filed on Mar. 31, 1998, now Pat. No. 5,974,521, which is a division of application No. 08/353,612, filed on Dec. 9, 1994, now Pat. No. 5,809,322.

(30) Foreign Application Priority Data

Dec. 12, 1993 (IL) .................................................. 107996
May 26, 1994 (IL) .................................................. 109801

(51) Int. Cl.[7] .......................... G06F 15/80; G06F 15/82; G06F 13/40
(52) U.S. Cl. .............................. 712/10; 712/11; 712/14; 712/18; 712/19; 711/149; 711/128
(58) Field of Search ............................... 712/11, 19, 42, 712/12, 227, 34, 15, 228, 35, 18, 235, 36, 10, 215, 14, 17, 23, 22, 21, 207, 25, 219, 223, 221, 33, 13, 16, 115, 20; 710/50, 48; 709/104; 711/5, 204, 154, 141, 213, 167–169, 170, 209, 206, 201, 149, 120, 150, 121, 148, 122, 168, 123, 3, 128, 109, 129, 145; 365/49, 50; 706/42, 43, 41, 6

(56) References Cited

U.S. PATENT DOCUMENTS 5,343,559 A * 8/1994 Lee .............................. 711/202
5,579,441 A * 11/1996 Bezek et al. .................. 706/50
5,974,521 A * 10/1999 Akerib ......................... 712/11

* cited by examiner

*Primary Examiner*—Daniel H. Pan
(74) *Attorney, Agent, or Firm*—Mark M. Friedman

(57) ABSTRACT

An associative signal processing apparatus for processing a plurality of samples of an incoming signal in parallel, the apparatus comprising: (a) an array, of processors, each processor including a multiplicity of associative memory cells, the memory cells being operative to perform: (i) compare operations, in parallel, on the plurality of samples of the incoming signal; and (ii) write operations, in parallel, on the plurality of samples of the incoming signal; and (b) an I/O buffer register including a multiplicity of associative memory cells, the register being operative to: (i) input the plurality of samples of the incoming signal to the array of processors in parallel by having the I/O buffer register memory cells perform at least one associative compare operation and the array memory cells perform at least one associative write operation; and (ii) receive, in parallel, a plurality of processed samples from the array of processors by having the array memory cells perform at least one associative compare operation and the I/O buffer register memory cells perform at least one write operation.

33 Claims, 20 Drawing Sheets

| GROUP | IN STATE | OUT STATE | INCREMENT |
|---|---|---|---|
| 1 | $S_0$ | $S_1$ | 0 |
| 1 | $S_1$ | $S_1$ | 1/2 |
| 2 | $\emptyset$ | $S_0$ | 1/2 |
| 3 | $S_0$ | $S_0$ | 1/2 |
| 3 | $S_1$ | $S_0$ | 1 |
| 4 | $\emptyset$ | $S_0$ | 12 |
| 5 | $\emptyset$ | $S_0$ | 6 |

FIG. 16

| mark | temp | fd | d |
|------|------|----|----|

FIG. 17

| MRK | TMP | NEXT | SUM | d | fd |
|-----|-----|------|-----|---|-----|

FIG. 18

| MR | TM | fd | md | dh | dl |
|----|----|----|----|----|-----|

FIG. 20A

| 1 | 1 | 1 |
|---|---|---|
| 1 | 0 | 1 |
| 1 | 1 | 1 |

FIG. 20B

| 0 | 0 | 0 |
|---|---|---|
| 0 | p | 0 |
| 1 | 1 | x |

FIG. 20C

| 0 | 0 | 0 |
|---|---|---|
| 0 | p | 0 |
| x | 1 | 1 |

FIG. 20D

| 0 | 0 | 0 |
|---|---|---|
| 0 | p | 0 |
| 1 | 0 | 1 |

FIG. 20E

| x | 1 | x |
|---|---|---|
| x | p | x |
| x | 1 | x |

FIG. 20F

| x | x | 0 |
|---|---|---|
| x | p | 0 |
| x | x | 0 |

FIG. 20G

| 0 | 0 | 0 |
|---|---|---|
| x | p | x |
| x | x | x |

FIG. 21

| MR | TM | CY | PC | PB | PA | COUNT_P | ROWS | COUNT | TC | TB | TA | DISP | DIR_L | DL | DIR_R | DR |
|----|----|----|----|----|----|---------|------|-------|----|----|----|------|-------|----|-------|-----|

FIG. 22

| TEMP | CY | FLAG | FIELD |
|------|----|----|-------|

FIG. 23

| CY | FLAG | ROWS | FIELD |
|----|------|------|-------|

FIG. 24

| TMP | FLG | FIELD | TAIL |
|-----|-----|-------|------|

FIG. 29

| xy_coord | operand | temp | mark | SF | LT | GT | label | edge |
|----------|---------|------|------|----|----|----|-------|------|

FIG. 34

| S | VL | CL | VN | CN | TM | color |
|---|----|----|----|----|----|-------|

| Flags | | Optical flow Output | | local Averages | | Temporary Accumulators | | Partial Derivatives | | | Input Images | |
|---|---|---|---|---|---|---|---|---|---|---|---|---|
| mr | tm | V | U | Vav | Uav | Ac | Sc | Et | Ey | Ex | En1 | En |
| 1 | 1 | 10 | 10 | 9 | 9 | 19 | 18 | 11 | 11 | 11 | 8 | 8 | a                                      b

APPARATUS AND METHOD FOR SIGNAL PROCESSING

This Application is a Continuation Application of U.S. application Ser. No. 09/052,164, filed Mar. 31, 1998, now U.S. Pat. No. 5,974,521, which is a Divisional Application of U.S. application Ser. No.08/353,612, filed Dec. 9, 1994 now U.S. Pat. No. 5,809,322.

FIELD OF THE INVENTION

The present invention relates to methods and apparatus for signal processing.

BACKGROUND OF THE INVENTION

State of the art computer vision systems and methods and state of the art associative processing methods are described in the following publications, the disclosure of which is hereby incorporated by reference:

C. C. Foster, "Content addressable parallel processors", Van Nostrand Reinhold Co., 1976, chs.2 and 5, S. Ruhman, I. Scherson, "Associative processor for tomographic image reconstruction", Proc. Medcomp 82 (1982 IEEE Comp Soc. Int. Conf. on Medical Comp. Sc./Computational Medicine), pp. 353–358, C. Weems, E. Riseman, A. Hanson, A. Rosenfeld, "IU parallel processing benchmark", Proc. Comp. Vision & Pattern Recogn., pp. 673–688, 1988, I. Scherson, "Multioperand associative processing and application to tomography and computer graphics", Ph.D. Thesis, Computer Science, Weizman Institute of Science, 1983, Canny J., "Computational approach to edge detection", IEEE Trans. on Pattern Analysis and Machine Int., November 1986, pp. 679–698, and Sha'ashua, A. and S. Ullman, "Structural saliency: the detection of global salient structures using a local connected network", Proc. ICCV Conf., pp, 321–327, Florida, 1988, and Akerib, A. J. and Shmil Ruhman, "Associative contour processing", MVP 1990 IAPR Workshop on Machine Vision applications, Nov. 28–30, 1990, Tokyo.

Image processing techniques and other subject matter useful for associative signal processing are described in the following references:

REFERENCES

[1] W. D. Hillis, "*The Connection Machine*", MIT Press, 1985.

[2] C. C. Weems, Jr., "Image Processing on a Content Addressable Array Parallel Processor", Ph.D. Thesis, Computer and Information Sciences, University of Massachusetts at Amherst, 1984.

[3] C. C. Foster, "*Content Addressable Parallel Processors*", Van Nostrand Reinhold Co., 1976, chs. 2 & 5.

[4] S. Ruhman, I. Scherson, "Associative Processor for Tomographic Image Reconstruction", Proc. Medcomp 82 (1982 IEEE Comp. Soc. Int. Conf. on Medical Comp. Sc./Computational Medicine), pp 353–358.

[5] S. Ruhman, I. Scherson, "Feasibility Study of Associative Radar Signal Processing", Internal Report, Weizmann Institute of Science, October 1984.

[6] S. Ruhman, I. Scherson, "Associative Processor Particularly Useful for Tomographic Image Reconstruction", U.S. Pat. No. 4,491,932, filed Oct. 1, 1981, issued Jan. 1, 1985.

[7] C. Weems, E. Riseman, A. Hanson, A. Rosenfeld, "IU Parallel Processing Benchmark", Proc. Comp. Vision & Pattern Recogn. pp 673–688, 1988.

[8] D. C. Marr, E. Hildreth, "Theory of Edge Detection", Proc. R. Soc. London, Vol. B 207, pp 187–217, 1980.

[9] W. E. L. Grimson, "A Computer Implementation of a Theory of Human Stereo Vision", Phil. Trans. Royal Soc. of London, Vol. B 292, pp 217–253, 1981.

[10] B. K. P. Horn, B. G. Schunck, "Determining Optical Flow", Artificial Intelligence Vol. 17, pp 185–203, 1981.

[11] V. Cantoni, C. Guerra and S. Levialdi, "Towards an Evaluation of an Image Processing System". In: Computing Structures for Image Processing, Academic Press, 1983, ch. 4.

[12] M. J. Flynn, "Very high-speed computer systems", Proc. IEEE, Vol. 54, pp 1901–1909, 1966.

[13] B. Lindskog "PICAP, An SIMD architecture for multidimensional signal processing", Dissertation No. 176, Dept. of El. Eng., Linkoping University, Sweden, 1988.

[14] S. S. Wilson, "One dimensional SIMD architectures—the AIS-5000", Multicomputer Vision, Academic Press, pp. 131–149.

[15] D. Juvini, J. L. Basille, H. Essafi, J. Y. Latil, "Sympati 2, a 1.5D processor array for image application", EUSIPCO IV, Theories and applications, North-Holland, pp. 311–314, 1988.

[16] I. N. Robinson and W. R. Moore, "A parallel processor array architecture and its implementation in silicon", Proc. IEEE Custom Integrated Circuit Conf. pp 41–45, 1982.

[17] M. J. B. Duff, "CLIP4: A large scale integrated circuit array parallel processor", Proc. IJCPR, pp. 728–733, 1976.

[18] K. E. Batcher, "Design of a massively parallel processor", IEEE Trans. Comp., Vol. C-29, pp. 836–840, 1980.

[19] S. F. Reddaway, "DAP—A flexible number cruncher", Proc. LASL Workshop on Vector and Parallel Processors, pp. 233–234, 1978.

[20] D. E. Shaw, "The NON-VON supercomputer", Computer Science Dept., Columbia University, New York, N.Y., 1982.

[21] V. Cantoni and S. Levialdi, "PAPIA: A case history,", Parallel Computer Vision, L. Uhr, Ed. New York, N.Y.: Academic Press, 1987, pp. 3–13.

[22] L. I. Hungwen and M. Maresca. "Polymorphic-Torus Architecture for Computer Vision", IEEE Trans. PAMI, Vol. 11, No. 3, 1989.

[23] S. R. Sternberg, "Biomedical image processing", Computer, Vol. 16, pp. 22–35, 1983.

[24] E. W. Kent, M. O. Shneier, and R. Lumia, "PIPE Pipeline image processing engine", Parallel and Distributed Computing, Vol. 2, pp. 50–78, 1985.

[25] Max Video product literature, Datacube Corp., Peabody, Mass., 1987.

[26] T. Gross, H. T. Kung, M. S. Lam, and J. A. Webb, "Warp as a machine for low-level vision", Proc. of the 1985 Int. Conf. on Robotics and Automation, 1985.

[27] W. W. Wilcke, R. C. Booth, D. A. Brown, D. G. Shea, and F. T. Tong, "Design and application of an experimental multiprocessor", IBM RC 12604, 1987.

[28] C. Withby-Strevens, "The Transputer", Proc. 12th ACM Int. Symp. on Computer Architectures, pp. 292–300, 1985.

[29] L. Erman, "The Hearsay-II Speech-Understanding System: integrating knowledge to resolve uncertainty", Computing Surveys Vol. 12, pp. 213–253, 1980.

[30] H. P. Nii, "The blackboard model of problem solving and the evaluation of blackboard architectures", AI Magazine, Vol. 7, No. 2, pp. 38–53, 1986.

[31] B. A. Draper, R. T. Collins, J. Brolio, J. Griffith, A. R. Hanson, and E. M. Riseman, "Tools and experiments in the knowledge-directed interpretation of road scenes", Proc. Image Understanding Workshop, Morgan Kaufmann: Los Altos, Calif., 1987.

[32] NCube Corp, Promotional literature, Beaverton, Oreg., 1985.

[33] C. Fernstrom, I. Kruzela, B. Svensson, "*LUCAS Associative Array Processor*", Springer-Verlag, 1985, ch. 2.

[34] S. Ruhman, I. Scherson, "Associative Memory Cell and Memory Unit Including Same", U.S. Pat. No. 4,404,653, filed Oct. 1, 1981, issued Sep. 13, 1983.

[35] I. Scherson, "Multioperand Associative Processing and Application to Tomography and Computer Graphics", Ph.D. thesis, Computer Sciences, Weizmann Institute of Science, 1983.

[36] J. Worlton, "Some Patterns Technology Change in High-Performance Computers", Proc. Supercomputing, pp 312–320, November 1988.

[37] I. Scherson, S. Ruhman, "Multi-Operand Associative Arithmetic", Proc. 6th Symp. on Computer Arithmetic, Aarhus 1983, pp 124–128.

[38] I. Scherson, S. Ruhman, "Multi-Operand Arithmetic in a Partitioned Associative Architecture", J. of Parallel & Distr. Comp., Vol. 5., pp 655–668, 1988.

[39] D. C. Marr, E. Hildreth, "Theory of Edge Detection", Proc. R. Soc. London, Vol. B 207, pp 187–217, 1980.

[40] John Canny, "Computational Approach to Edge Detection", IEEE Trans. on Pattern Analysis a Machine Int., November 1986, pp. 679–698.

[41] E. R. Davis and A. P. N. Plummer, Thinning Algorithms: A Critique and New Methodology, Pattern Recognition 14: 53–63, 1981.

[42] R. T. Chin, H. K. War, D. L. Stover, and R. D. Iverson, A One-Pass Thinning Algorithm and its Parallel Implementation, Comp. Vision, Graph. &, Image Proc. 40: 30–40, 1987.

[43] W. E. L. Grimson, "A Computer Implementation of a Theory of Human Stereo Vision", Phil. Trans. Royal Soc. of London, Vol. B 292, pp 217–253. 1981.

[44] D. Marr, T. Poggio, "A Computational Theory of Human Stereo Vision", Proc. Royal Soc. London B 204, pp 301–324, 1979.

[45] B. K. P. Horn, B. G. Schunck, Determining Optical Flow, Artificial Intelligence, Vol. 17, pp 185–203, 1981.

[46] Amnon Sha'ashua and Shimon Ullman, "Structural Saliency: The Detection of Global Salient Structures Using a Local Connected Network", Proc. ICCV Conf., pp. 321–327, Florida, 1988.

[47] Amnon Sha'ashua, "Structural Saliency: The detection of globally salient structures using a locally connected network", M.Sc thesis, Dept. of Applied Math., Weizmann Inst. of Science, 1988.

[48] Amnon Sha'ashua, AI Lab., MIT, Private Communication, May 1991.

[49] Duda R. O. and Hart P. E., "Use of the Hough transformation to detect lines and curves in pictures", Comm. ACM Vol. 15, Num. 1, pp. 11–15, January 1972.

[50] O'Gorman, F. and M. B. Clowes "Finding picture edge through collinearity of feature points", Proc. Int. Joint Conf. on Artif. Intel., pp. 543–55, 1973.

[51] A. Rosenfeld, A. C. Kak, "*Digital Picture Processing*", Academic Press, 1982.

[52] Robert Sedgewick, "*Algorithms*", Addison-Veslev, 1988.

[53] Preston, K., "The Abingdon Cross benchmark survey", IEEE Computer 22(7), pp 9–19, 1989.

[54] S. Siegel and S. Waltings, "Max Video's Performance of the Abingdon Cross Bench-Mark, ", Proc. Vision '87, Society of Manufacturing Engineers, Dearborn, Mich., pp 2–17, 1987.

[55] W. B. Teeuw and R. P. W. Duin, "An algorithm for benchmarking an SIMD pyramid with the Abingdon Cross", Pattern Recognition Letters 11, pp 501–506, 1990.

[56] K. Preston Jr., "Benchmark Results—The Abingdon Cross", Evaluation of Multicomputers for Image Processing, L. Uhr et al., eds., Academic Press, Cambridge, Mass., 1986.

[57] A. J. Akerib, S. Ruhman, S. Ullman, "Real Time Associative Vision Machine", Proc. 7th Israel Conf. on Artif. Intel., Vision & Pattern Recog. Elsevier, December 1990.

[58] Avidan J. Akerib and Smil Ruhman, "Associative Contour Processing", MVP'90 IAPR Workshop on Machine Vision Applications, Nov. 28–30, 1990, Tokyo.

[59] Avidan J. Akerib and Smil Ruhman "Associative Array and Tree Algorithms in Stereo Vision", Proc. 8th Israel Conf..on Artif. Intel. Vision & Pattern Recog., Elsevier, December 1991.

All of the above references and publications cited therein are hereby incorporated by reference. Numbers in square brackets in the text are references to the above documents.

SUMMARY OF THE INVENTION

The present invention seeks to provide improved methods and apparatus for signal processing.

The Associative Signal Processing (ASP) approach is now compared to a conventional serial computer's structure which includes a memory and a CPU. The CPU is responsible for computation, while the memory is a simple device which only stores data.

The ASP architecture is totally different. The computation is carried out on an "intelligent memory" while the CPU is replaced by a simple controller that manages this "intelligent" memory. In addition to its capability to read and write, each cell or word in this memory can identify its contents and change it according to instructions received from the controller.

For example, assume an array of a million numbers between 1 and 5. The requirement is to add 3 to the array.

In conventional serial computers, a number is transferred from the addressable memory to the CPU, 3 is then added, and the result is returned to the memory. The process takes 1–3 machine cycles for each specific number, for a total of 1–3 million machine cycles for the whole array.

In the associative approach the one million numbers are stored in the "intelligent memory". The controller has to ask five questions and generate five answers as follows: "Who is 5?" Please identify yourself." This takes one machine cycle. The controller instructs all those who identified themselves, to become "8". The controller continues to ask "Who is 4" and instruct "You are 7!" and so on, until it covers all the combinations.

This operation takes only 10 machine cycles in comparison to 1–3 million machine cycles with conventional serial computers. Using this basic instruction set of read, identify and write, all the arithmetical and logical operations can be performed.

There is thus provided, in accordance with a preferred embodiment of the present invention, associative signal processing apparatus for processing an incoming signal, the apparatus including an array of processors, each processor including a multiplicity of associative memory cells, each sample of an incoming signal being processed by at least one of the processors a register array including at least one register operative to store responders arriving from the processors and to provide communication between processors, and an I/O buffer register for inputting and outputting a signal, wherein the processor array, the register array and the I/O buffer register are arranged on a single module.

There is also provided, in accordance with a preferred embodiment of the present invention, associative signal processing apparatus including an array of processors, each processor including a multiplicity of associative memory cells, at least one of the processors being operative to process a plurality of samples of an incoming signal, a register array including at least one register operative to store responders arriving from the processors and to provide communication between processors, and an I/O buffer register for inputting and outputting a signal.

Further in accordance with a preferred embodiment of the present invention, the processor array, the register array and the I/O buffer register are arranged on a single chip.

Still further in accordance with a preferred embodiment of the present invention, the register array is operative to perform at least one multicell shift operation.

There is also provided, in accordance with a preferred embodiment of the present invention, signal processing apparatus including an array of associative memory words, each word including a processor, each sample of an incoming signal being processed by at least one of the processors, a register array including at least one register operative to provide communication between words and to perform at least one multicell shift operation, and an I/O buffer register for inputting and outputting a signal.

Further in accordance with a preferred embodiment of the present invention, the register array is also operative to perform single cell shift operations.

Still further in accordance with a preferred embodiment of the present invention, the I/O buffer register and the processors are operative in parallel.

Additionally in accordance with a preferred embodiment of the present invention, the word length of the I/O buffer register is increasable by decreasing the wordlength of the associative memory cells.

Further in accordance with a preferred embodiment of the present invention, the apparatus is operative in video real time.

Still further in accordance with a preferred embodiment of the present invention, the signal includes an image.

Further in accordance with a preferred embodiment of the present invention, at least one word in the array of words includes at least one nonassociative memory cell.

Still further in accordance with a preferred embodiment of the present invention, at least one word in the array of words includes at least one column of nonassociative memory cells.

Further in accordance with a preferred embodiment of the present invention, the array, the register array and the I/O buffer register are arranged on a single module.

Still further in accordance with a preferred embodiment of the present invention, the module has a bus which receives instructions and also performs at least one multicell shift operation.

Additionally in accordance with a preferred embodiment of the present-invention, the module has a first bus which performs at least one multicell shift operation and a second bus which performs at least one single cell shift operation.

There is also provided, in accordance with a preferred embodiment of the present invention, an array of processors which communicate by multicell and single cell shift operations, the array including a plurality of processors, a first bus connecting at least a pair of the processors which is operative to perform at least one multicell shift operation, and a second bus connecting at least a pair of the processors which is operative to perform single cell shift operations.

There is additionally provided, in accordance with a preferred embodiment of the present invention, a signal processing method including:

for each consecutive pair of first and second signal characteristics within a sequence of signal characteristics, counting the number of samples having the first signal characteristic, and subsequently, counting the number of samples having the second signal characteristic.

Further in accordance with a preferred embodiment of the present invention, counting includes generating a histogram.

Still further in accordance with a preferred embodiment of the present invention, the signal includes a color image.

Still further in accordance with a preferred embodiment of the present invention, at least one characteristic includes at least one of the following group of characteristics: intensity, noise, and color density.

Further in accordance with a preferred embodiment of the present invention, the method also includes scanning a medium bearing the color image.

Still further in accordance with a preferred embodiment of the present invention, the image includes a color image.

There is also provided, in accordance with a preferred embodiment of the present invention, an edge detection method including identifying a first plurality of edge pixels and a second plurality of candidate edge pixels, identifying, in parallel, all candidate edge pixels which are connected to at least one edge pixel as edge pixels, and repeating the second identifying step at least once.

There is additionally provided, in accordance with a preferred embodiment of the present invention, a signal processing method including storing an indication that a first plurality of first samples has a first characteristic, storing, in parallel for all individual samples which are connected to at least one sample having the first characteristic, an indication that the connected samples have the first characteristic, and repeating the second step at least once.

Further in accordance with a preferred embodiment of the present invention, the signal includes an image and the first characteristic of the first samples is that the first samples are edge pixels.

There is also provided, in accordance with a preferred embodiment of the present invention, a feature labeling method in which a signal is inspected, the signal including at least one feature, the feature including a set of connected samples, the method including storing a plurality of indices for a corresponding plurality of samples, replacing, in parallel for each individual sample from among the plurality of samples, the stored index of the individual sample by an index of a sample connected thereto, if the index of the connected sample is ordered above the index of the individual sample, and repeating the replacing step at least once.

Further in accordance with a preferred embodiment of the present invention, replacing is repeated until only a small number of indices are replaced in each iteration.

Still further in accordance with a preferred embodiment of the present invention, the signal includes an image.

Additionally in accordance with a preferred embodiment of the present invention, the signal includes a color image.

Still further in accordance with a preferred embodiment of the present invention, the samples include pixels, the first characteristic includes at least one color component and adjacency of pixels at least partly determines connectivity of samples.

Additionally in accordance with a preferred embodiment of the present invention, the pixels form an image in which a boundary is defined and repeating is performed until the boundary is reached.

Further in accordance with a preferred embodiment of the present invention, repeating is performed a predetermined number of times.

There is also provided, in accordance with a preferred embodiment of the present invention, a method for image correction including computing a transformation for an output image imaged by a distorting lens, such as an HDTV lens, which compensates for the lens distortion, and applying the transformation in parallel to each of a plurality of pixels in the output image.

There is also provided associative signal processing apparatus including a plurality of comparing memory elements each of which is operative to compare the contents of memory elements other than itself to respective references in accordance with a user-selected logical criterion, thereby to generate a responder if the comparing memory element complies with the criterion, and a register operative to store the responders.

Further in accordance with a preferred embodiment of the present invention, the criterion includes at least one logical operand.

Still further in accordance with a preferred embodiment of the present invention, at least one logical operand includes a reference for at least one memory element other than the comparing memory element itself. For example, a plurality of memory elements may be respectively responsible for a corresponding plurality of pixels forming a color image. The references may include three specific pixel values A, B and C and the user-selected logical criterion may be that an individual pixel have a value of A, OR that its upper right neighbor has a value of B and its lower left neighbor has a value of C.

Further in accordance with a preferred embodiment of the present invention, each memory element includes at least one memory cell.

Still further in accordance with a preferred embodiment of the present invention, the plurality of comparing memory elements are operative in parallel to compare the contents of a memory element other than themselves to an individual reference.

There is also provided, in accordance with a preferred embodiment of the present invention, an associative memory including an array of PEs (processor elements) including a plurality of PE's, wherein each PE includes a processor of variable size, and a word of variable size including an associative memory cell, wherein all of the associative memory cells from among the plurality of associative memory cells included in the plurality of PE's are arranged in the same location within the word and wherein the plurality of words included in the plurality of PE's together form a FIFO.

Further in accordance with a preferred embodiment of the present invention, the word of variable size includes more than one associative memory cell.

There is also provided, in accordance with a preferred embodiment of the present invention, a method for modifying contents of a multiplicity of memory cells and including performing, once, an arithmetic computation on an individual value stored in a plurality of memory cells and storing the result of the arithmetic computation in a plurality of memory cells which contain the individual value.

Further in accordance with a preferred embodiment of the present invention, storing is carried out in all memory cells in parallel.

Also described herein is a chip for multimedia and image processing applications. It is suitable for low-cost, low power consumption, small size and high-performance real-time image processing for consumer applications and high-end powerful image processing for multimedia and communication applications.

The chip is a general purpose, massively parallel processing chip, in which typically 1024 associative processors are crowded onto one chip, enabling the processing of 1024 digital words in one machine cycle of the computer clock.

The chip was designed to allow the performance of a wide range of image processing and multimedia applications in real-time video rate. In comparison, existing general purpose, serial computing chips and digital signal processing chips (DSPs) enable the processing of only 1–16 words in one machine cycle.

The chip's major instruction set is based on four basic commands that enable the performance of all arithmetic and logic instructions. This is another design advantage that allows more than a thousand processors to be crowded onto a single chip.

A single chip typically performs the equivalent of 500–2000 million instructions per second (MIPS). A system based on the chip's architecture can reach multimedia performance of high-end computers at only a small fraction of the price of typical high-end computers.

The chip is based on a modular architecture, and enables easy connection of more than one chip in order to gain high performance (in a linear ratio). Thus, a large number of the chips can be connected in parallel in order to linearly increase overall performance to the level of the most sophisticated supercomputers.

Existing CPU chips and DSPs require a dedicated operating system when more than one chip is connected in parallel. The performance increases in ratio to the square root of the number of chips connected together. Connecting more than two chips requires the architecture of a super-computer.

The chip's architecture allows massively parallel processing in concurrence with data input and output transactions. As an associative processor, each of the 1024 chips has its own internal memory and data path. The chip's data path architecture provides parallel loading of data into the internal processors, thereby eliminating the bottleneck between memory and CPU that can cause severe performance degradation in serial computers.

The chip uses an average of 1 watt to perform the equivalent of 500 MIPS which is 10–25 times better than existing general purpose and DSP chips.

There is also provided in accordance with another preferred embodiment of the present invention associative signal processing apparatus for processing an incoming signal comprising a plurality of samples, the apparatus including a two-dimensional array of processors, each processor including a multiplicity of content addressable memory cells, each sample of an incoming signal being processed by at least one of the processors, and a register array including at least one register operative to store responders arriving from the processors and to provide communication, within a single cycle, between non-adjacent processors.

There is also provided in accordance with another preferred embodiment of the present invention associative signal processing apparatus including an array of processors, each processor including a multiplicity of associative memory cells, at least one of the processors being operative to process a plurality of samples of an incoming signal, a register array including at least one register operative to store responders arriving from the processors and to provide communication between processors, and an I/O buffer register operative to input an incoming signal and to output an outgoing signal.

Further in accordance with a preferred embodiment of the present invention the processor array, the register array and the I/O buffer register are arranged on a single chip.

Still further in accordance with a preferred embodiment of the present invention the register array is operative to perform at least one multicell shift operation.

Additionally in accordance with a preferred embodiment of the present invention the register array is operative to perform at least one multicell shift operation.

There is also provided in accordance with another preferred embodiment of the present invention associative apparatus including a plurality of comparing memory elements each of which is operative to compare the contents of memory elements other than itself to respective references in accordance with a user-selected logical criterion, thereby to generate a responder if the comparing memory element complies with the criterion, and a register operative to store the responders.

Further in accordance with a preferred embodiment of the present invention the criterion includes at least one logical operand.

Still further in accordance with a preferred embodiment of the present invention the I/O buffer register and the processors are operative in parallel.

Additionally in accordance with a preferred embodiment of the present invention the word length of the I/O buffer register is increasable by decreasing the wordlength of the associative memory cells.

Further in accordance with a preferred embodiment of the present invention the apparatus is operative in video real time.

Still further in accordance with a preferred embodiment of the present invention the signal includes an image.

Additionally in accordance with a preferred embodiment of the present invention the at least one logical operand includes a reference for at least one memory element other than the comparing memory element itself.

Moreover in accordance with a preferred embodiment of the present invention each memory element includes at least one memory cell.

Further in accordance with a preferred embodiment of the present invention the plurality of comparing memory elements are operative in parallel to compare the contents of a memory element other than themselves to an individual reference.

There is also provided in accordance with another preferred embodiment of the present invention a method for image correction including computing a transformation for an output image imaged by a distorting lens which compensates for the lens distortion, and applying the transformation in parallel to each of a plurality of pixels in the output image.

Further in accordance with a preferred embodiment of the present invention the distorting lens includes an HDTV lens.

There is also provided in accordance with a preferred embodiment of the present invention an array of processors which communicate by multicell and single cell shift operations, the array including a plurality of processors, a first bus connecting at least a pair of the processors which bus is operative to perform at least one multicell shift operation, and a second bus connecting at least a pair of the processors which bus is operative to perform single cell shift operations.

There is also provided in accordance with another preferred embodiment of the present invention a signal processing method for processing a signal including for each consecutive pair of first and second signal characteristics within a sequence of signal characteristics, counting in parallel the number of samples having the first signal characteristic, and subsequently, counting in parallel the number of samples having the second signal characteristic.

Further in accordance with a preferred embodiment of the present invention the counting includes generating a histogram.

Still further in accordance with a preferred embodiment of the present invention the signal includes a color image.

Additionally in accordance with a preferred embodiment of the present invention at least one characteristic includes at least one of the following group of characteristics: intensity, noise, and color density.

Moreover in accordance with a preferred embodiment of the present invention the method also includes scanning a medium bearing the color image.

Further in accordance with a preferred embodiment of the present invention the image includes a color image.

There is also provided in accordance with another preferred embodiment of the present invention an edge detection method including identifying a first plurality of edge pixels and a second plurality of candidate edge pixels, identifying, in parallel, all candidate edge pixels which are connected to at least one edge pixel as edge pixels, and repeating the identifying in parallel at least once.

There is also provided in accordance with another preferred embodiment of the present invention a feature labeling method in which a signal is inspected, the signal including at least one feature, the feature including a set of connected samples, the method including storing a plurality of indices for a corresponding plurality of samples, in parallel for each individual sample from among the plurality of samples, replacing the stored index of the individual sample by an index of a sample connected thereto, if the index of the connected sample is ordered above the index of the individual sample, and repeating the replacing at least once.

Further in accordance with a preferred embodiment of the present invention the replacing is repeated until only a small number of indices are replaced in each iteration.

Still further in accordance with a preferred embodiment of the present invention the signal includes an image.

Additionally in accordance with a preferred embodiment of the present invention the signal includes a color image.

There is also provided in accordance with another preferred embodiment of the present invention image correction apparatus including a transformation computer operative to compute a transformation for an output image imaged by a distorting lens which transformation compensates for the lens distortion, an in-parallel transformer operative to apply the transformation in parallel to each of a plurality of pixels in the output image.

There is also provided in accordance with another preferred embodiment of the present invention an associative memory including an array of PEs including a plurality of PEs, wherein each PE includes a processor of variable size, and a word of variable size including an associative memory cell, wherein all of the associative memory cells from among the plurality of associative memory cells included in the plurality of PE's are arranged in the same location within the word and wherein the plurality of words included in the plurality of PE's together form a FIFO.

Further in accordance with a preferred embodiment of the present invention the word of variable size includes more than one associative memory cell.

There is also provided in accordance with another preferred embodiment of the present invention a method for modifying contents of a multiplicity of memory cells and including performing, once, an arithmetic computation on an individual value stored in a plurality of memory cells, storing the result of the arithmetic computation in a plurality of memory cells which contain the individual value.

Further in accordance with a preferred embodiment of the present invention the storing is carried out in all memory cells in parallel.

There is also provided in accordance with another preferred embodiment of the present invention a method for constructing associative signal processing apparatus for processing an incoming signal, the method including arranging, on a module, an array of processors, each processor including a multiplicity of associative memory cells, each sample of an incoming signal being processed by at least one of the processors, arranging, on the same module, a register array including at least one register operative to store responders arriving from the processors and to provide communication between processors, and arranging, on the same module, an I/O buffer register for inputting and outputting a signal.

Further in accordance with a preferred embodiment of the present invention at least one sample is processed by two or more of the processors.

Still further in accordance with a preferred embodiment of the present invention at least one of the processors processes more than one sample.

Additionally in accordance with a preferred embodiment of the present invention the register array includes a plurality of registers.

Moreover in accordance with a preferred embodiment of the present invention the order in which the I/O buffer inputs an image differs from the row/column order of the image.

Further in accordance with a preferred embodiment of the present invention the order in which the I/O buffer inputs the samples differs from the order of the samples within the incoming signal.

Still further in accordance with a preferred embodiment of the present invention the register array includes a plurality of registers operative to store responders arriving from the processors.

Additionally in accordance with a preferred embodiment of the present invention the at least one register provides communication between the processors.

Moreover in accordance with a preferred embodiment of the present invention the at least one register provides communication between processors which are processing nonadjacent samples.

Further in accordance with a preferred embodiment of the present invention the apparatus also includes an I/O buffer register operative to input and output a signal.

Still further in accordance with a preferred embodiment of the present invention the processor array, the register array and the I/O buffer register are arranged on a single module.

Additionally in accordance with a preferred embodiment of the present invention the processor array, the register array and the I/O buffer register are arranged on a single silicon die.

Moreover in accordance with a preferred embodiment of the present invention the I/O buffer register includes a plurality of buffer register cells whose number is at least equal to the number of processors in the two-dimensional processor array.

BRIEF DESCRIPTION OF THE DRAWINGS

The present invention will be understood and appreciated from the following detailed description, taken in conjunction with the drawings in which:

FIG. 16 is a simplified block diagram illustrating word format of associative memory within a portion of the apparatus of FIG. 11;

FIG. 17 is a simplified block diagram illustrating another word format of associative memory within a portion of the apparatus of FIG. 11;

FIG. 18 is a simplified block diagram illustrating an additional word format of associative memory within a portion of the apparatus of FIG. 11;

FIGS. 20A–20G are simplified pictorial illustrations of test templates illustrating an implementation of a method of thinning utilizing the apparatus of FIG. 11;

FIG. 21 is a simplified block diagram illustrating an implementation of a method of matching utilizing the apparatus of FIG. 11;

FIG. 22 is a simplified block diagram illustrating still another word format of associative memory within a portion of the apparatus of FIG. 11;

FIG. 23 is a simplified block diagram illustrating an additional word format of associative memory within a portion of the apparatus of FIG. 11;

FIG. 24 is a simplified block diagram illustrating another word format of associative memory within a portion of the apparatus of FIG. 11;

FIG. 29 is a simplified block diagram illustrating another word format of associative memory within a portion of the apparatus of FIG. 11;

FIG. 34 is a simplified block diagram illustrating a method for processing an associative Voronoi diagram utilizing the apparatus of FIG. 11;

Attached herewith are the following appendices which aid in the understanding and appreciation of one preferred embodiment of the invention shown and described herein:

Appendix A is a description of preferred. methods and systems for associative signal processing;

Appendix B is a listing of a preferred associative signal processing method for generating a histogram;

Appendix C is a listing of a preferred associative signal processing method for 1D convolution;

Appendix D is a listing of a preferred associative signal processing method for a low pass filter application of 2D convolution;

Appendix E is a listing of a preferred associative signal processing method for a Laplacian filter application of 2D convolution;

Appendix F is a listing of a preferred associative signal processing method for a Sobel filter application of 2D convolution;

Appendix G is a listing of a preferred associative signal processing method for curve propagation;

Appendix H is a listing of a preferred associative signal processing method for optical flow;

Appendix I is a listing of a preferred associative signal processing method for performing an RGB to YUV transformation;

Appendix J is a listing of a preferred associative signal processing method for corner and line detection;

Appendix K is a listing of a preferred associative signal processing method for contour labeling;

Appendix L is a listing of a preferred associative signal processing method for saliency networking;

Appendix M is a listing of a preferred associative signal processing method for performing a Hough transform on a signal which is configured as a line;

Appendix N is a listing of a preferred associative signal processing method for performing a Hough transform on a signal which is configured as a circle;

Appendix O is a listing of a preferred associative signal processing method for generating a Voronoi diagram signal; and Appendix P is a listing of a subroutine called "sub.rtn" which is called in each of the listings of Appendices B–O.

DETAILED DESCRIPTION OF PREFERRED EMBODIMENTS

Figure 1:
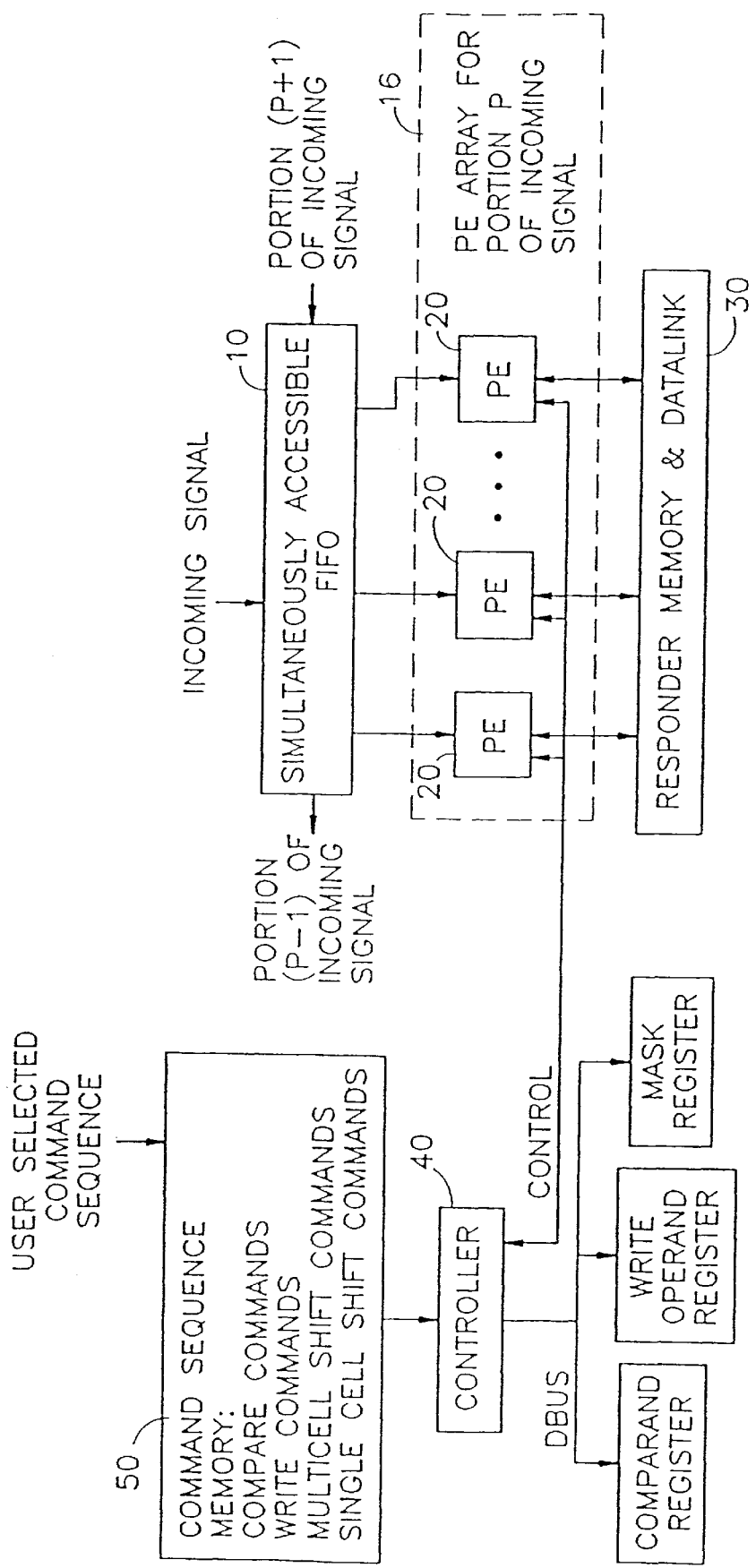
FIG. 1 is a simplified functional block diagram of associative signal processing apparatus constructed and operative in accordance with a preferred embodiment of the present invention.

Reference is now made to FIG. 1 which is a simplified functional block diagram of associative signal processing apparatus constructed and operative in accordance with a preferred embodiment of the present invention.

The apparatus of FIG. 1 includes a simultaneously accessible FIFO 10, or, more generally, any simultaneously accessible memory, which stores at least a portion of an incoming signal which arrives over a bus termed herein the DBUS. The simultaneously accessible FIFO 10 feeds onto a PE (processor element) array 16 including a plurality of PE's 20 which feed onto a datalink 30 which preferably also serves as a responder memory. Alternatively, a separate responder memory may be provided.

Each PE includes at least one associative memory cell, more typically a plurality of associative memory cells such as, for example, 72 associative memory cells. Each PE 20 stores and processes a subportion of the image, such that the subportions stored and processed by all of the PE's 20 forms the portion of the incoming signal stored at a single time in the simultaneously accessible FIFO 10.

For example, there may be 1024 PE's 20. If the processing task is simple enough to allow each PE to process 2 pixels at a time, then the FIFO may, at a single time, store a block of 2048 pixels within the color image. If the processing task is so complex that two PEs are required to process each pixel, then the FIFO may, at a single time, store a smaller block of only 512 pixels within the color image.

The PE's 20 are controlled by a controller 40 which is typically connected in parallel to all the PE's.

Figure 2:
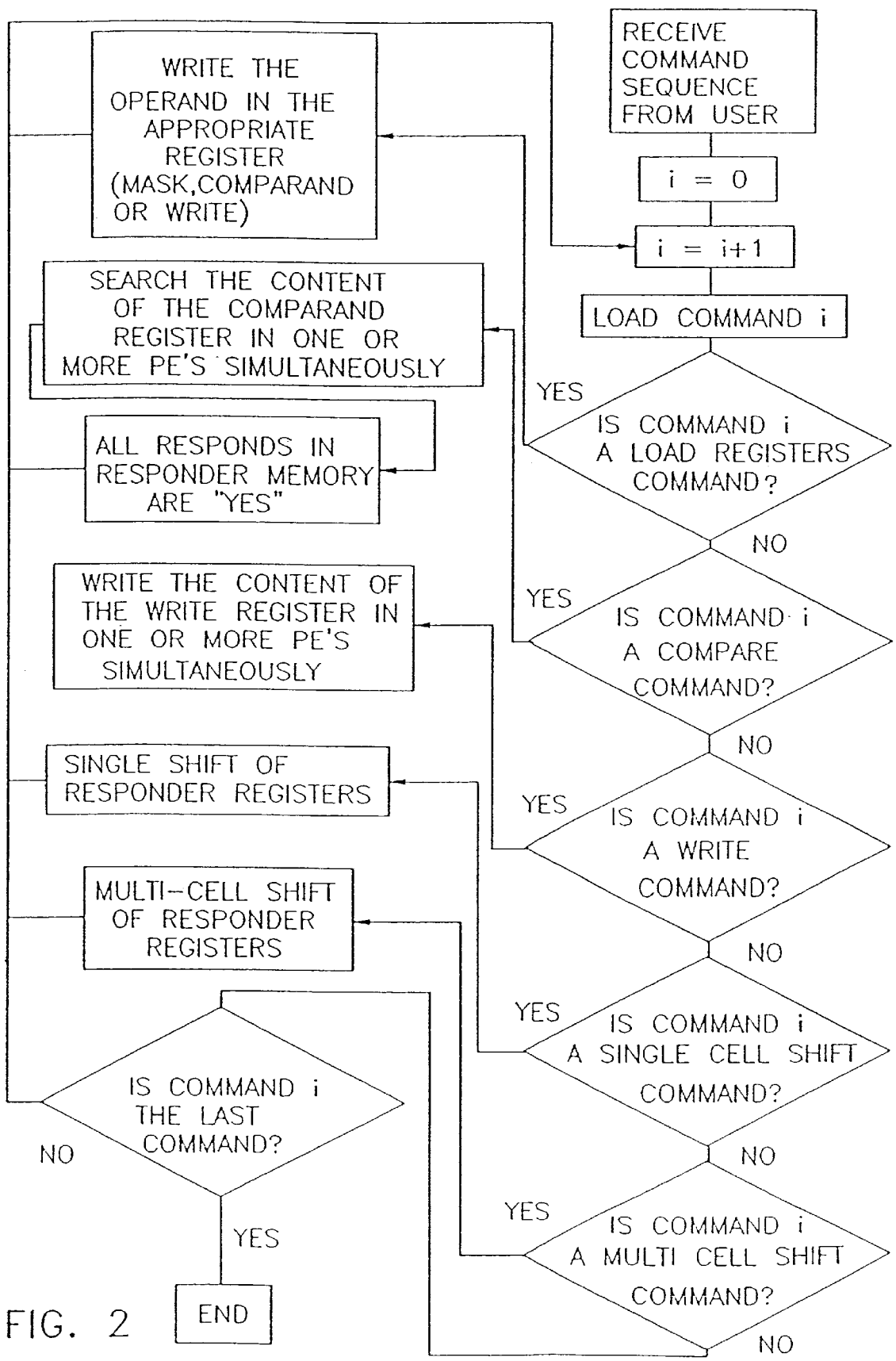
FIG. 2 is a simplified flowchart of a preferred method for employing the apparatus of FIG. 1.

Reference is also made to FIG. 2 which is a simplified flowchart of a preferred method for employing the apparatus of FIG. 1. The first step of the method of FIG. 2 is step 54. In step 54, the system receives a user selected command sequence which is to be processed for each pixel of a current block of the color image. The command sequence is stored in command sequence memory 50. Typically, a command sequence comprises commands of some or all of the following types:

a. Compare—Each of one or more PE's compares its contents to a comparand and generates an output indicating whether or not its contents is equivalent to the comparand.

b. Write—Each of one or more PE's if its own contents and/or the contents of other PE's in its vicinity comply with a logical criterion preceding the write command, changes its contents in accordance with a provided writing operand.

c. Single cell shift—The contents of each of one or more PE's shifts, via the datalink 30, into respectively adjacent one or more PE's.

d. Multicell shift—The contents of each of one or more PE's shifts, via the datalink 30, directly into respectively non-adjacent one or more PE's.

Also in step 54, the first block of the incoming signal is received by simultaneously accessible FIFO 10.

The command sequence is then processed, command by command, as shown in FIG. 2.

Figure 3:
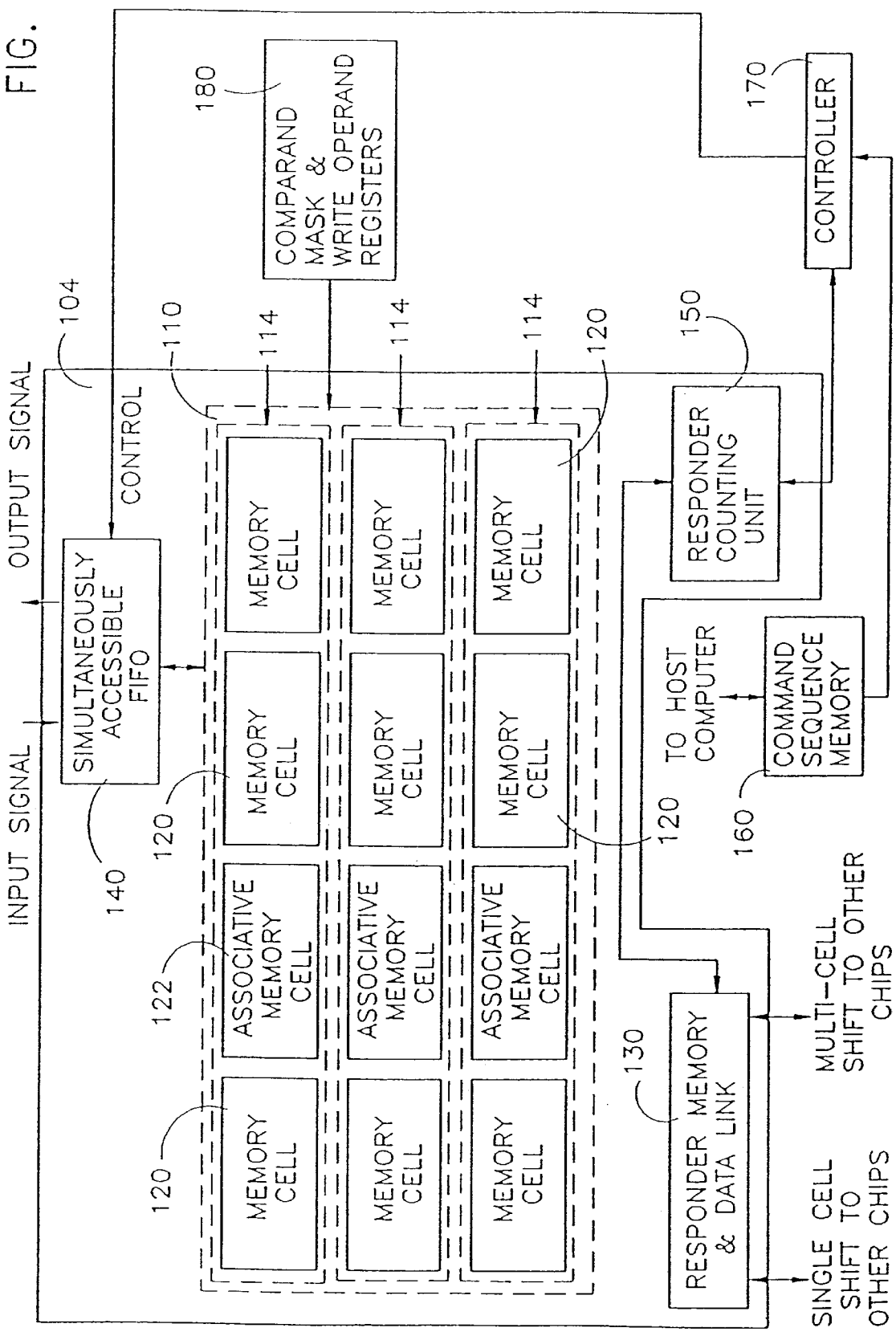
FIG. 3 is a simplified block diagram of associative signal processing apparatus for processing an incoming signal which is constructed and operative in accordance with a preferred embodiment of the present invention.

Reference is now made to FIG. 3 which is a simplified block diagram of associative signal processing apparatus for processing an incoming signal which is constructed and operative in accordance with a preferred embodiment of the present invention. The signal processing apparatus of FIG. 3 includes the following elements, all of which are arranged on a single module 104 such as a single chip:

a. An array 110 of processors or PE's 114, of which, for simplicity, three are shown. Each processor 114 includes a multiplicity of memory cells 120, of which, for simplicity, four are shown. From among each multiplicity of memory cells 120, at least one memory cell (exactly one, in the illustrated embodiment) is an associative memory cell 122. The associative memory cell or cells 122 of each processor are all arranged in the same location or locations within their respective processors, as shown. As an example, there may be 1K processors 114 each including 72 memory cells 120, all of which are associative.

Preferably, at least one of the processors is operative to process more than one sample of an incoming signal.

b. A responder memory 130 including one or more registers which are operative to store responders arriving from the processors 120 and, preferably, to serve as a datalink therebetween. Alternatively, a separate datalink between the processors may be provided. Preferably, the datalink function of memory 130 allows at least one multicell shift operation, such as a 16-cell per cycle shift operation, to be performed. The datalink function of memory 130 also preferably performs single cell shift operations in which a shift from one cell to a neighboring cell or from one PE to a neighboring PE is performed in each cycle.

c. A simultaneously accessible FIFO 140, or, more generally a simultaneously accessible memory, which inputs and outputs a signal.

d. A responder counting unit 150 which is operative to count the number of "YES" responders in responder memory 130.

e. Comparand, mask and write operand registers 180, as described above with reference to FIG. 1.

A command sequence memory 160, which may be similar to the command sequence memory 50 of FIG. 1, and a controller 170 are typically external to the module 104. The controller 170 is operative to control the command sequence memory 160.

Preferred methods for associative signal processing are now described, including:

a. Low level associative signal processing methods—histogram generation, 1D and 2D convolution, curve propagation, optical flow, and transformations between color spaces such as RGB to YUV transformations; and b. Mid-level associative signal processing methods—corner and line detection; contour labeling, saliency networking, Hough transform, and geometric tasks such as convex hull generation and Voronoi diagram generation.

Each of the above associative signal processing methods are now described.

Histogram Generation

A preferred histogram generation method is now described with reference to Appendix B which is a listing of one software implementation of a histogram generation method. The method of Appendix B includes a very short loop repeated for each gray level. A COMPARE instruction tags all the pixels of that level and a COUNTAG tallies them up. The count is automatically available at the controller, which accumulates the histogram in an external buffer.

Convolution

Low level vision, particularly edge-detection, involves the application of various filters to the image, which are most conveniently executed by convolution. The image may be considered as a simple vector of length N×M or as a concatenation of N row vectors, each of length M. Convolution of an N-element data vector by a P-element filter results in a vector of length N+P−1, but only the central N−P+1 elements, representing the area of full overlap between the two vectors, are typically of interest.

The convolution filter vector [f], of length P and precision 8, is applied as an operand by the controller, one element at a time. The result may, for example, be accumulated in a field [fd] of length 8+8+log 2(P). A "temp" bit is used for temporary storage of the carry that propagates through field [fd]. A "mark" bit serves to identify the area of complete overlap by the filter vector.

An example of a row convolution method is provided in Appendix C.

An example of a 2D convolution method which implements a low pass filter is provided in Appendix D.

An example of a 2D convolution method which implements a Laplacian filter is given in Appendix E.

An example of a 2D convolution method which implements the Sobel method of edge detection is given in Appendix F.

Curve Pronagation

Curve propagation is useful in that it eliminates weak edges due to noise, but continues to trace strong edges as they weaken. On the basis of signal statistics and an estimate of noise in the image, two thresholds on gradient magnitude may be computed—"low" and "high". Edge candidates with gradient magnitude under "low" are eliminated, while those above "high" are considered edges. Candidates with values between "low" and "high" are considered edges if they can be connected to a pixel above "high" through a chain of pixels above "low". All other candidates in this interval are eliminated.

The process involves propagation along curves. Associative implementation, a method for which is set forth in detail in Appendix G, uses three flags:

i. "E", which initially marks candidates above "high" threshold (unambiguous edge points), and eventually designates all selected edge points;
ii. "OE" (Old Edges)—to keep track of confirmed edges at the last iteration; and
iii. "L" to designate candidates above "low".

At every iteration, each "L" candidate is examined to see if at least one of its 8-neighbors is an edge, in which case it is also declared an edge by setting "E". Before moving "E" into "OE", the two flags are compared to see if steady state has been reached, in which case the process terminates.

Optical Flow

Optical flow assigns to every point in the image a velocity vector which describes its motion across the visual field. The potential applications of optical flow include the areas of target tracking, target identification, moving image compression, autonomous robots and related areas. The theory of computing optical flow is typically based on two constraints: the brightness of a particular point in the image remains constant, and the flow of brightness patterns varies smoothly almost everywhere.

Horn & Schunck derived an iterative process to solve the constrained minimization problem. The flow velocity has two components (u,v). At each iteration, a new set of velocities [u(n+1),v(n+1)] can be estimated from the average of the previous velocity estimates. A method for implementing the Horn and Schunk method associatively is given.in Appendix H.

Color Space Transformation

One of the major task in color image processing is to transform the 24 bit space of the conventional Red (R), Green (G) and Blue (B) color components, to another space such as a (Y,U,V) space which is more suited for color image compression. A preferred associative method for color space transformation is set forth in Appendix I.

Detection of Corners and Line Direction

An important feature for middle and higher level processing is the ability to distinguish corners and line direction. In Canny edge detection, line orientation is generated during the process. On the other hand, the M&H algorithm is not directional, and the edge bit-map it produces must be further processed to detect line orientation. According to a preferred embodiment of the present invention, an edge bit-map of a 9×9 neighborhood around each pixel is used to distinguish segment direction. The resulting method can typically discriminate 120 different lines and corners. A program listing of this method is set forth as Appendix J.

Contour Tracing and Labeling

A preparation step labels each contour point with its x,y coordinates. The process is generally iterative and operates on a 3×3 neighborhood of all contour points in parallel. Every contour point looks at each one of its 8 neighbors in turn and adopts the neighbor's label if smaller than its own. The circular sequence in which neighbors are handled appreciably enhances label propagation.

Iteration stops when all labels remain unchanged, leaving each contour identified by its lowest coordinates. The point of lowest coordinates in each contour is the only one to retain its original label. The lowest coordinate points have been kept track of and are now counted to obtain the number of contours in the image. A preferred associative method for performing this method is set forth in Appendix K.

Associative Saliency Networking

Salient structures in an image can be perceived at a glance without the need for an organized search or prior knowledge about their shape. Such a structure may stand out even when embedded in a cluttered background or when its elements are fragmented. Sha'ashua & Ullman have proposed a global saliency measure for curves based on their length, continuity and smoothness.

The image is considered as a network of N×N grid points, with d orientation elements segments or gaps coming into each point from its neighbors, and as many going out to its neighbors. A curve of length L in this image is a connected sequence of orientation elements p(i),p(i+1), . . . ,p(i+L), each element representing a line-segment or a gap in the image. An associative implementation of this method is set forth in Appendix L.

Hough Transform

The Hough transform detects a curve whose shape is described by a parametric equation, such as a straight line or a conic section, even if there are gaps in the curve. Each point of the figure in image space is transformed to a locus in parameter space. After splitting the parameters into suitable ranges, a histogram is generated giving the distribution of locus points in parameter space. Occurrence of the object curve is marked by a distinct peak in the histogram (intersection of many loci).

In the case of a straight line the normal parameterization may be used and given by: X cos(A)+Y sin(A)=R which specifies the line by R and the angle A, and the histogram includes a straight line in every direction of A. But if the candidate points are the result of edge detection by a method that yields direction, then the angle A is known. An associative implementation of this method is set forth in Appendix M.

Example: The major steps required to perform a Hough transform operation for a sample image of 256×256 pixels are now described: The 256×256 image with the origin at its center is arranged linearly pixel after pixel and row after row in multiple chips, each in one processor. For example, if the chip includes 1K processors, 64 chips may be used to hold the 256×256=64K. The x-y coordinates are given by 8 bits in absolute value and sign. Angle A from 0 to pi (3.1415 . . . ) is given to a matching precision of 10 bits (excluding sign of gradient). The sine and cosine are evaluated by table look-up. Preferably, the table size is recued four-fold to take into account the symmetry of these functions. After comparing A, the histogram is evaluated and read-out element by element using a "countag" command.

Example: A circle with given radius R and center x0,y0 is to be detected. The direction of the gradient is employed to simplify the process. dy/dx=−(x−x0)/(y−y0)=tan(T−pi/2), by differentiation, where T is the gradient direction. Solving for x0 and y0:

$$x0=x+/-R \sin(T-pi/2);$$

and $$y0=y+/-R \cos(T-pi/2).$$

A histogram is generated for x0,y0. An associative implementation of a preferred Hough transform is set forth in Appendix N.

Voronoi Diagram

This type of diagram is useful for proximity analysis. Starting with a given set of L points in the plane, P(i), i=1, 2, . . . , L, the Voronoi diagram surrounds each point P(i) by a region, R(i), such that every point in R(i) is closer to P(i) than to any other point in the set, P(j),j=1,2, . . . L and i not equal to j. The boundaries of all these regions, R(i), constitute the Voronoi diagram.

An associative method based on the "brush fire" technique is presented in Appendix O. Each of the given points acts as a source of "fire" that spreads uniformly in all directions. The boundaries consist of those points at which fires from two (or three) sources meet. Every point in the given set is initially marked with a different color, such as its own xy-coordinates. Each point in the image looks at its 8-neighbors. A blank (uncolored) the point that sees a colored neighbor will copy its color. If both are colored, the point will compare colors, marking itself as a Voronoi (boundary) point if the colors are different. This process is iterated until all points are colored.

The following are basic associative signal processing steps which are frequently used in the methods of Appendices B to O. Any of the steps categorized as Group 1 may be carried out in parallel with any of the steps from Group 3. Also, any of the steps from Group 1, any of the steps from Group 2 and any of the steps from Group 4 may be carried out in parallel.

| Step Number | Step (abbreviation) | Step (full description) |
|---|---|---|
| | | Group 1 |
| 1 | LETM | Load mask register |
| 2 | LETC | Load comparand register |
| 3 | LETMC | Load mask and comparand |
| 4 | LMCC | Load mask clear comparand |
| 5 | LMCCXX | Load mask clear comparand exclusive |
| 6 | LCSM | Load comparand set mask |
| 7 | LMX | Load mask exclusive |
| 8 | LCX | Load comparand exclusive |
| 9 | LMSC | Load mask set comparand |
| 10 | SMX | Set mask exclusive |
| 11 | SCX | Set comparand exclusive |
| | | Group 2 |
| 12 | SETAG | Set all responders to "1" (yes) |
| | | Group 3 |
| 13 | SHUP | Single cell shift up |
| 14 | SHDN | Single cell shift down |
| 15 | LGUP | Multiple cell shift up |
| 16 | SHUP | Multiple cell shift down |
| | | Group 4 |
| 17 | COMPARE | Search for a specific value |
| 18 | WRITE | Write a value to one or more processors simultaneously |
| | | Group 5 |
| 19 | READ | Read data from one processor |
| 20 | COUNTAG | Count all responders |
| 21 | FIRSEL | Mark the first responder |
| 22 | CONFIGURE FIFO | Select I/O bit/s for FIFO |
| 23 | NOP | No operation |

To employ any of the methods described in any of Appendixes B to O, the listings of Appendices B to O may be run on any language compiler such as the Borland "C++" compiler, using CLASS function.

As already described, each of the methods of Appendices B to O includes the following steps:
a. a basic memory size defining step;
b. a basic associative word length defining step; c. step in which the subroutine of Appendix P is called; and
d. steps which are specific to the individual application. is appreciated that the particular embodiment described in the Appendices is intended only to provide an extremely detailed disclosure of the present invention and is not intended to be limiting.

One implementation of an associative signal processing chip is now described. The implementation is termed herein ASP 100.

1. Introduction

The ASP100 is an associative processing chip. It is intended to serve as part of the Vision Associative Computer, most likely in an array of multiple ASP100 chips.

The ASP100 consists of an associative memory array of 1K×72 bits, peripheral circuitry, image FIFO I/O buffer, and control logic.

2. Modes of Operation

The ASP100 can be operated as a single chip (Single Chip Mode) or as part of an array of ASP100 chips (Array Mode).

2.1 Single Chip Mode

Figure 4:
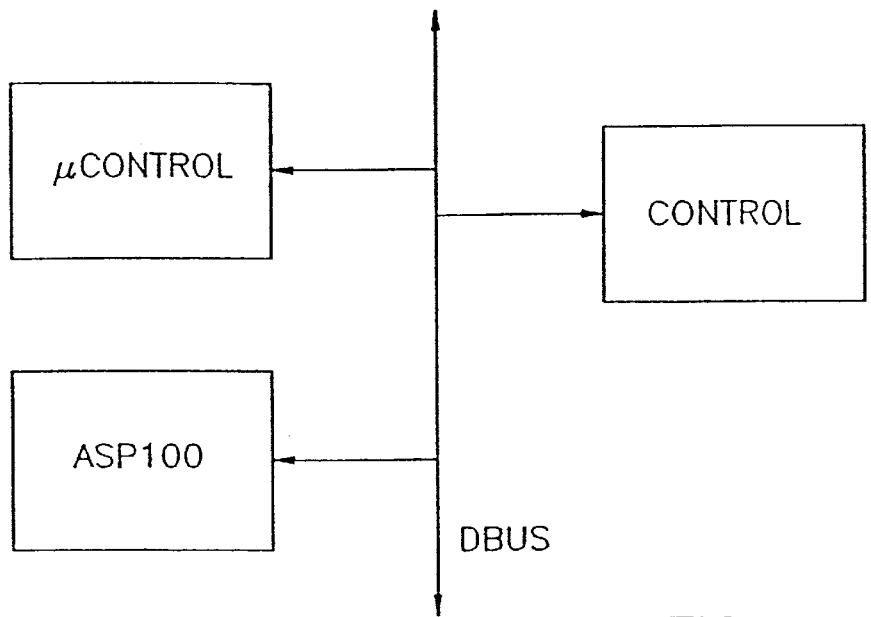
FIG. 4 is simplified block diagram of a preferred implementation of the apparatus of FIG. 1.

The Single Chip Mode is shown in FIG. 4. In this mode a single ASP100 is operated in conjunction with a controller.

2.2 Array Mode

Figure 5:
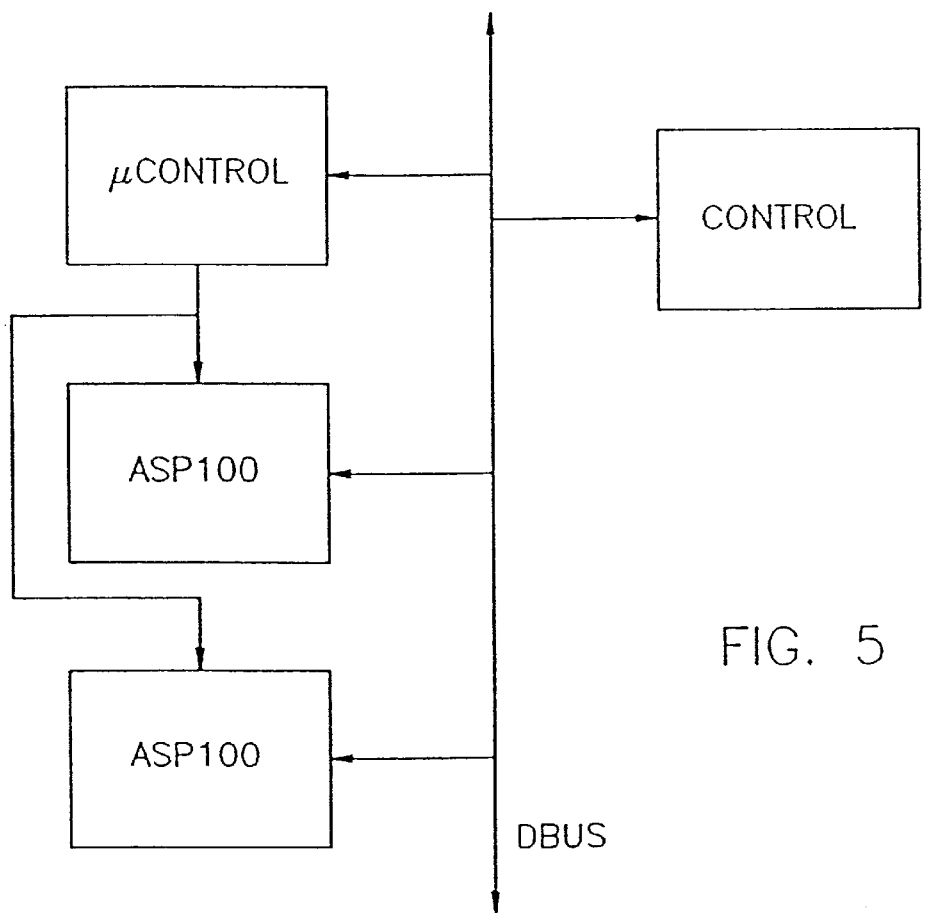
FIG. 5 is a simplified block diagram of an alternative preferred implementation of the apparatus of FIG. 1.

The Array mode is shown in FIG. 5. An array of ASP100 chips are interconnected in parallel, constituting a linear array. A single controller chip, or a suitable circuit, controls the array.

3. Pinout 3.1 Basic Pinout

The ASP100 may be packaged in a 160 pin PQFP package. All output and I/O pins are 3-state, and can be disabled by CS. Following is the complete list of pins:

| Pin Name | Description | I/O | # pins |
|---|---|---|---|
| DBUS[0:31] | Data bus. serves shifts and read | I/O | 32 |
| VIN[0:23] | Video In Bus | I | 24 |
| VOUT[0:23] | Video Out Bus | O | 24 |
| NORTH | Data shift north | I/O | 1 |
| SOUTH | Data shift south | I/O | 1 |
| CTAG | Count Tag Serial Output | O | 1 |
| CTAGVAL | CTAG Valid | O | 1 |
| RSP | RSP (response exists) | O | 1 |
| RESET | Active low Asynchronous Reset | I | 1 |
| CLKIN | Fast Clock (50 MHz) | I | 1 |
| DCLKIN | Clock Sync (25 MHz) | I | 1 |
| RSTFIFO | Reset FIFO Address Generator | I | 1 |
| FINIT | FIFO Init - start FIFO I/O | I | 1 |
| FFUL | FIFO Full (Image I/O Completed for the chip) | O | 1 |
| FIRSTIN | Input to First - select chain | I | 1 |
| VDD[0:15] | Vdd | Vdd | 16 |
| GND[0:15] | Ground | Gnd | 16 |
| CS | Chip Select (enables 3 - state outputs) | I | 1 |
| - - - The following Control Signals Originate in the Microcontroller - - - | | | |
| LIN | Shift input from Low side | I | 1 |
| HIN | Shift input from High side | I | 1 |
| WE | Write Enable | I | 1 |
| LDM | Load Mask | I | 1 |
| LDC | Load Comparand | I | 1 |
| RSTM | Reset Mask | I | 1 |
| RSTC | Reset Comparand | I | 1 |
| SETM | Set Mask | I | 1 |
| SETC | Set Comparand | I | 1 |
| EXM | Exclusive Load Mask (together with LDM) or Set Mask (together with SETM) | I | 1 |
| EXC | Exclusive Load Comparand (together with LDC) or Set Comparand (together with SETC) | I | 1 |
| LDFC | Load FIFO Configuration | I | 1 |
| SCT[1:0] | Sector Number | I | 2 |
| SETAG | Set Tag | I | 1 |
| MUX[0:2] | Select input to TAG | I | 3 |
| CNTINIT | Initialize Response Counter | I | 1 |
| RSTADDR | Reset Address Generator of Response Counter | I | 1 |
| CMP | Compare: Precharge Match Lines | I | 1 |
| CVA | Bit line is Constant (equal to CBA) (on CVA = 0) or Variable from Comparand (CVA = 1) | I | 1 |

-continued

| Pin Name | Description | I/O | # pins |
| --- | --- | --- | --- |
| CBA | Bit lines and Inverse Bit lines are precharged for Read (CBA = 1) or discharged for Compare (CBA = 0) (active when CVA = 0) | I | 1 |
| RDA | Bit lines float (RDA = 0) | I | 1 |
| LDOR | Load Output Register (end of Read) | I | 1 |
| SELRS | Select Rd or Shift - controls I/O mux connecting to DBUS | I | 1 |
| PRSP | Precharge RSP line I    1 | I | 1 |
| FIRCNTEN | Connects tag to first-sel and count-tag circuits | I | 1 |
| FENB | Enable FIFO I/O | | 1 |
| total # of pins | | | 150. |

3.2 Test Point

The following is a list of the pins which serve as test points. They can be ignore while packing the production version:

| Pin Name | Description | # pins |
| --- | --- | --- |
| ML01 | Analog precharged Match line 0, section 1 | 1 |
| ML02 | Analog precharged Match line 0, section 2 | 1 |
| ML03 | Analog precharged Match line 0, section 3 | 1 |
| BL01 | Analog precharged Bit line 0 ("rightmost"), section 1 | 1 |
| BL02 | Analog precharged Bit line 0 ("rightmost"), section 2 | 1 |
| BL03 | Analog precharged Bit line 0 ("rightmost"), section 3 | 1 |
| IBL01 | Analog precharged Inverse Bit line 0 ("rightmost"), section 1 | 1 |
| IBL02 | Analog precharged Inverse Bit line 0 ("rightmost"), section 2 | 1 |
| IBL03 | Analog precharged Inverse Bit line 0 ("rightmost"), section 3 | 1 |
| RSP1 | Analog precharged RSP before SA, section 1 | 1 |
| RSP2 | Analog precharged RSP before SA, section 2 | 1 |
| RSP3 | Analog precharged RSP before SA, section 3 | 1 |
| REFML | Reference level for ML | 1 |

4. Architecture and Operation 4.1 Top-Level View

Figure 6:
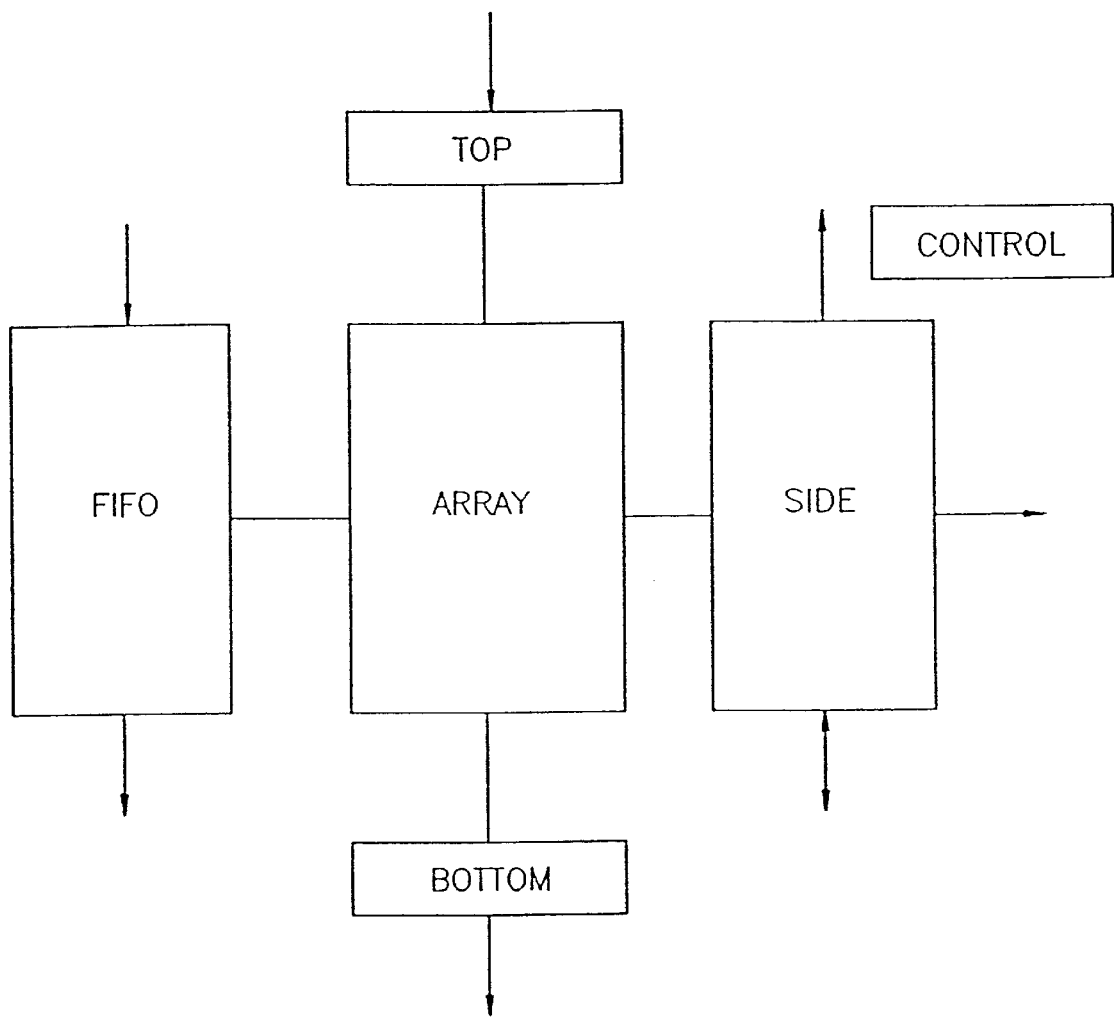
FIG. 6 is a simplified block diagram of a portion of the apparatus of FIG. 5.

The top-level view is shown in FIG. 6. ARRAY is the main associative array. FIFO is the image input/output fifo buffer. SIDE is the side-array, consisting of the tag, the tag logic, the tag count, the select-first, the row drivers (of WriteLine and MatchLine) and sense amplifiers, and the shift units.

TOP consists of the mask and comparand registers, and the column drivers (of BitLine, InverseBitLine, and MaskLine). BOTTOM contains the output register and sense amplifiers. CONTROL is the control logic for the chip. Microcontrol is external in this version.

4.2 ARRAY Architecture

The Array consists of 1024×72 associative processing elements (APEs), organized in three columns of 24 APEs wide each, and physically split into three blocks of 342×72 APEs. This six-way split achieves square aspect ratio of the layout and also helps contain the load of the vertical bus wires.

As is explained in Section 4.3 below, one 24 bit sector of the array is reconfigurable as follows (by means of the "CONFIFO" Configure Fifo instruction):

1. All 24 bits serve as FIFO (total ARRAY width is 48).
2. 16 bits FIFO, 8 bits ARRAY (total ARRAY width is 56).
3. 8 bits FIFO, 16 bits ARRAY (total ARRAY width is 64).

The Associative Processing Element (APE) is a Content Addressable Memory (CAM) cell. It consists of three components:

Storage element;

Write device;

Match device.

There are three vertical incident buses and four horizontal incident buses in the APE:

Vertical:

Bit Line (BL)

Inverse Bit Line (IL)

Mask Line (MASK)

Horizontal:

Write Line (WL)

Match Line (ML)

VDD

VSS (GND)

The Storage element consists of two cross coupled CMOS inverters.

The Write device implements the logical AND of MASK and WL, so that it can support the MASKED WRITE operation.

The Match device implements a dynamic EXCLUSIVE OR (XOR) logic. This technique allows area efficient and reliable implementation of the COMPARE operation.

4.3 FIFO Architecture

Figure 7:
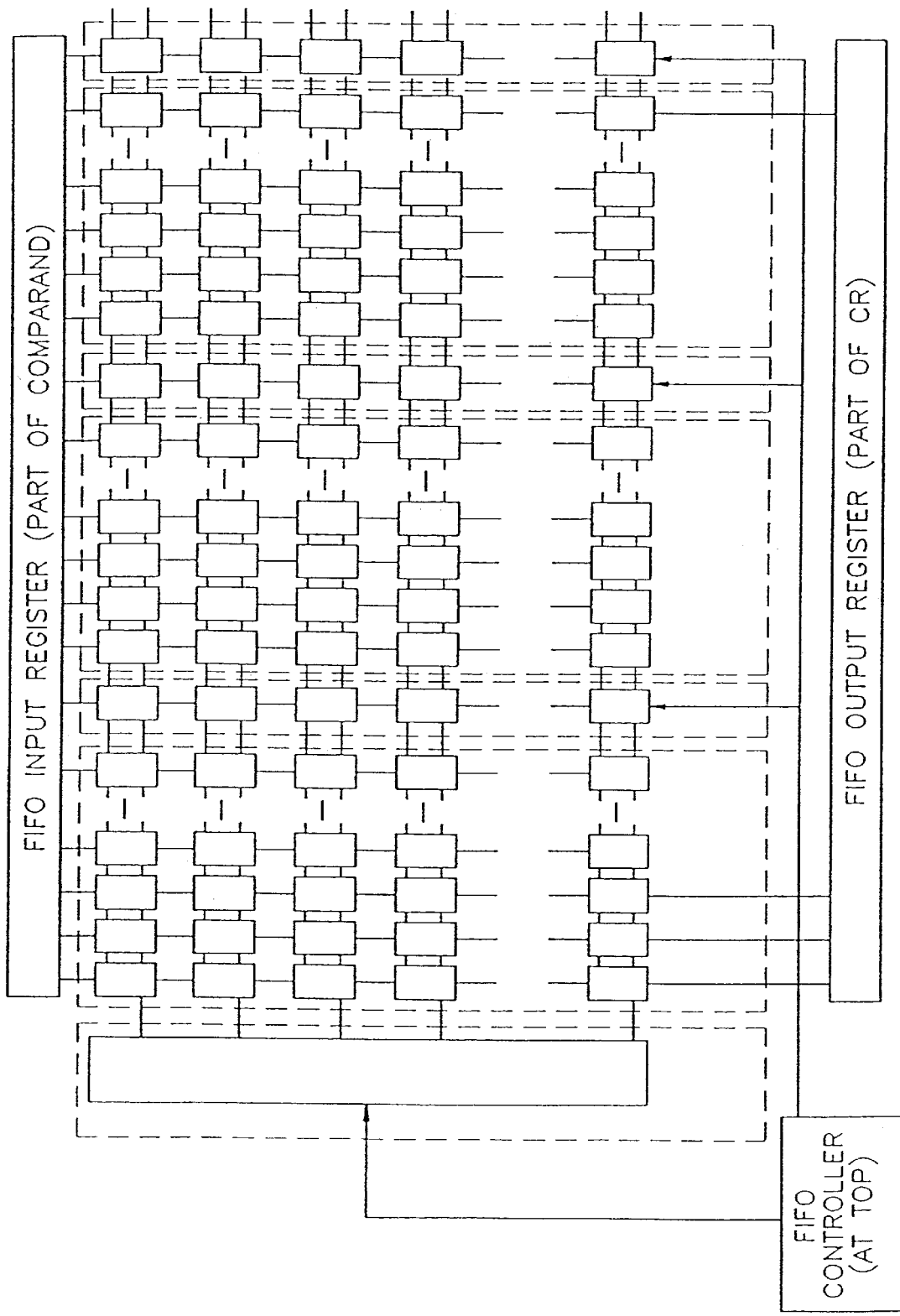
FIG. 7 is a simplified block diagram of a portion of the apparatus of FIG. 6.

Reference is now made to FIG. 7. The FIFO is designed to input and output image data in parallel with computations carried out on the ARRAY. It consists of a reconfigurable MATRIX of 1024×[24 or 16 or 8] APEs 190, three columns 192 each of 1024 bidirectional Switches, and Address Generator 194. The corresponding section of the Comparand register, in TOP, serves as the FIFO input register, and the corresponding section of the Output Register, in BOTTOM, serves as the FIFO Output Register. The FIFO Controller FC resides in TOP.

The FIFO is configured by the CONFIFO instruction, where the three LSBs of the operand are:

6 for 8 bit FIFO, 5 for 16 bit FIFO, 3 for 24 bit FIFO, and 7 for no FIFO.

When FIFO is 8 bits wide, inputs VIN[0:7] and outputs VOUT[0:7] are routed to bits [0:7] of the FIFO, where bit 0 is the "leftmost" bit. When FIFO is 16 bits wide, inputs VIN[0:15] and out puts VOUT[0:15] are routed to FIFO bits [0:15], such that the least significant byte (0:7) is the same routing as in the previous case. Similarly, when the FIFO is 24 bits wide, the least significant 2 bytes are routed in the same way as in the case of a FIFO 16 bits wide.

The Address Generator 194 consists of a shift register and implements a sequential addressing mode. It selects a currently active FIFO word line.

The FIFO has two modes of operation, IMAGE I/O Mode and IMAGE EXCHANGE Modes. The bi-directional Switches (one column of the three) disconnect the MATRIX from the ARRAY in IMAGE I/O Mode (see below) and connects the MATRIX to the ARRAY in IMAGE EXCHANGE Mode, creating a combined array of APEs. The Input and Output Registers serve as buffer registers for the image I/O. IMAGE I/O Mode.

In IMAGE I/O Mode, a new image is read into the FIFO, while the processed (preceding) image is written out. The FIFO Controller (FC) controls the FIFO as follows: Pixel I/O is synchronous with the CLK. External control input RSTFIFO resets (clears) the Address Generator 194. FENB (asserted for at least 2 CLK cycles) enables the input (and output) of the next pixel (on the positive edge of CLK). Once all pixels entered (and output), FFUL is asserted for 2 CLK cycles. This I/O activity is performed asynchronously of the computation in the rest of the chip.

The basic operation of IMAGE I/O mode is carried out as follows. The pixel at the VIN pins is entered into the FIFO Input Register (the FIFO section of the comparand register). The Address Generator 194 enables exactly one word line. The corresponding word is written into the FIFO Output Register (the FIFO section of the Output Register), and through it directly to the VOUT pins, in an operation similar to Read execution. Subsequently, the word in the FIFO Input Register is written into the same word, similar to a Write execution.

Note that VOUT pins are 3-state. They are enabled and disabled internally as needed.

This sequence of operations is carried out in a loop 1024 times in order to fill the 1024 processors with data.

Multiple ASP100 chips can be chained together with a FENB/FFUL chain, where the first ASP100 receives the FENB from an external controller (true for 2 cycles), the FFUL of each ASP100 (true for 2 cycles) is connected directly to the FENB input of the next chip, and the last FFUL goes back to the controller.

IMAGE EXCHANGE Mode

In IMAGE EXCHANGE Mode, the image previously loaded into the FIFO is transferred into the ARRAY for subsequent processing, and the previously processed image from the ARRAY is transferred to the FIFO for subsequent output. These transfers are carried out via the TAG register of the SIDE block by a sequence of COMPARE and WRITE operations, as follows:

IMAGE IN

A destination bit slice of the ARRAY is masked by MASK register and is then reset by a chain of SETAG; ClearComparand,WRITE operations (which can all be executed in one cycle). A source bit slice of the FIFO MATRIX is masked by the MASK register. The contents of the bit slice are passed to the TAG register as a result of the COMPARE operation. The destination bit slice is masked again and then the contents of the TAG register are passed to the destination bit slice by a SetComparand, WRITE operation. In summary, the following five cycles are employed:

For (All Bit Slices of FIFO)

LMCC(sector 0/1/2, destination ARRAY bit); SETAG; WRITE

/* reset destination bit slice in the proper array sector */

LETMC(sector 2, source FIFO MATRIX bit); COMPARE

/* copy source slice (FIFO sector) to TAG */

LETMC(sector 0/1/2, destination ARRAY bit); WRITE

/* copy TAG to destination in the proper sector */

IMAGE OUT

This operation is carried out in exactly the same way as IMAGE IN, except that a destination bit slice is allocated in the FIFO MATRIX while a source bit slice is allocated in the ARRAY. Note that IMAGE EXCHANGE operation requires two different fields in the ARRAY (a first field for allocation of a new image, and a second one for temporary storage of the processed image). The two operations (IMAGE IN & OUT) can be combined in one loop.

4.4 SIDE Architecture

Figure 8:
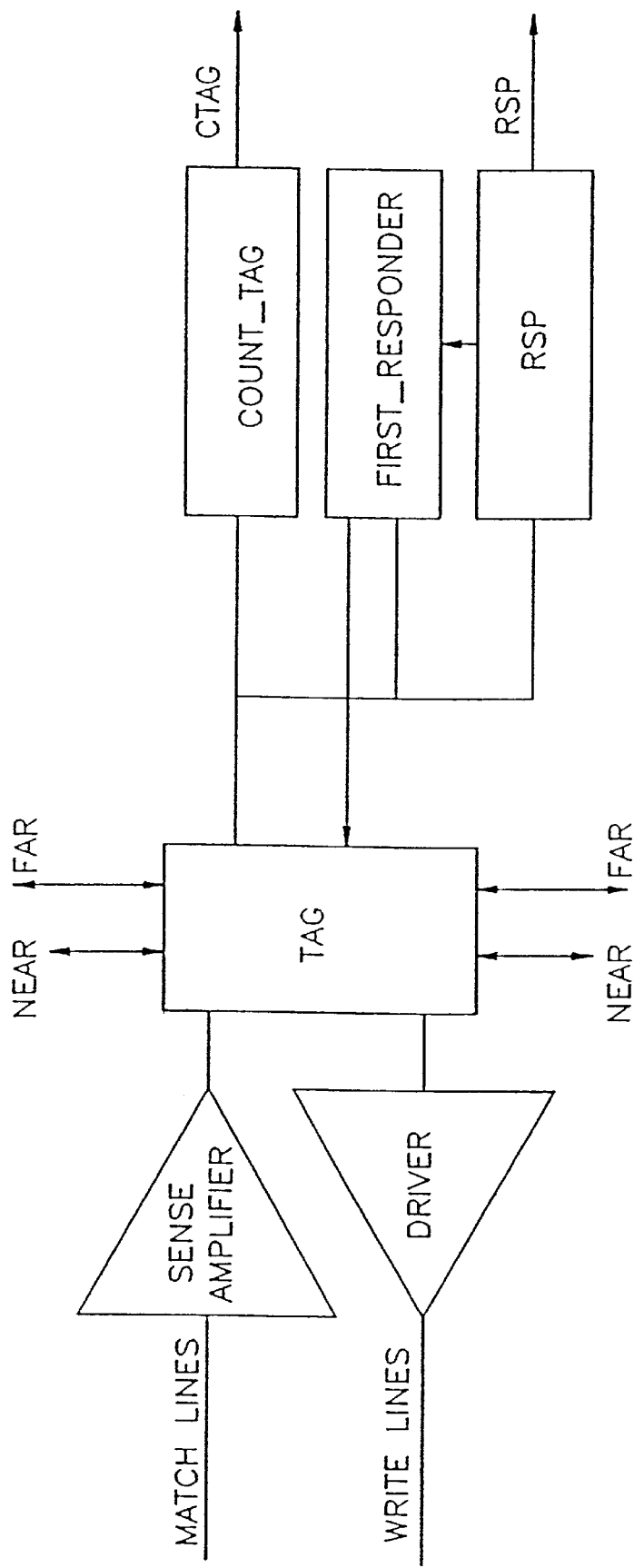
FIG. 8 is a simplified block diagram of another portion of the apparatus of FIG. 6.

Reference is now made to FIG. 8 which illustrates a preferred implementation of the SIDE block of FIG. 6. The SIDE block is shown to include the TAG register, the NEAR neighbor connections, the FAR neighbor connections, the COUNT_TAG counter, the FIRST_RESPONDER circuit, the RSP circuit, and the required horizontal bus drivers and sense amplifiers.

The TAG register consists of a column of 1024 TAG_CELLs. The TAG register is implemented by D flip flop with a set input and non-inverse output. The input is selected by means of a 8-input multiplexer, with the following inputs: FarNorth, NearNorth, FarSouth, NearSouth, MatchLine (via sense amp), TAG (feedback loop), GND (for tag reset), and FirstResponder output. The mux is controlled by MUX[0:2].

The NEAR neighbor connections interconnect the TAG_CELLs in an up/down shift register manner to nearest neighbors. They are typically employed for neighborhood operations along an image line, since pixels are stored consecutively by lines. The FAR connections interconnect TAG_CELLs 16 apart, for faster shifts of many steps. They are typically used for neighborhood operations between image lines.

The following instructions affect TAG: SETAG, SHUP, SHDN, LGUP, LGDN, video load up and video load down microcode signals termed herein VLUP and VLDN respectively and described in Appendix A, COMPARE, FIRSEL.

The COUNT_TAG counter counts the number of TAG_CELLs containing '1'. It consists of three iterative logic arrays of 1×342 cells each. The side inputs of the counter are fed from the TAG register outputs. The counter operates in a bit-serial mode, starting with the least significant bits. In each cycle, the carry bits are retained in the FF (memory cell flip-flop) for the next cycle, and the sum is propagated down to the next stage. The counter is partitioned into pipeline stages. The output of all six columns are added by a summation stage, which generates the final result in a bit-serial manner. The serial output appears on the CTAG outputs and signal CTAGVAL (CTAG valid) is generated by the controller. COUNT TAG counter is activated by the COUNTAG instruction.

The FIRST_RESPONDER circuit finds the first TAG CELL containing '1', and resets all other TAG_CELLs to '0'. It is activated by the FIRSEL instruction. The beginning of the chain is fed from a FIRSTIN input, wherein FIRSTIN is a microcode command according to which the first arriving datum is the first datum to enter the chip memory. If FIRSTIN is '0', then all TAG_CELLs are reset to '0'. This is intended to chain the FIRST_SELECT operation over all ASP100s interconnected together, and the OR of the RSP outputs of the lower-numbered ASP100 should be input into FIRSTIN.

The TAG outputs can be disconnected from the FIRST_RESPONDER and COUNT_TAG circuits, in order to save power, by pulling the FIRCNTEN control input to '0'.

The RSP circuit generates '1' on the RSP output pin after COMPARE instruction, if there is at least one '1' TAG value. This output is registered.

4.5 TOP Architecture

The TOP block consists of the COMPARAND and MASK registers and their respective logic, and the vertical bus drivers. The COMPARAND register contains the word which is compared against the ARRAY. It is 72 bits long, and is partitioned according to FIFO configuration (see Section 4.3) It is affected by the following instructions: LETC, LETMC, LMCC, LMSC, LCSM. All these instructions affect only one of the three sectors at a time, according to the sector bits. The FIFO section of the COMPARAND operates differently, as described in Section 4.3.

The MASK registers masks (by '0') the bits of the COMPARAND which are to be ignored during comparison and write. The BitLines and InverseBitLines of the masked bits are kept at '0' to conserve power. It is affected by the following instructions: LETM, LETMC, LMCC, LMSC, LCSM, LMX, SMX. The former five instructions affect only one sector at a time, whereas LMX and SMX also clear the mask bits of the non-addressed sectors. The FIFO section of the MASK operates differently, as described in Section 4.3.

The 24 bit data input from DBUS (the operand) are pipelined by three stages, so as to synchronize the operand and the corresponding control signals.

4.6 BOTTOM Architecture

BOTTOM contains the BitLine and InverseBitLine sense amplifiers, the Output Register and its multiplexor, the DBUS multiplexors, and the DBUS I/O buffers. Since the ARRAY is physically organized in three columns, the output of the three sense amplifiers must be resolved. A logic unit selects which column actually generated the output, as follows:

READ: Select the column whose RSP is true.
FIFO OUT: Select the column in which the address token is in.

The Output Register is 72 bits long. 8 or 16 or 24 bits serve the FIFO and are connected to the VOUT pins. On READ operation, one of the three sectors (according to the sector bits) is connected to 24 bits of DBUS via a multiplexor.

DBUS multiplexors allow two configurations:
1. SHIFT: Connects the south long shift (from rows 1008:1023) to DBUS[31:16] and the north long shift lines (from rows 0:15) to DBUS[15:0].
2. READ: Connects bits [15:0] (bit 0 is LSB) of the Output Register to DBUS[15:0], and bits [23:16] of the OR to DBUS[23:16].

The DBUS I/O buffers control whether the DBUS is connected as input or output, and are controlled by the HIN and LIN control signals:

| Instruction | LIN | HIN |
|---|---|---|
| SHUP, LGUP, VLUP | 1 | 0 |
| SHDN, LGDN, VLDN | 0 | 1 |
| READ | 0 | 0 |
| other | 1 | 1 |

Since, in SHIFT mode, lines DBUS[31:16] of one ASP100 chip must be connected to lines DBUS[15:0] of the next ASP100 chip, the external connections are not simply bused but should be switched as necessary.

4.7 CONTROL Architecture

The ASP100 is controlled by means of an external microcoded state machine, and it receives the decoded control lines. The external microcontroller allows horizontal microprogramming with parallel activities.

The combined operation of APS100, its microcontroller, and the external controller is organized in a five-stage instruction pipeline, consisting of the following stages: Fetch, Decode, microFetch, Comparand, and Execute. In the Fetch stage, the instruction is fetched from the external program memory, and is transferred over the system bus to the IR (instruction register).

Figure 9:
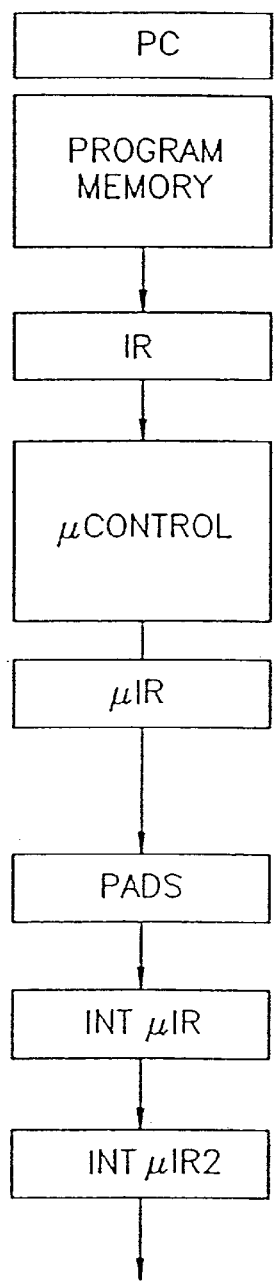
FIG. 9 is a simplified flowchart illustrating the operation of the apparatus of FIG. 5.

In the Decode stage, the instruction (from the IR) is decoded by the microcontroller and stored in the $\mu$IR. In the $\mu$Fetch stage, the control codes are transferred from the external $\mu$IR, through the input pads, into the internal $\mu$IR. In the Comparand stage, parts of the execution which affect the Comparand register are carried out, and the control codes move from the internal $\mu$IR to the internal $\mu$IR2. In the Execute stage, execution in the ARRAY and other parts takes place. See FIG. 9.

Note that more pipeline stages separate the ASP100 from the External Program Memory, necessary for instruction transfer from the memory via the bus to the IR inside the microcontroller.

Pipeline breaks occur during SHIFT and READ, when DBUS is used for data transfer rather than instructions, and as a result of branches. Branches are handled by the external controller, and are interpreted as NOP by the APS100 microcontroller. Similarly, operations belonging to the controller are treated as NOPs.

4.8 Initialization

On Reset (active low), all ASP100 internal registers are set to zero, except for TAG and the memory array.

4.9 Operation Notes

1. Write is designed so that while WRITE;COMPARE; WRITE: . . . can be done, two consecutive WRITEs and two consecutive COMPAREs cannot.
2. In all instructions which include SETs, such as SETAG, the corresponding control signal LETM and/or LETC must be set high. This is required since the set and reset of the comparand and mask registers is synchronous.

4.10 Clock Generator

Figure 10:
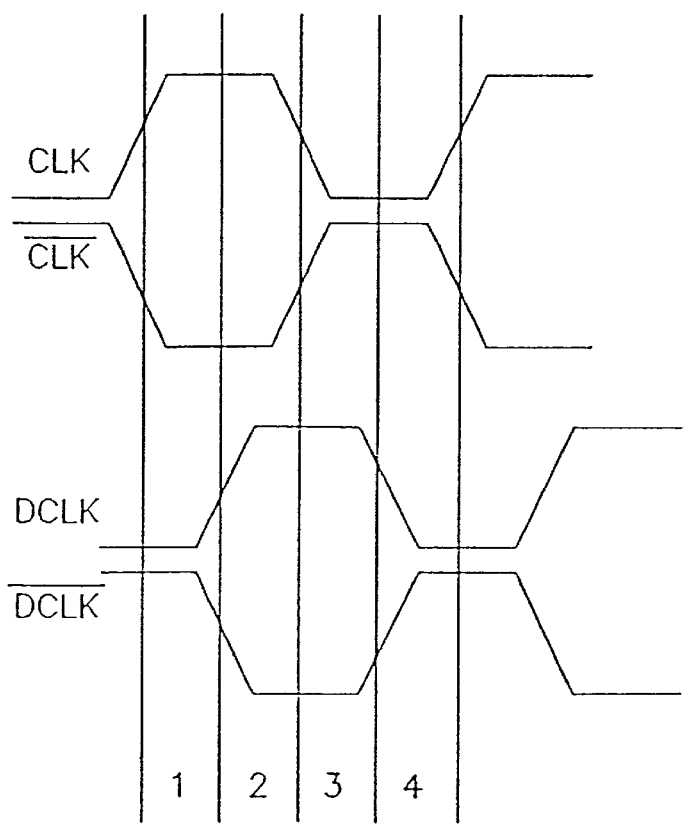
FIG. 10 is a simplified pictorial diagram illustrating the operation of a portion of the apparatus of FIG. 5.

Preferably, a single 50 MHz CLKIN clock is input into the ASP100. In addition, a clock synchronization control DCKIN signal is also input. The CLKIN signal serves as the clock of the generator circuit. DCLKIN is an input signal (abiding by the required setup and hold timing). The circuit creates two clocks of, for example, 25 MHz, CLK and DCLK, delayed by ¼ cycle relative to each others. CLK is fed back into a clock-generating pad, to provide the required drive capability. CLK, DCLK and their complements provide for four-phase clocking, as shown in FIG. 10.

5. Programming Model

5.1 Instruction Set

An example of an instruction set is now described. Two instruction formats are employed. Instruction format A is used for Group 1 and READ instructions, and instruction format B is used for all other groups. It contains one bit for NOP, five OpCode bits, two sector bits, and 24 operand bits.

Instruction format B contains one bit for NOP, seven OpCode bits, and 24 operand bits.

As presented here, these formats do not allow parallel execution of multiple instructions. It is appreciated that, in an alternative implementation of the instruction set format, parallel execution of multiple instructions could be included.

In the following table, d(n) is a n-bit argument, n$\leq$24, and s(2) is a 2-bit sector number.

| No. | Instruction | Format | Cycles |
|---|---|---|---|
| | | Group 1 | |
| 1 | Load Mask | LM s(2), d(24) | 1 |
| 2 | Load Comparand | LC s(2), d(24) | 1 |
| 3 | Load Mask and Comparand | LMC s(2), d(24) | 1 |
| 4 | Load Mask, Clear Comparand | LMCC s(2), d(24) | 1 |
| 5 | Load Mask, Clear Comparand Both Exclusive | LMCCXX s(2), d(24) | 1 |
| 6 | Load Comparand, Set Mask | LCSM s(2), d(24) | 1 |

-continued

| No. | Instruction | Format | Cycles |
|---|---|---|---|
| 7 | Load Mask Exclusive (clear other sectors) | LMX s(2), d(24) | 1 |
| 8 | Load Comparand Exclusive | LCX s(2), d(24) | 1 |
| 9 | Load Mask, Set Comparand (presently unused) | LMSC s(2), d(24) | 1 |
| 10 | Set Mask Exclusive (clear other sectors, presently unused) | SMX s(2) | 1 |
| 11 | Set Comparand Exclusive (presently unused) | SCX s(2) | 1 |
| | Group 2 | | |
| 11 | Set Tag | SETAG | 1 |
| | Group 3 | | |
| 12 | Shift Up | SHUP | 2 |
| 13 | Shift Down | SHDN | 2 |
| 14 | Long Shift Up (16 places) | LGUP | 2 |
| 15 | Long Shift Down (16 places) | LGDN | 2 |
| 16 | Very Long Shift Up (64, depends on microprogram) | VLUP | (5) |
| 17 | Very Long Shift Down (64, depends on microprogram) | VLDN | (5) |
| | Group 4 | | |
| 18 | Compare | COMPARE | 1 |
| 19 | Write | WRITE | 1 |
| | Group 5 | | |
| 20 | Read | READ s(2) | 3 |
| 21 | Count Tag | COUNTAG | (>20) |
| 22 | First Select | FIRSEL | (>20) |
| 23 | Configure FIFO | CONFIFO d(2:0) | 1 |
| | Group 6 | | |
| 24 | No Op | NOP | 1 |

Parallel ("Horizontal") Execution

1. Groups 1,3 instructions can be carried out in parallel.
2. Groups 1,2,4 instructions can be carried out in parallel.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

Further preferred methods and systems for associative signal processing are described in Appendix A.

Associative real time vision research vision research findings of Dr. Avidan Akerib, which were submitted to the Weizman Institute of Science, Rehovot, Israel, in the framework of a doctoral thesis, are now described with reference to FIGS. 11–34.

Figure 11:
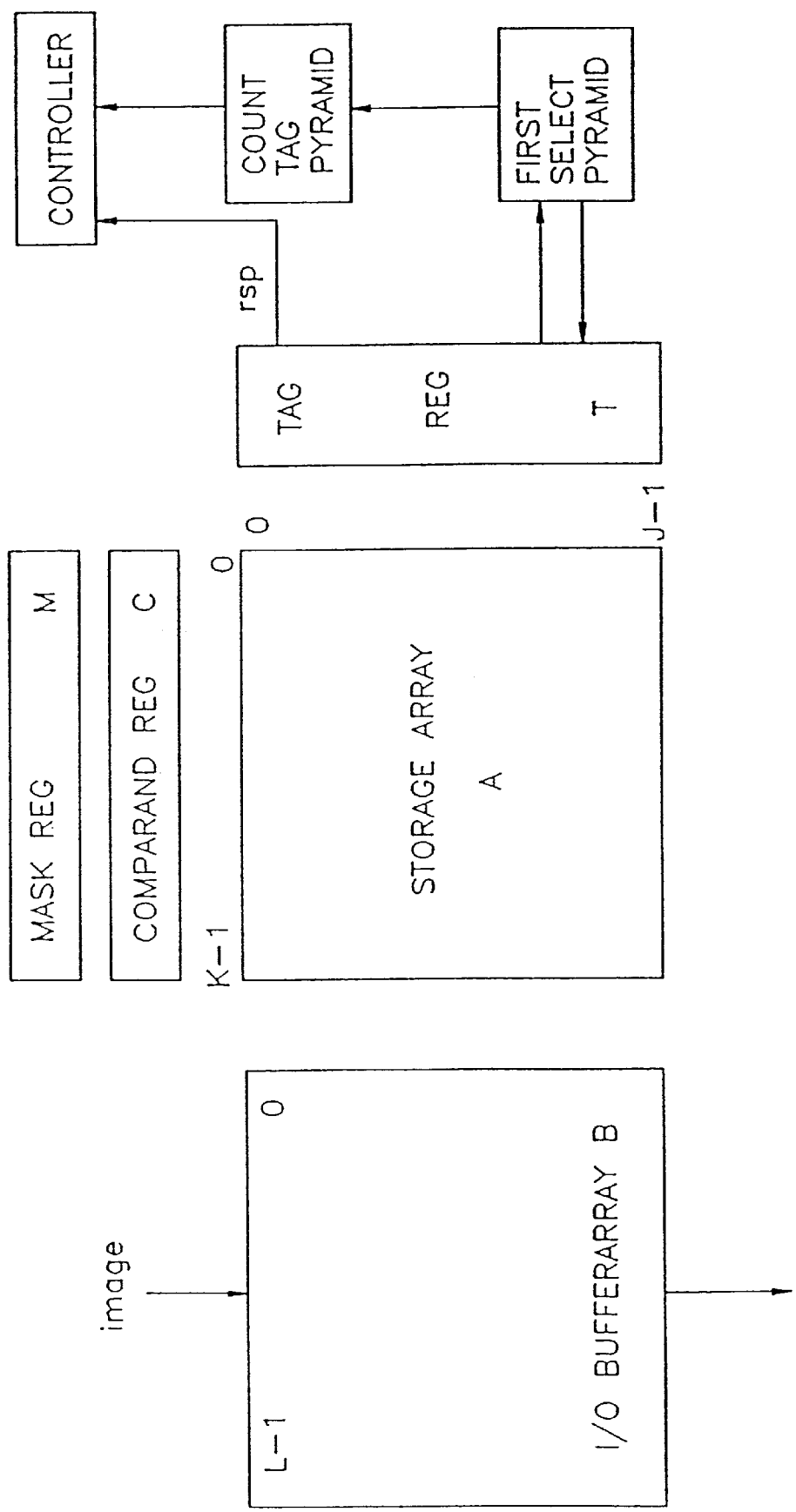
FIG. 11 is a simplified block diagram of associative real-time vision apparatus constructed and operative in accordance with an alternative preferred embodiment of the present invention.
Figure 12:
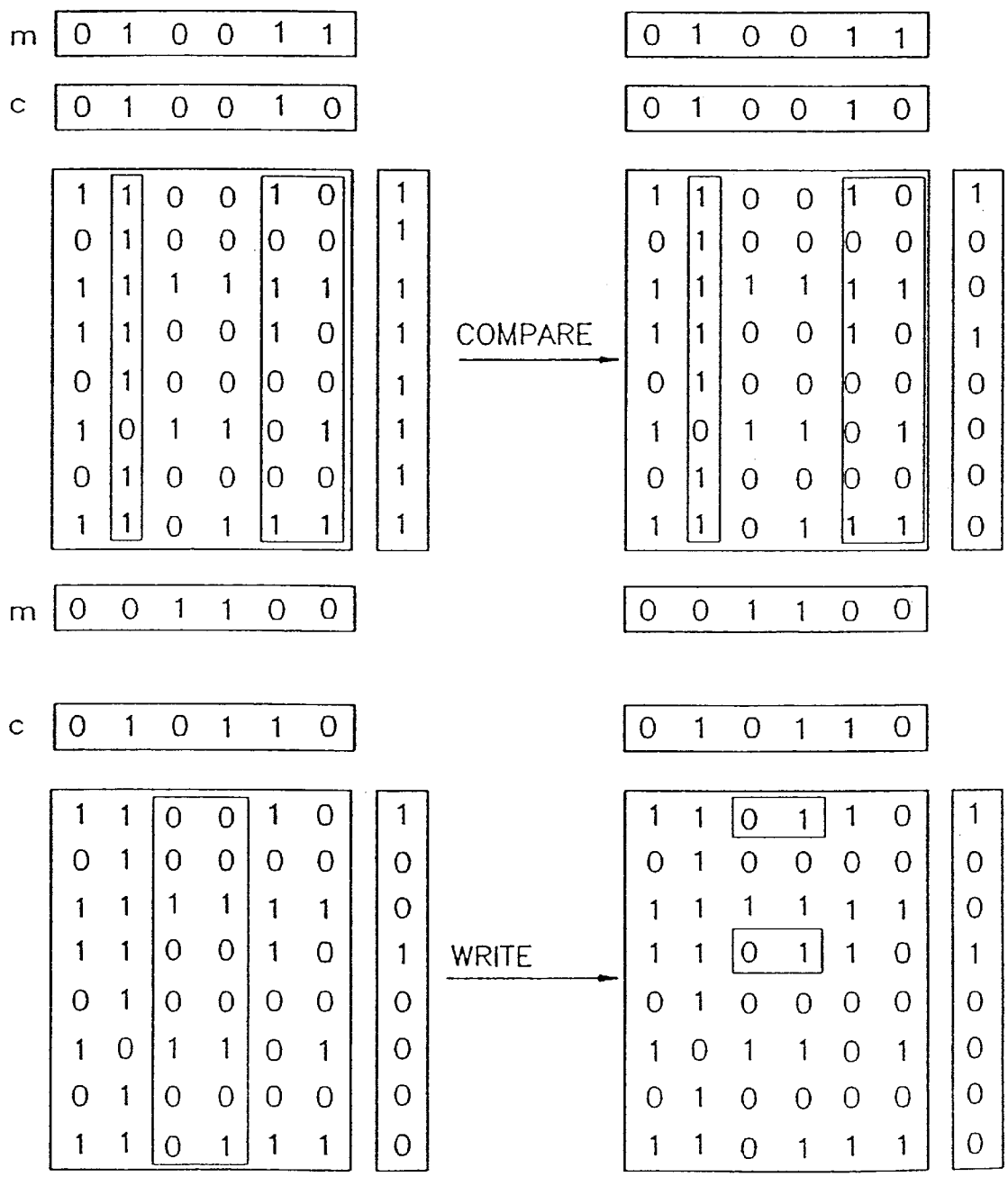
FIG. 12 is a simplified pictorial illustration of the operation of the apparatus of FIG. 11 during compare and write commands.

The ARTVM Architecture The Associative Real Time Vision Machine (ARTVM) was endowed with a number of characteristics which enable it to meet the vision requirements. In describing the structure of the machine and its primitive operations these attributes will be emphasized. Referring to FIG. 11, the core of the machine is a basic, classical, associative processor that is parallel by bit as well as by word. The main associative primitive is COMPARE. The comparand register is matched against all words of memory simultaneously and agreement is indicated by setting the corresponding tag bit. The comparison is only carried out in the bits indicated by the mask register and the words indicated by the tag register. Status bit rsp signals that there was at least one match (FIG. 12). The WRITE primitive operates in a similar manner. The contents of the comparand are simultaneously written into all words indicated by the tag and all bits indicated by the mask (FIG. 12). The READ command is normally used to bring out a single word, the one pointed to by the tag. Since the combination COMPARE-WRITE is of the type "if condition then action", all logical and arithmetic functions can be executed [3]. Hence the associative machine may be regarded as an array of simple processors, one for each word in memory. ARTVM provides N×N words, one for each pixel in the image to be processed, and the pixels are arranged linearly, row after row. The full machine instruction set is given in the following table.

Figure 13:
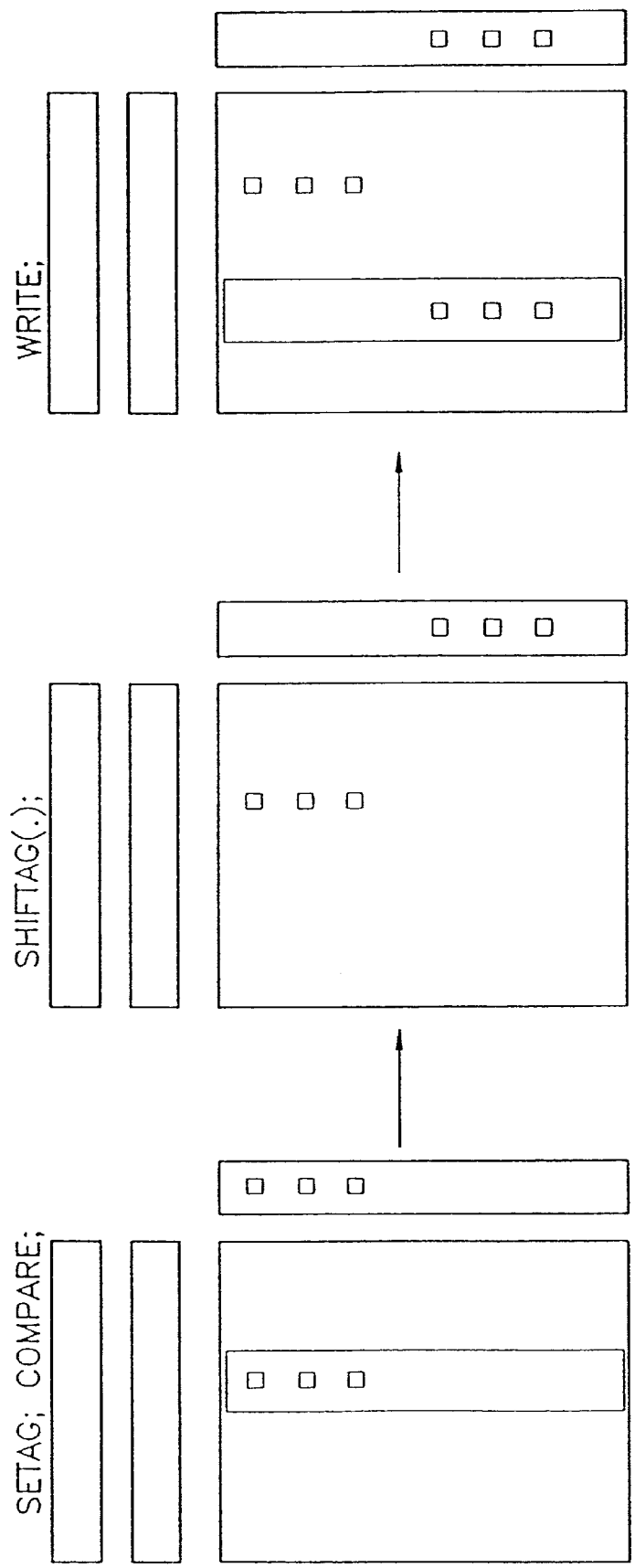
FIG. 13 is a simplified pictorial illustration of interprocessor communication within a portion of the apparatus of FIG. 11.

Neighborhood operations which play an important role in vision algorithms. require bringing data from "neighboring" pixels. Data communication is carried out a bit slice at a time via the tag register, by means of the SHIFTAG primitives, as shown in FIG. 13. The number of shifts applied determines the distance or relation between source and destiniation. When this relation is uniform, communication between all processors is simultaneous. Fortunately, neighborhood algorithms only require a uniform communication pattern. Since the image is two-dimensional while the tag register is only one-dimensional, communication between neighbors in adjacent rows requires N shifts. To facilitate these long shifts a multiple shift primitive, SHIFTAG($\pm$b), was implemented in hardware, where b is a submultiple of N. The time complexity in cycles for shifting an N×N image k places is given by $$\frac{M}{2}\left[5 + k - \left\lfloor\frac{k}{b}(b-1)\right\rfloor\right],$$

where M is the precision and b is the extent of the multiple-shift primitive.

Loading data images into associative memory and outputting computed results could take up much valuable processor time. This can be avoided by distributing a frame buffer within associative memory and giving it access to the tag register [33]. That is the function of the I/O Buffer Array which consists of a 16-bit shift register attached to each word. A stereo image frame can be shifted into the buffer array as it is received and digitized, without interfering with associative processing. During vertical blanking, the stereo image frame is transferred into associative memory, a bit slice at a time, using $\forall j=0, 1, 2, \ldots, J-1$ $\forall k=0, 1, 2, \ldots, K-1$ and $\forall l=1, 2, 3, \ldots, L-1$ Tag Operations SETAG: $T_n \leftarrow 1$
SHIFTAG($\pm 1$): $T_{n\pm 1} \leftarrow T_n$ (One-Place Shift)
SHIFTAG($\pm b$): $T_{n\pm b} \leftarrow T_n$ (Long Shift)
TAGXCH: $T_j \leftarrow B_{j0}, B_{j(l-1)} \leftarrow B_{j1}, B_{j(L-1)} \leftarrow T_j$
COUNTAG: $S \leftarrow \Sigma_n T_n$
FIRSEL: $T_n \leftarrow \begin{cases} 1 \text{ if } T^n \text{ is the first "1" of } T \\ 0 \text{ otherwise} 111 \end{cases}$ Comparand and Mask Initialization Let X denote any one of the following:
M (Mask), C (Comparand), MC (Mask & Comparand)
SETX: $X_k \leftarrow 1$
LETX opt1 opt2 opt3
 Where:
  opt1 = d($r_1$), d($r_2$), . . ., d($r_3$)
  opt2 = dseq($u_1$, $u_2$)
  opt3 = dvar($v_1$, $v_2$, p)

-continued and options can be intermingled in any order. Then:

$$X_k \leftarrow \begin{cases} 1 & \forall k = r_1 \ldots r_d & \text{if opt1 defined} \\ 1 & \forall k = u_1 \ldots u_2 & \text{if opt2 defined} \\ p_{k-v_1} & \forall k \in [v_1, v_2] & \text{if opt3 defined} \\ 0 & & \text{otherwise} \end{cases}$$

Compare Operation

COMPARE:
$$T_n \leftarrow T_j \overline{\uplus_k M_k A_{jk} \oplus C_k}$$
$$rsp \leftarrow \uplus_j T_j$$

Read Write Operations

READ: $R \leftarrow \uplus_k A_{nk} T_n$
WRITE: $A_{nk} \leftarrow \overline{T_n} A_{nk} \uplus T_n (M_k C_k \uplus \overline{M_k} A_{nk})$ The symbols $\uplus$, $\oplus$ and $\uplus$ stand for or, exlusive-or and or-expansion, respectively.

the TAGXCH (TAG eXCHange) primitive. Under this command, the buffer array is rotated right circularly via the tag register. If results of computation on the previous frame are available for output, they can be entered into the tag by a compare instruction before executing the tagxch, which will now put out a bit-slice at the same time that it brings one in—hence the name tag exchange for this primitive. For a full stereo image this operation must be repeated 16 times. During the next frame time, both input and output proceed in parallel with processing without interference. The following routine will exchange the contents of the buffer array with those of a 16-bit field in associative memory starting at bit position i0,

```
for (i=i0; i<i0+16;i++)
{
    letmc d(i) ; setag; compare;   /* load tag with memory bit slice */
    letc; write;                   /* clear bit slice in memory */
    tagxch;                        /* exchange bit slice with buffer
                                      array */
    letmc d(i); write;             /* load memory with bit slice from
                                      buffer */
}
```

Execution time is 64 machine cycles (under 2 $\mu$s), which is negligible compared to the vertical blanking period (1.8 ms). While the sample routine exchanges data between the buffer array and a continuous field in memory, it should be noted that the tagxch primitive is quite flexible, can fetch data from one field and put to another, and both fields can be distributed.

Up to four operations may be done concurrently during a given memory cycle: SETAG or SHIFTAG; loading M (SETX, LETX); loading C (SETX, LETX); and COMPARE, READ or WRITE. FIRSEL resolves multiple responses in 6 cycles. COUNTAG is used to compile statistics and executes in 12 cycles. Control functions are given in the C language, and are carried out in parallel with the associative operations, hence do not contribute to the execution time.

To illustrate parallel processing capability, suppose that associative memory contains two data vectors, A and B, each having J elements and M-bit precision. We wish to replace vector field B by the sum A+B. The associative operation is carried out sequentially, a bit slice at a time, starting with the least significant bit. In each step, the three slices $A_i$, $B_i$ and C (i=0, 1, . . . , M−1, and C is the carry slice) are compared in parallel to an input combination of the applicable truth table by means of the statement [letm d(.); letc d(.); setag; compare], followed by a parallel replacement of B and C with the appropriate output combination by means of the statement [letc d(.) write]. A full description of the routine is given in The Machine Simulator. The execution time of addition in machine cycles is 8.5M which is seen to be independent of vector size J. It follows that for a 512×512 image (J=$2^{18}$) and a machine cycle of 30 nanoseconds (see VLSI Chip Implementation and Interconnection), the machine executes 125 billion 8-bit additions per second. Associative subtraction operates on the same principle and also takes 8.5M cycles. It is easy to extend addition to multiplication (8.5$M^2$ cycles), and subtraction to division (15.5$M^2$ cycles). Multiplication techniques will be discussed in detail in Vision Algorithms. ARTVM was seen to be microprogrammed, hence it can operate at just the precision needed in each phase and produce just the significant bits required in the result. In many vision algorithms precision is quite low, and this gives the ARTVM an additional speed advantage over conventional machines.

As mentioned earlier, each word in memory acts as a simple processor so that memory and processor are indistinguishable. Input, output and processing go on simultaneously in different fields of the same word. The field to be accessed or processed, is completely flexible, depending on application. Hence, processing capabilities (families of vision algorithms) may be expanded by increasing word length K. It will be shown in Vision Algorithms that for K=152 all the vision algorithms we considered will run in real time, while K=32 is sufficient for many simple image processing applications (such as histogram evaluation, convolution, morphological operations etc.).

VLSI Chip Implementation and Interconnection

Ruhman and Scherson [34, 35] devised a static associative cell and used it to lay out an associative memory chip. After evaluating its performance by circuit level simulation, they conservatively estimated the area ratio between associative memory and static RAM at 4. Considering that 4 megabits of static RAM is now commercially available on a chip area less than 100 mm$^2$, associative memory chip capacity becomes 1 M bits. The proposed chip for ARTVM stores 4K words×152 bits, which is only 59 percent of capacity. Conservative extrapolation of cycle time to a 0.5 micron technology yields 30 nanoseconds. This value was used in computing execution time of associative vision algorithms.

Figure 14:
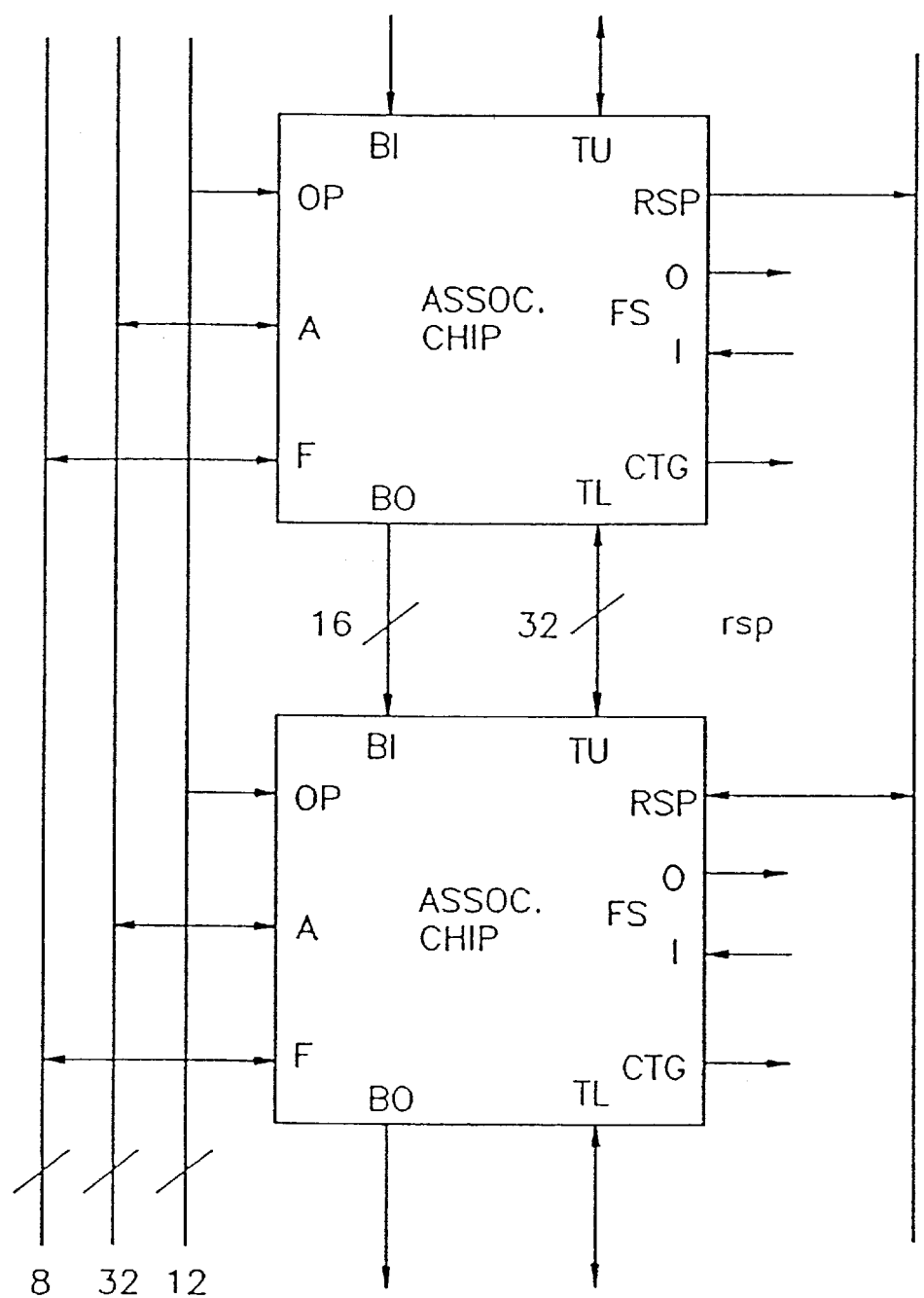
FIG. 14 is a simplified block diagram illustrating chip interface and interconnections within a portion of the apparatus of FIG. 11.

Loading an entire comparand or mask word would require a bus 152 bits wide. Fortunately, associative algorithms only operate on one or two short fields and on a number of flag bits at a time. Hence the word was partitioned into four 32-bit sectors and an 8-bit flag field. Buses are provided for simultaneous access to the flag field and one sector. FIG. 14 describes the chip interface, and shows how 64 such chips can be interconnected to make up the associative memory of ARTVM. Considering the exponential growth of chip capacity by a factor of 10 every five years [36], the ARTVM may be reduced to 8 chips around 1995. Since the bulk of the machine is associative memory, upgrading is simple and inexpensive.

As indicated in FIG. 11, a control unit is required to generate a sequence of micro-instructions and constants (mask and comparand) for associative memory as well as to receive and test its outputs (count and rsp). This unit may be realized using high speed bit-slice components, or may be optimized by the design of one or more VLSI chips. The functions of the control unit will become apparent from the associative algorithms that follow.

See FIG. 14, for the notation employed.

The Machine Simulator

A simulator for the ARTVM was created, which enables the user to check out associative implementations of vision algorithms and to evaluate their performance. It was written in the "C" language and is referred to as "asslib.h". The vision machine simulator consists of an associative instruction modeler and an execution time evaluator.

Associative Instruction Modeler

The main features are:

The dimensions of associative memory have been defined as variables memsize and word_length, hence must be initialized in the application program by # define commands.

The contents of associative memory and its registers are defined as external parameters called:

A[MEM_SIZE][WORD_LENGTH]
mask [WORD_LENGTH]
comparand [WORD_LENGTH]
tag[MEM_SIZE]

All are members of a structure called parameters.

The associative instructions defined in The ARTVM Architechure were implemented as "C" functions which get their inputs from, and write their results to the external structure parameters.

Three instructions were added: load, save and print_cycles. The load command initializes the array A[.][.] with data from the file ass. inp, while the save command writes into file ass.out the contents of memory array A[.][.] at the end of the application program.

The print_cycles command displays the number of machine cycles required to execute the simulated program.

Program control functions are written directly in "C".

The general format of an application program is as follows:
  # define MEM_SIZE mmm
  # define WORD_LENGTH www
  # include "asslib.h"
  main( )
  {
    load;
    BODY
    save;
    print_cycles;
  }

Execution Time Evaluator

Speed evaluation was achieved by modeling the machine as a simplified Finite Automaton (F.A.) in which a cost, in machine cycles, was assigned to each state transition. The machine has only two states: $S_0$ and $S_1$. The input alphabet was selected by grouping the instructions into 5 categories called $I_i$, i=1, . . . , 5, where:

$$I_1 = \text{one of} \begin{cases} letm & d(.) \\ letc & d(.) \\ letmc & d(.) \\ letm & d(.) \quad letc \\ letm & d(.) \quad setc \end{cases}$$

$$I_2 = \text{one of} \begin{cases} setag \\ shiftag(\pm 1) \\ shiftag(\pm b) \end{cases}$$

$$I_3 = \text{one of} \begin{cases} compare \\ write \\ read \end{cases}$$

$$I_4 = countag$$

$$I_5 = firsel$$

Figure 15:
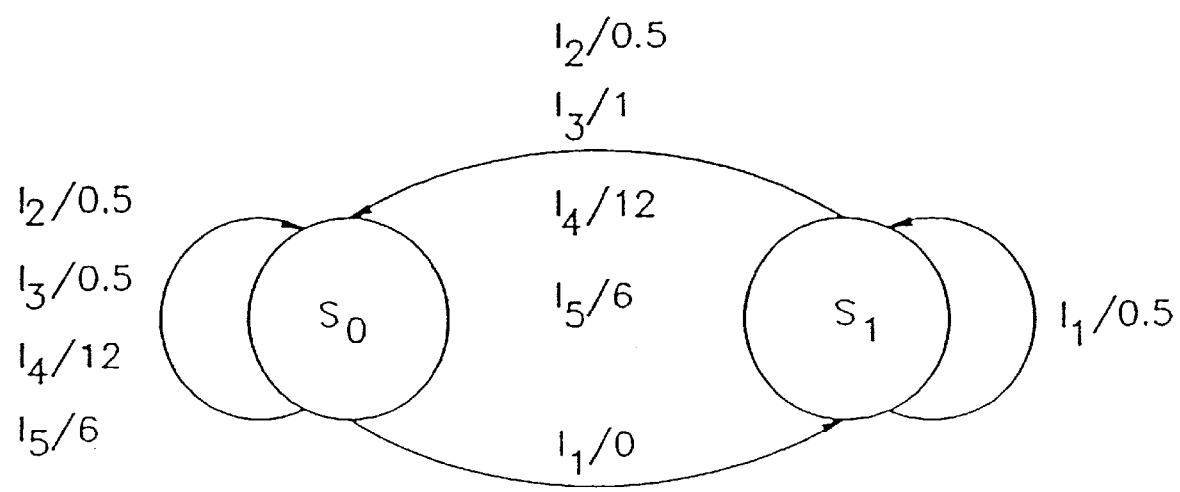
FIG. 15 is a simplified pictorial illustration of an automaton used to evaluate the complexity of the apparatus of FIG. 11.

FIG. 15 presents the transition table and diagram. At initialization me reset a cycle counter (called cycles) to zero, then increment it at each state transition by the assigned cost in cycles (appears as output in the diagram).

| | In | Out | |
|---|---|---|---|
| Group | State | State | Increment |
| 1 | $S_0$ | $S_1$ | 0 |
| 1 | $S_1$ | $S_1$ | ½ |
| 2 | φ | $S_0$ | ½ |
| 3 | $S_0$ | $S_0$ | ½ |
| 3 | $S_1$ | $S_0$ | 1 |
| 4 | φ | $S_0$ | 12 |
| 5 | φ | $S_0$ | 6 |

This speed model reflects the fact that any instruction from group $I_1$ can execute simultaneously with one from group $I_2$, and they can both be overlapped by an instruction from group $I_3$. The cost of countag ($I_4$) is conservatively estimated at 12 cycles on the basis of implementing in on-chip by a pyramid of adders, and summing the partial counts off-chip in a two dimensional array. The cost of firsel ($I_5$) is conservatively estimated at 6 cycles on the basis of implementing it by a pyramid of OR gates whose depth is $\log_2 N-1$. part of which is on-chip and the rest off-chip. In the worst case, the pyramid must be traversed twice and then a tag flip-flop must be reset. The simplicity of the model for speed evaluation imposes a mild restriction on the programmer. Instructions that are permitted to proceed concurrently must be written in the order $I_1$, $I_2$, $I_3$.

To illustrate the instruction set and assembly language used by the simulator, we present below a listing of the vector addition program discussed earlier (The ARTVM Architecture).

```
/* ****************** ASSOCIATIVE ADDITION PROGRAM ******************* */
/*           The process adds two 8-bit vectors A and B according to the truth table     */
/*              given below, and replaces field B with the sum (A + B).                  */
/* ********************* WORD FORMAT and TRUTH TABLE ********************** */
/*              |  ----------------  |  ---  |  ----------------  |                       */
/*              |  ------ A ------   |  -C-  |  ------ B ------   |                       */
/*              <          ------ A + B ------          >                                 */
/*   |==============================|=======================|=================|          */
/*   |=========== IN ============   |====== OUT =========   |   order of      |          */
/*   |   Aij       Cj       Bij     |   Cj      (A + B)ij   |   execution     |          */
/*   |==============================|=======================|=================|          */
/*   |   0         0        0       |   0         0         |      —          |          */
/*   |   0         0        1       |   0         1         |      —          |          */
/*   |   0         1        0       |   0         1         |      1          |          */
/*   |   0         1        1       |   1         0         |      2          |          */
/*   |   1         0        0       |   0         1         |      4          |          */
/*   |   1         0        1       |   1         0         |      3          |          */
/*   |   1         1        0       |   1         0         |      —          |          */
/*   |   1         1        1       |   1         1         |      —          |          */
/*   |==============================|=======================|=================|          */
#define MEM_SIZE 16
#define WORD_LENGTH 17
#include "asslib.h"
main()
{
    int cnt;
    int c_bit = 8;
    load;
    for(cnt=0; cnt<8; cnt++)
    {
        letm d(cnt) d( c_bit) d( cnt+c_bit+1);          /* 0.5 cycle  */
        letc d(c_bit); setag; compare;                   /* 1.0 cycles */
        letc d(cnt); write;                              /* 1.0 cycle  */
        letc d(cnt) d( c_bit); setag; compare;           /* 1.0 cycle  */
        letc d(c_bit); write;                            /* 1.0 cycle  */
        letc d(cnt) d( cnt+c_bit+1); setag; compare;     /* 1.0 cycle  */
        letc d(c_bit) d( cnt+c_bit+1) ; write;           /* 1.0 cycle  */
        letc d(cnt+c_bit+1); setag; compare;             /* 1.0 cycle  */
        letc d(cnt) d( cnt+c_bit+1); write;              /* 1.0 cycle  */
    }                                                    /* ================ */
    save                                                 /* 8.5 cycles per bit */
    print_cycles;
}
```

Vision Algorithms

To test the flexibility and speed of the proposed associative architecture ARTVM, a broad range of vision functions were implemented. They included low level algorithms such as histogram generation, convolution, edge detection, thinning, stereo matching and optical flow. Mid-level functions were also implemented, including contour tracing and labeling, Hough transforms, saliency mapping, and such geometric tasks as the convex hull and Voronoi diagram. Our simulator was used to test the associative algorithms and to verify their complexity.

Before describing the associative algorithms it might be helpful to recall briefly the configuration of the machine, the value of some parameters and the data structure employed. The image resolution is taken to be 512×512 (N=512), hence associative memory capacity is 256K words (one word per pixel). The data is arranged linearly in memory, in the order of the video scan, row after row of pixels, starting at the top left hand corner of the image. Incoming data is given to 8-bit precision (M=8), and although the processing is all fixed-point, the algorithms are designed to retain the full inherent accuracy. The long shift instruction was provided for communication between rows, and its extent was denoted by $b_1$ where b is a submultiple of the row length, N. In our model of the machine, the extent of long shift is taken to be 32 places (b=32). Algorithm complexity will be expressed in cycle times; the machine cycle was conservatively estimated in VLSI Chip Implementation and Interconnection at 30 ns., and this value will be used to compute execution time.

Low Level Vision

Histogram

The associative nature of ARTVM and its relatively fast countag instruction facilitate histogram evaluation. The program is given in Listing 1. It consists of a very short loop repeated for each gray level: a compare instruction tags all the pixels of that level, and a countag tallies them up. The count is automatically available at the controller, which accumulates the histogram in an external buffer. Accordingly, the time complexity in machine cycles is given by, $$T_{hist}=0.5+(13)2^M \qquad (1)$$

where M is the gray level precision and is taken to be 8 bits in our model. Hence the histogram is executed in under 3330 machine cycles or nearly 100 $\mu$s.

LISTING 1: Associative Computation of Image Histogram

```
main()
{
    int gray_level;
    long int histogram_array[256];
    letm dseq(0, 7);        /* sets the first 8 bits in the mask */
    for(gray_level = 0; gray_level<256; gray_level++)
```

```
        {
          letc dvar(0, 7, gray_level); setag; compare;
          histogram_array[gray_level] = countag;
        }
     }
```

Convolution

Low level vision, particularly edge-detection, involves the application of various filters to the image, which are most conveniently executed by convolution. The image may be considered as a simple vector of length $N^2$ or as a concatenation of N row vectors, each of length N. Convolution of an N-element data vector by a P-element filter results in a vector of length N+P−1, but only the central N−P+1 elements, representing the area of full overlap between the two vectors, are of interest here. We developed several techniques to implement convolution associatively, depending on filter characteristics such as dimensional separability, and symmetry. We start with the multiply-and-shift approach given by Ruhman & Scherson [6, 37, 38]. The word format in associative memory is depicted in FIG. 16.

The convolution filter vector [f] of length P and precision 8 is applied as operand from the machine controller, one element at a time. The result is accumulated in field [fd] of length 8+8+$\log_2$ (P). Bit temp is used for temporary storage of the carry that propagates through field [fd]. The mark bit serves to identify the area of complete overlap by the filter vector.

The program for row convolution is given in Listing 2. Field [d] is multiplied by successive elements of vector [f] and the results accumulated in field [fd]. Between multiplications, data field [d] is shifted down one word position for row convolution; down N word positions for column convolution). The f-element acts as multiplier, each of its bits is tested by the controller, and if set will cause field [d] to be added into field [fd] starting at bit position add-offset. After each addition the carry is propagated to the highest bit of [fd]. For column convolution, only the last program line must be changed, replacing "shiftag(1)" by "for(i=0;i<N/b;i++) shiftag(b)".

LISTING 2: 1-d Image Convolution

```
/************ ASSOCIATIVE CONVOLUTION PROGRAM ******/
main()
{
    /* ... declarations */
    for(f_index=0; f_index<f_size; f_index++)
    {
        /*************** Summed Multiplication ****************/
        /* add [d] to [fd] if the bit at position bit_count of f[f_index] is
ONE */
           for(add_offset=0; add_offset<n; add_offset++)
             if( BIT(add_offset) OF_WORD f[f_index]) /*test if bit is ONE
*/
             {
                /************ add **************/
                  for(bit_count=0; bit_count<n; bit_count++)
                    {
                      fd_bitcnt = add_offset + bit_count;
                      letm d(fd_bitcnt) d(temp) d(d_offset+bit_count) d(mark);
                      letc d(temp) d(mark); setag; compare;
                      letc d(fd_bitcnt) d(mark); write;
                      letc d(fd_bitcnt) d(temp) d(mark) setag; compare;
                      letc d(temp) d(mark); write;
                      letc d(fd_bitcnt) d(d_offset+bit_count) d(mark); setag;
                      compare;
```

LISTING 2: 1-d Image Convolution

```
                      letc d(temp) d(d_offset+bit_count) d(mark); write;
                      letc d(d_offset+bit_count) d(mark); setag; compare;
                      letc d(fd_bitcnt) d(d_offset+bit_count) d(mark); write;
                    }
                /**** propagate carry *****/
                  letc d(mark) d(temp);
                  while(fd_bitcnt < 2*n +3 )
                    {
                      letm d(fd_bitcnt) d(mark) d(temp); setag; compare;
                      letc d(fd_bitcnt) d(mark); write;
                      letc d(fd_bitcnt) d(mark) d(temp) ; setag; compare;
                      letc d(mark) d(temp); write;
                      bit_count++;
                    }
             }
        /********* shift [d] field down *********/
          for(bit_count=mark+1; bit_count<=mark+n; bit_count++)
            {
              letmc d(bit_count); setag; compare; letc; write;
              letc d(bit_count); shiftag(1); write;
            }
}
```

The time complexity for 1-d convolution in machine cycles is given by, $$T_{1d}=PM[\alpha(Mt_a+T_p^{1d})+t_s] \qquad (2)$$

where $t_a$, $t_s$ are the per-bit addition and shift complexity, and $T_p^{1d}$ is the complexity of carry propagation over field [fd]. Since addition and carry propagation are only executed for a ONE digit in the multiplier (filter element), time complexity is a function of $\alpha_1$ the ratio of ONE digits in the filter vector elements, whose range is $$\frac{1}{M} \leq \alpha \leq 1.$$

From the program listing, addition time $t_a$ is 8.5 cycles. Carry propagation takes 4 cycles per bit, and the average propagation distance is $$\lceil \log_2 P \rceil + \frac{M+1}{2},$$

hence $$T_p^{1d} = 4\left(\lceil \log_2 P \rceil + \frac{M+1}{2}\right).$$

The program time to shift a field, excluding shiftag( ), is 3 cycles per bit. Therefore, to move a pixel field over to the next column takes $t_s^c=3$ cycles per bit, and to the next row $$t_s^r = 3 + 0.5\left(\frac{N}{b} - 1\right)$$

per bit. Extending the above algorithm to 2-d gives, $$T_{2d}=\alpha P^2 M(t_a+T_p^{2d})+M(P-1)(t_s^r+Pt_s^c) \qquad (3)$$

where $$T_p^{2d} = 4\left(\lceil \log_2 P^2 \rceil + \frac{M+1}{2}\right)$$

is the average carry propagation for 2-d convolution. By substitution of $t_a$, $T_p^{2d}$ and $t_s$ into 11, we get:

$$T_{2d} = \alpha P^2 M(10.5M + 4\lceil \log_2 P^2 \rceil + 2) + M(P-1)\left(3P + \frac{N}{2b} + 2.5\right) \quad (4)$$

This simple algorithm is quite efficient for 1-d convolution, particularly if the filters used are inherently of low precision (a<<1). But for a wide 2-d filter, say 31×31, execution time may still exceed half a video frame (20 ms). Several approaches will be considered for reducing the time complexity.

Some 2-d filters are separable into two 1-d convolutions. Thus the 2-d Gaussian can be effected by successive application of a 1-d filter in the two coordinate directions. Reduction to 1-d convolution leads to a drastic improvement in execution time. Equation 11 can be written as:

$$2T_{1d} = PM[\alpha(Mt_a + T_p^{1d}) + t_s'] + PM[\alpha(Mt_a + T_p^{1d}) + t_s^c], \quad (5)$$

and by substitution of $t_a$, $T_p^{1d}$ and $t_s$ it reduces to, $$2T_{1d} = PM\left[\alpha(21M + 8\lceil \log_2 P \rceil + 4) + \frac{N}{2b} + 5.5\right]. \quad (6)$$

The filters we deal with all have symmetry about the origin. The Gaussian has even symmetry, while the derivative of the Gaussian has odd symmetry. This brings up the interesting question of how far one can exploit symmetry to improve execution time. Consider first convolution in one dimension with a filter of even symmetry and length P=2 L+1 applied at point $d_m$, $$y_m^{even} = f_0 d_0 + \sum_{i=1}^{L} f_i(d_{m+i} + d_{m-i})$$

where the filter elements $f_i$, on either side of the center element $f_0$, are equal. Using the following word format, the algorithm for 1-d convolution with an even function is given in FIG. 17.

For convolution in the x-direction, all shifts are one-place, "shiftag(±1)"; in the y-direction each one is N/b long shifts, "for(i=0;i<N/b;i++) shiftag(±b);". Applying this algorithm to a separable 2-d filter with even symmetry, such as the Gaussian, the time complexity becomes, $$2T_{1d}^{even} = M[(17\alpha - 4) + \alpha LM(21M + 30 + 8\lceil \log_2 P \rceil) + LM\left(\frac{N}{b} + 11\right)]. \quad (7)$$

For odd symmetry, $f_0 = 0$, and $f_i$ is the absolute value of the filter elements on either side of it. Hence the convolution formula reduces to, $$y_m^{odd} = \sum_{i=1}^{L} f_i(d_{m+i} - d_{m-i}),$$

and two modifications are required in the algorithm: to remove step 1 of the program (evaluation of d·$f_0$); and change step 1 of the loop from NEXT+d to NEXT−d. Time complexity of the odd symmetry filter, applied in both directions, becomes, $$2T_{1d}^{odd} = \alpha LM(21M + 30 + 8\lceil \log_2 P \rceil) + LM\left(\frac{N}{b} + 11\right) - 4M. \quad (8)$$

The methods for reducing convolution time that were considered so far, all take advantage of particular properties of the filter: symmetry, element bit statistics, and separability of 2-d filter. We now a consider an enhancement that applies to the most general filter, treats the pixel data as multiplier, and speeds up multiplication by applying 4 bits of the multiplier at a time. Referring to the following algorithm and word format as illustrated in FIG. 18, the 8-bit data field is partitioned into a high ($d_h$) and low ($d_L$) nibble. A 12-bit field, md, is provided for the partial product of the current filter element by the current data nibble. To fill in all the partial products by table look-up requires 15 compare-write cycles (no action required for all-ZERO nibble).

Using the enhanced multiplication algorithm, the time complexity of general 2-d image convolution becomes, $$T_{2d}^{enh} = P^2(T_m + 3Mt_a + T_{p1}^{2d} + T_{p2}^{2d}) + M(P-1)(t_s' + Pt_s^c), \quad (9)$$

and that of 1-d convolution in both directions, $$2T_{1d}^{enh} = P[2(T_m + 3Mt_a + T_{p1}^{1d} + T_{p2}^{1d}) + M(t_s' + t_s^c)]. \quad (10)$$

$T_m$ is the time (2×15×2.5 cycles) to generate the two partial products by table look-up, and $T_{p1}$, $T_{p2}$ are their carry propagation times following addition into field fd. Substituting for $T_m$, $t_a$ and $t_s$, and evaluating $T_{p1}$, $T_{p2}$, the time complexities reduce to, $$T_{2d}^{enh} = 295P^2 + 8P^2\lceil \log_2 P^2 \rceil + 8(P-1)\left(3P + \frac{N}{2b} + 2.5\right) \text{ and} \quad (11)$$

$$2T_{1d}^{enh} = 634P + 16P\lceil \log_2 P \rceil + 4P\frac{N}{b}. \quad (12)$$

The following table compares all the convolution methods discussed for filters of size of 7×7, 15×15 and 31×31. Enhanced multiplication $T^{enh}$ is seen to be the fastest method to compute general convolution, achieves this at a 12-bit increase in word-length. For particular filter characteristics, other methods offer a modest advantage, but those exploiting symmetry require an even larger increment in word length (17 bits).

| | | | Filter Size | | |
|---|---|---|---|---|---|
| Method | | Word Length | 7 × 7 | 15 × 15 | 31 × 31 |
| $T_{2d}$ | α = 1 | 26 + [$\log_2 P^2$] | 1.38 | 6.56 | 30 |
| $T_{2d}$ | α = 0.5 | 26 + [$\log_2 P^2$] | 0.67 | 3.37 | 15 |
| $T_{2d}$ | α = 0.125 | 26 + [$\log_2 P^2$] | 0.2 | 0.98 | 4.38 |
| $2T_{1d}$ | α = 1 | 26 + [$\log_2 P$] | 0.35 | 0.78 | 1.68 |
| $2T_{1d}$ | α = 0.5 | 26 + [$\log_2 P$] | 0.19 | 0.41 | 0.89 |
| $2T_{1d}$ | α = 0.125 | 26 + [$\log_2 P$] | 0.064 | 0.14 | 0.3 |
| $2T_{1d}^{even}$ | α = 1 | 43 + [$\log_2 P$] | 0.21 | 0.46 | 0.98 |
| $2T_{1d}^{even}$ | α = 0.5 | 43 + [$\log_2 P$] | 0.13 | 0.27 | 0.56 |
| $2T_{1d}^{even}$ | α = 0.125 | 43 + [$\log_2 P$] | 0.071 | 0.125 | 0.235 |
| $2T_{1d}^{odd}$ | α = 1 | 43 + [$\log_2 P$] | 0.18 | 0.43 | 0.95 |
| $2T_{1d}^{odd}$ | α = 0.5 | 43 + [$\log_2 P$] | 0.11 | 0.25 | 0.54 |
| $2T_{1d}^{odd}$ | α = 0.125 | 43 + [$\log_2 P$] | 0.067 | 0.121 | 0.231 |
| $T_{2d}^{enh}$ | | 38 + [$\log_2 P^2$] | 0.55 | 2.6 | 11.5 |
| $2T_{2d}^{enh}$ | | 38 + [$\log_2 P$] | 0.16 | 0.34 | 0.72 |

Marr & Hildreth Edge Detection

This algorithm [39] detects the Zero Crossings, ZC, of the Laplacian of the Gaussian filtered image, and can be written as:

$$ZC(\nabla^2 G_\sigma * I) \tag{13}$$

where I is the original image, $G_\sigma$ is the 2-d Gaussian filter of scale $\sigma$ and $\nabla^2$ is the Laplacian operator. The M&H algorithm consists of two steps:

1. Approximate $\nabla^2 G * I$ by the Difference Of two Gaussians DOG(I).
2. Detect the ZC in the DOG(I) output.

The DOG filter has the following form:

$$DOG(x, y) = \frac{1}{2\pi\sigma_p^2} e^{-\frac{x^2+y^2}{2\sigma_p^2}} - \frac{1}{2\pi\sigma_n^2} e^{-\frac{x^2+y^2}{2\sigma_n^2}} \tag{14}$$

where $\sigma_p$ and $\sigma_n$ are the space constants of the positive and negative Gaussian respectively, and their ratio $$\frac{\sigma_p}{\sigma_n} \approx 1.6$$

for closest agreement with the Laplacian of the Gaussian ($\nabla^2 G$) operator.

Implementation of the DOG filter requires four 1-d convolutions, a row and a column convolution for each space constant. The complexity of associative DOG execution is, $$T_{dog} = 2T_{1d}(P_p) + 2T_{1d}(P_n) + T_{diff} \tag{15}$$

where $P_p$ and $P_n$ are the appropriate filter sizes for space constants $\sigma_p$ and $\sigma_n$ respectively, and $T_{diff}$ is the complexity of M-bit subtraction and borrow propagation into the sign bit. The speed of associative subtraction is the same as that of addition, hence, $$T_{diff} = 8.5M + 2. \tag{16}$$

Assuming the fastest general convolution method $T_{1d}^{enh}$, we substitute eqs. 20 and 16 with M=8 in eq. 15 to obtain, $$T_{dog} = (P_p + P_n)\left(634 + 4\frac{N}{b}\right) + 16(P_p\lceil \log_2 P_p \rceil + P_n\lceil \log_2 P_n \rceil) + 70. \tag{17}$$

$P_p$, $P_n$ and DOG complexity (in cycles and milliseconds) are tabulated below for the three filters corresponding to $\sigma = 0.5$, 1 and 2 respectively, where $P_p$ and $P_n$ are the filter vector lengths.

| $P_p$ | $P_n$ | Cycles | Time (ms) |
|---|---|---|---|
| 9 | 5 | 10658 | 0.320 |
| 19 | 11 | 23234 | 0.697 |
| 39 | 23 | 48930 | 1.468 |

The second step of the M&H algorithm, zero cross detection, operates on a 3×3 neighborhood. The center pixel is considered to be an edge point if one of the four directions (horizontal, vertical and the two diagonals) yields a change in sign. Specifically, we test if one item of a pair (about the center) exceeds a positive threshold T while the other is less than −T. The associative implementation of ZC for each space filter is outlined below.

1. Compare all pixels (resulting from the DOG function) concurrently against the thresholds T and −T, and assign two bits in memory to indicate the results.
2. Shift and write all pairs of indicator bits concurrently from the 8 neighbors of each pixel into a 16-bit field of its word in memory.
3. Use the 16-bit indicator field to test all 4 directions for a ZC and mark the edge-points.

The associative algorithm to detect zero crossings shows a time complexity of 165 cycles or 4.95 microseconds. It should be noted that the M&H algorithm generates edge points without gradient direction. This parameter can be computed by operating on a larger neighborhood (9×9) around each edge point. An associative algorithm to detect 16 segment directions (and corners) was developed and is described below. Its time complexity is 1010 cycles or 30.3 microseconds.

Canny Edge Detection

Canny's algorithm [40] has three stages:

1. Directional derivatives of Gaussian filter ($\nabla G * I$).
2. Non-maximum suppression.
3. Threshold with hysteresis.

The general form of Gaussian derivative of scale $\sigma$ in direction n is:

$$\frac{\partial}{\partial n} G_\sigma = \frac{-n}{\sqrt{2\pi}\,\sigma^3} e^{-\frac{n^2}{2\sigma^2}} \tag{18}$$

The x and y derivatives of the Gaussian filter can be obtained by convolving the image with $$\frac{\partial}{\partial x} G_\sigma \text{ and } \frac{\partial}{\partial y} G_\sigma$$

respectively. Applying the enhanced multiplication method, the execution time $2T_{1d}^{enh}$ for a typical set of filter sizes becomes:

| Filter Size (P) | Cycles | Time (ms) |
|---|---|---|
| 7 | 5222 | 0.157 |
| 15 | 11430 | 0.343 |
| 31 | 24118 | 0.724 |

Non-maximum suppression selects as edge candidates pixels for which the gradient magnitude is maximal. For optimum sensitivity, the test is carried out in the direction of the gradient. Since a 3×3 neighborhood provides only 8 directions, interpolation is used to double this number to 16. To determine if maximal, the gradient value at each pixel is compared with those on either side of it. Associative implementation requires somewhat fewer operations than that of zero-cross detection discussed earlier.

Thresholding with hysteresis eliminates weak edges that may be due to noise, but continues to trace strong edges as they become weaken. On the basis of signal statistics and an estimate of noise in the image, two thresholds on gradient magnitude are computed—low and high. Edge candidates with gradient magnitude under low are eliminated, while those above high are considered edges. Candidates with values between low and high are considered edges if they can be connected to a pixel above high through a chain of pixels above low. All other candidates in this interval are eliminated. The process involves propagation along curves.

Figure 19:
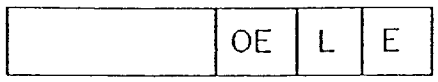
FIG. 19 is a simplified block diagram illustrating an implementation of a method of thresholding utilizing the apparatus of FIG. 11.

Associative implementation (Listing 3) uses three flags as shown in FIG. 19: E, which initially marks candidates above high threshold (unambiguous edge points), and at the end designates all selected edge points; OE (Old Edges) to keep track of confirmed edges at the last iteration; and L to designate candidates above low. At every iteration, each L candidate is examined to see if at least one of its 8-neighbors is an edge, in which case it is also declared an edge by setting E. Before moving E into OE, the two flags are compared to see if steady state has been reached, in which case the process terminates.

LISTING 3: Curve Propagation

```
main()
{
    /* ... declarations */
    letm d(OE); letc; setag; write; /* clear OE */
    letmc d(E); setag; compare; letmc d(OE); write; /* copy E into OE */
    while ( rsp )
    {
        letmc d(E); setag; compare; /* load Tag with E */
        /* OR the three northern unambiguous edges into E */
            shiftag(-b); shiftag(-1); write;
            shiftag(1); write; shiftag(1); write;
            save_new_edges();
        /* OR the left and right unambiguous edges into E */
            shiftag(1); write; shiftag(-1); shiftag(-1); write;
            save_new_edges();
        /* OR the three southern unambiguous edges into E */
            shiftag(b); shiftag(1); write;
            shiftag(-1); write; shifhtag(-1); write;
            save_new_edges();
        letm d(OE); letc; compare; setc; write;
    }
}
/* Find new edges by ANDing L into E */
save_new_edges()
{
    setag; compare; letc; write;
    letmc d(L); compare; letmc d(E); write;
}
```

Program time complexity is given by, $$T_{pro} = I\left(23.5 + \frac{N}{b}\right) \quad (19)$$

where I is the number of iterations, 23.5 is the time to examine the state of 8 neighbors, and N/b accounts for long shifts to bring in edge points from neighboring rows. The upper bound of 1, given by the longest propagation chain, is nearly $N^2/2$, but for a representative value of 100 iterations the complexity of curve propagation becomes 3950 cycles or 119 microseconds.

Thinning

The propagation algorithm presented above produces a curve that may not be thin. A multi-pass thinning algorithm is proposed, consisting of a pre-thinning phase and an iterative thinning phase. Referring to FIG. 20A–20E, the pre-thinning phase fills a single gap by applying template (a), and removes some border noise by clearing point P if one of templates b,c or d holds. Multi-pass implies that the templates are applied first in the north direction, then in the south, east and west directions, in succession—except for template (a) which is fully symmetrical and need only be applied once. All templates are shown in the north direction and use an X to denote a "don't care" (ONE or ZERO). Similarly, the thinning phase tests templates e,f and g in each of the 4 directions successively, and clears point P when agreement is found. This 4-pass sequence is iterated until there is no further change. Particularly worthy of note is the quality of the skeleton produced by this simple local process. The most precise definition of a skeleton is based on the medial axis. Davids and Plummer [41] proposed a very elaborate algorithm to produce such a skeleton, and chose 8 images for testing it. Our thinning algorithm was applied to these images and produced interesting results: the skeletons agree virtually exactly with those of Davids and Plummer; any discrepancy, not at an end-point, occurs at a point of ambiguity and constitutes an equally valid result. The removal of border noise in the prethinning phase prevents the formation of extraneous spurs in the skeleton. Time complexity of the algorithm is given by, $$T_t = 70 + \frac{5N}{b} + I\left(150 + \frac{4N}{b}\right),$$

where the first two terms account for the prethinning phase. Execution times are 150 cycles (4.5 $\mu$s) for prethinning and 214 cycles (6.4 $\mu$s) per thinning iteration. For edge thinning 3 iterations will suffice, giving a completion time of 24 microseconds.

Single-pass thinning was considered and found to be rather critical. The algorithm proposed by Chin et alia [42] appears to be optimal, yet it does not yield an ideal skeleton, and application of their own preliminary phase of noise-trimming leads to amputation of some main branches during thinning.

Stereo Vision

Stereo vision must solve the correspondence problem: for each feature point in the left image, find its corresponding point in the right image, and compute their disparity. Since stereo has been a major research topic in computer vision over the past decade, a large number of approaches have been proposed, too many to attempt to implement them all associatively. Instead, we concentrate on the Grimson [43] algorithm. This also has some similarity with the hierarchical structure of human vision, and it can use its input edges producted by the M&H or Canny edge detection schemes discussed above.

Assume edge detection was carried out on both the left and the right image, and the results are sitting side by side in memory. The edge points are marked and their orientation given to a 4-bit precision over $2\pi$ radians or a resolution of 22.5 degrees. The stereo process uses the left image as reference, and matches edge points with gradient of equal sign and roughly the same orientation. Edge lines near the horizontal (within ±33.75 degrees) are excluded in order to minimize disparity error. The Grimson algorithm consists of the following steps:

Locate an edge-point (of acceptable orientation) in the left image.

Divide the region about the corresponding point in the right image into three pools.

Assign a match to the edge-point based on the potential matches within the pools.

Disambiguate any ambiguous matches.

Assign disparity values.

The associative memory word format for the matching process is given below. Input fields DL, DR label edge points of the left and right images, respectively, while DIR_L, DIR_R give their orientations. The resulting value of disparity will be recorded in output field DISP. The associative algorithm is outlined in FIG. 21.

Search the neighborhood of ±W pixels divided into three pools, A, B and C, where pools A and C are equal in size and represent the divergent and convergent regions, respectively. The smaller pool B, is the region about zero disparity.

Shift fields DIR_R and DR (of the right image) W word positions down (corresponding to a shift in the right image of W pixels to the right).

For edge points (DR,DL=1), compare field DIR_R against DIR_L within a tolerance of ±1. After each comparison, shift the right image fields up one word position, until position+W is reached. The results of the comparison are registered in fields PX and TX (X=A,B or C). A PX value of 00 indicates no match, 01 indicates one match, and 11 more than one match in pool X. The TX fields temporarily store disparity in each pool for use in case of ambiguity. Note that disparity is the net shift of the right image at the time the match was found.

Edge points with unambiguous disparity (01 in some PX, 00 in all PY where Y≠X) are selected and their disparity assigned in field DISP (DISP:=TX).

An attempt is made to disambiguate matches in more than one pool by use of the dominant disparity in the neighborhood. If there is a dominant pool in the neighborhood, and the ambiguous point has a potential match in the same pool, then that is chosen as the match. Otherwise, the match at that point remains ambiguous. To test a neighborhood for dominant disparity we start by counting all its edge points (field DL) into the COUNT field. Then, for each pool in turn, we count into field COUNT_P just its unambiguous matches over the same neighborhood. If COUNT_P>COUNT/2 the pool is dominant and a match in the same pool will have its disparity copied from TX into DISP. If no pool is dominant or there is no match in the dominant pool, DISP will not be updated and the point in question will stay marked as ambiguous in bit MR.

The last step tests whether disparity is within range. Marr & Poggio show that for a region within range, more than 70 percent of its edge points will be matched. Unmatched edge points are labeled in MR and counted over the neighborhood into field COUNT_P. If COUNT_P>COUNT/4, all edge points in the neighborhood are labeled as unmatched and their disparity cleared.

The time complexity of the associative stereo algorithm is given by, $$T_{stereo}=T_{sh}+T_{mat}+T_{dis}+T_{or} \tag{20}$$

where $T_{sh}$ accounts for shifting the right image, $T_{mat}$ is the time to evaluate matches within the pools, $T_{dis}$ the disambiguation time, and $T_{or}$ the time to find and remove out-of-range disparity. The shift time in cycles is given by, $$T_{sh} = 2 \times 5\left(3 + \frac{W-1}{2}\right) + 5 \times 3 \times 2W + (2 + 8W) \tag{21}$$

The first term accounts for the initial and final W-place shift-up of fields DR, DIR_R (5 bits). The second term covers the one-place shift-down between successive matching operations. And the last term is due to the generation and update of a border flag for handling row end effects. Consider now the matching complexity $T_{mat}$. It requires an 8-cycle comparison for every disparity (2W+1) and every orientation (10) with a tolerance of ±1. Hence $$T_{mat}=8\times3\times10(2W+1)+13.5 \tag{22}$$

where the second term accounts for final processing of the comparison results.

The disambiguation process consists of the following steps:
 Count the edge points over every L×L neighborhood.
 For each of three pools:
  Count the unambiguous matches over the same neighborhoods.
  Compare this result to half the edge count.
  Copy disparity from match in dominant pool.
Hence we may write, $$T_{dis}=T_{cnt}+3(T_{cnt}+T_{gt}+T_{cpy}+3.5) \tag{23}$$

where $T_{cnt}$ is the time to count labeled pixels over a neighborhood, $T_{gt}$ to compare for greater than, and $T_{cpy}$ to copy disparity, respectively. $T_{cnt}$ is the subject of the next section, while the other two are given by, $$T_{gt}=1+4.5(\lceil\log_2 L^2\rceil-1) \tag{24}$$

$$T_{cpy}=4+2(\lceil\log_2 L^2\rceil-1) \tag{25}$$

The disambiguation algorithm is listed below.
LISTING 4: Attempt to Resolve Ambiguous Matches

```
count_flag_to_field(DL,COUNT); /* count edge points in L X L neighborhood */
for(pool=PA; pool <= PA+4; pool+=2)
    { /* Flag unambiguous points in TEMP */
      letm d(TEMP); letc; setag; write; /* clear TEMP */
      letm dseq(PA,PA+5); letc d(pool); setag; compare;
      letmc d(TEMP); write;
      count_flag_to_field(TEMP,COUNT_P);
      /*********** Test if COUNT_P > COUNT/2 ***************/
      letm d(TEMP); letc; setag; write; /* clear TEMP */
      /* Starting with COUNT_P+2k-2, compare bit i of COUNT_P to bit i+1 of
         COUNT. COUNT_P+2k-1 used as GTF */
      for(bit_count=2*k-2; bit_count>=0; bit_count--)
        { next_bit = COUNT + bit_count + 1;
          next_bit_p = COUNT_P + bit_count;
          letm d(MARK) d(TEMP) d(GTF) d(next_bit) d(next_bit_p);
          letc d(MARK) d(next_bit); setag; compare;
          letc d(MARK) d(TEMP) d(next_bit); write;
          letc d(MARK) d(next_bit_p); setag; compare;
          letc d(MARK) d(GTF) d(next_bit_p); write;
        }
```

-continued

```
/********** Copy disparity of dominant pool to DISP **************/
letmc d(GTF); setag; compare;
letm dseq(DISP,DISP+k-1); letc; write; /* clear DISP field marked by GTF */
letmc d(GTF) d(MARK) d(pool); setag; compare;
letc d(GTF) d(pool); write; /* clear MARK of disambiguated points */
for(bit_count=0; bit_count<k; bit_count++)
    { letmc d(GTF) d(2*(Pool-PA)+TA+bit_count); setag; compare;
      letmc d(DISP+bit_count); write;
    }
}
```

Lastly, the time to test and register out-of-range disparity is given by, $$T_{or} = 4.5 + T_{cnt} + T_{lt} + T_{rm} \quad (26)$$

where the constant term accounts for grouping unmatched edge points and labelling them in MR; $T_{cnt}$ is the time to count the unmatched edge points over the neighborhood; $T_{lt}$ covers comparison of this count to ¼ the number of edge points in the neighborhood; and $T_{rm}$ is the time to label and clear disparity of edge points in out-of-range neighborhoods.

$$T_{lt} = 3 + 4.5(\lceil \log_2 L^2 \rceil - 2) \quad (27)$$

$$T_{rm} = 2L^2 + \frac{3N-b}{4b}(L-1) + 0.5 \quad (28)$$

Stereo matching is performed for each of the spatial frequency channels. From the Marr and Poggio [44] model of stereo vision, $$W = P \text{ and } L = 2W+1$$

where P is the filter size (vector length) of the channel. If we choose P of the form $2^i - 1$, then L has the same form, $$L = 2^{i+1} - 1 = 2^k - 1 \text{ with } k = \log_2(L+1)$$

Substituting 21–28 into equation 20, using the relations between P, W and L, and applying the above definition of k, we obtain, $$T_{stereo} = 5T_{cnt} + 2L^2 + \left(1025 + \frac{3N}{b}\right)\left(\frac{L-1}{4}\right) + 48k + \frac{575}{2}. \quad (29)$$

The algorithm complexity excluding neighborhood counts, is tabulated below in cycles and milliseconds for three channels of spatial frequency.

| P = W | L = 2W + 1 | Cycles | Time (ms) |
|---|---|---|---|
| 7 | 15 | 4753 | 0.143 |
| 15 | 31 | 10645 | 0.319 |
| 31 | 63 | 25453 | 0.764 |

We now consider the problem of counting labeled pixels over a sizable neighborhood, a function that is executed five times during stereo evaluation, hence could come to dominate its time complexity.
Linear Summation
The straightforward approach to count labeled pixels over a neighborhood about each pixel would be to provide a count field in each word and let the neighboring labels increment it as they are entered in some convenient sequence. For an L×L neighborhood the maximum count is $L^2$, and for L odd, the count field length is $2\log_2 L$. The program listing follows, where "flag" labels the pixels to be counted, and "field" points to the beginning (LSB) of the count field. The word format is in FIG. 22.

LISTING 5: Linear Summation Over L×L with L Odd

```
count_flag_to_field(flag,field)
int flag, field;
{ /* . . . declarations */
    letm d(TEMP) d(CY) dseq(field,field-1+ceiling(Log2(L*L)));
    letc; setag; write; /*clear count field, TEMP & Carry*/
/* Shift flag (L-1)/2 lines and columns down and enter in TEMP */
    letmc d(flag); setag; compare;
    for(index=0; index<(L-1)/2; index++) {shiftag(1); shiftag(b);}
    letmc d(TEMP) d(CY); write; /* move flag to TEMP & Carry*/
    for(line_count=0; line_count<L; line_count++)
        { for (pixel_count=0; pixel_count<L; pixel_count++)
            { for(bit=field; bit<field+ceiling(Log2(L*L)); bit++)
                { letm d(bit) d(CY); /* increment COUNT */
                  letc d(CY); setag; compare; letc d(bit); write;
                  letc d(bit) d(CY); setag; compare; letc d(CY); write;
                }
              if(pixel_count < L-1)
                { letmc d(TEMP); setag; compare; letc; write;
                  if(BIT(0) OF_WORD line_count) shiftag(1);
                  else shiftag(-1);
                  letmc d(TEMP) d(CY); write;
                }
            }
          if (line_count<L-1)
            { letmc d(TEMP); setag; compare; letc; write;
    shiftag(-b); letmc d(TEMP) d(CY); write;
            }
}
```

Execution time in machine cycles is given by, $$T_{cnt1} = \frac{3N-b}{4b}(L-1) + (3+9k)L^2 \quad (30)$$

where $k = \log_2(L+1)$, hence it grows as $L^2 \log L$. Incorporation of this program in the stereo algorithm completely swamps its execution time, which, for the coarsest channel, now exceeds video frame time. This is illustrated in the following table, which gives all times in milliseconds. For the sake of comparison, stereo execution time excluding neighborhood counts is repeated here under $T_{st-cnts}$.

| L | $T_{cnt1}$ | $T_{st-cnts}$ | $T_{stereo}$ |
|---|---|---|---|
| 15 | 0.25 | 0.14 | 1.4 |
| 31 | 1.39 | 0.32 | 7.3 |
| 63 | 6.81 | 0.76 | 34.8 |

2-d Summation

In the linear summation program, every row of L labels was actually counted L times, once in each of the vertically overlapping neighborhoods. By taking advantage of the two-dimensional structure of the neighborhood, the count may be carried out in two stages: first the neighboring labels within each row are tallied up, and then the vertically neighboring row sums are accumulated as they are entered in some convenient sequence. That requires an additional "rows" field of length log L, and yields the following program, where the word format is as in FIG. 23 and $$k_r = [\log_2 L] \text{ and } k_c = [\log_2 L^2]$$

LISTING 6: 2-d Summation Over L×L with L Odd

Execution time in machine cycles is given by, $$T_{cnt2} \approx \left(\frac{N+15b}{4b} + 4k_c + \frac{N+23b}{2b}k_r\right)(L-1).$$

For our case, in which the filter vector lengths were chosen to be of the form $2^i - 1$, it was shown earlier that L is also of the form $2^k - 1$. Hence we may write, $$k_r = k = \log_2(L+1) \text{ and } k_c = 2k$$

and $T_{cnt2}$ becomes, $$T_{cnt2} \approx \left(\frac{N+15b}{4b} + \frac{N+39b}{2b}k\right)(L-1). \tag{31}$$

Execution time now grows as L log L. This count algorithm brings stereo complexity well within real-time video limits,

```
count_flag_to_field(flag,field)
int flag, field;
{ /* . . . declarations */
    letm d(cy) dseq(rows,flag-1); letc; setag; write; /* clear cy, rows & count fields */
    /* Shift flag (L-1)/2 lines & columns down into "field" */
    letmc d(flag); setag; compare;
    for(index=0; index<(L-1)/2; index++) {shiftag(1); shiftag(b);}
    tmp_cnt=field+kc-1; /* pointer */
    /* Move flag to "tmp_cnt", "rows" and "field" to avoid the first row summation */
    letmc d(tmp_cnt) d(field) d(rows); write;
    /***************** Rows Summation ****************/
    for (shift_count=0; shift_count<L-1; shift_count++)
      { /* Shift "tmp_cnt" up and enter into "tmp_cnt" and "cy" */
        letmc d(tmp_cnt); setag; compare; letc; write;
        letmc d(tmp_cnt) d(cy); shiftag(-1); write;
        for(bit_count=0; bit_count<kr; bit_count++)
          { /* Increment rows and count fields */
            rows_next=rows+bit_count;
            field_next=field+bit_count;
            letm d(rows_next) d(field_next) d(cy);
            letc d(cy); setag; compare; letc d(rows_next) d(field_next); write;
            letc d(rows_next) d(field_next); d(cy); setag; compare; letc d(cy); write;
          }
      }
    /***************** Columns Summation ****************/
    letm d(tmp_cnt); letc; setag; write; /* clear "tmp_cnt" */
    for(shift_count=0; shift_count<L-1; shift_count++)
      {
        for(bit_count=rows; bit_count(rows+kr; bit_count++)
          { letmc d(bit_count); setag; compare; letc write;
            letc d(bit_count); shiftag(-b); write;
          }
        /* count field <-- count field + rows field */
        for(bit_count=0; bit_count<kr; bit_count++)
          { rows_next=rows+bit_count;
            field_next=field+bit_count;
            letm d(field_next) d(cy) d(rows_next);
            letc d(cy); setag; compare; letc d(field_next); write;
            letc d(field_next) d(cy); setag; compare; letc d(cy); write;
            letc d(field_next) d(rows_next); setag; compare; letc d(cy) d(rows_next) ; write;
            letc d(rows_next); setag; compare; letc d(field_next) d(rows_next); write;
          }
        /**** propagate carry *****/
        letc d(cy);
        while(++field_next < field+kc )
          { letm d(field_next) d(cy); setag; compare; letc d(field_next); write;
            letc d(field_next) d(cy); setag; compare; letc d(cy); write;
          }
      }
}
``` as indicated by the following table, listing execution times in milliseconds.

| L | $T_{cnt2}$ | $T_{st-cnts}$ | $T_{stereo}$ |
|---|---|---|---|
| 15 | 0.050 | 0.14 | 0.39 |
| 31 | 0.131 | 0.32 | 0.97 |
| 63 | 0.321 | 0.76 | 2.37 |

2-d Tree Summation

Although 2-d summation reduces stereo time complexity sufficiently to meet real-time requirements, the question arises whether this result is optimal or can be improved significantly. While retaining the two-dimensional summation approach (first by rows and then by columns), consider handling each dimension in binary tree fashion, summing elements in pairs, then pairing results and adding again until the dimension is covered. Since L is of the form $2^k-1$, an extra row and column are added to complete the tree. The extra element denoted by "tail", is remembered and subtracted from the sum, hence a k-bit "tail" field is provided for temporary storage of the extra row sum. The program listing is given below. The word format is in FIG. 24.

LISTING 7: 2-d Summation Over L×L with L Odd

```
count_flag_to_field(flag,field)
int flag, field;
{ /* . . . declarations */
    letm dseq(tail,flag-1); letc; setag; write; /* clear count & tail fields */
    /* Shift flag (L+1)/2 rows & columns down into "tail" and "field" */
    letmc d(flag); setag; compare;
    for(index=0; index<(L+1)/2; index++) {shiftag(1); shiftag(b);}
    letmc d(tail) d(field); write; /* enter flag in "tail" and "field" */
    /******************** Rows Summation *****************/
    tree_step=0;
    for(shift_count=1; shift_count<=(L+1)/2; shift_count*=2)
        { cy = field+tree_step+1;
          for(bit_count=field; bit_count<cy; bit_count++)
            { letm d(tmp); letc; setag; write; /* clear tmp */
              letmc d(bit_count); setag; compare;
              for(index=0; index<shift_count; index++) shiftag(-1);
              letmc d(tmp); write; /* move flag to tmp */
              add_bits(tmp,bit_count,cy);
            }
          tree_step++;
        }
    /*** Subtract "tail" from row sum, write results into tail field ***/
    letm d(tmp); letc; setag; write; /* clear tmp (use it as borrow) */
    letm d(temp) d(tail); letc d(temp); write;
    for(bit_count=0; bit_count<k+1; bit_count++)
        { letmc d(tmp) d(field+bit_count); setag; compare; letc; write;
          letc d(tmp); setag; compare; letc d(tmp) d(field+bit_count); write;
          letmc d(field+bit_count); setag; compare; letmc d(tail+bit_count); write;
        }
    /***************** Columns Summation ***************/
    tree_step=0;
    for(shift_count=1; shift_count<=(L+1)/2; shift_count*=2)
        { cy = field+k+tree_step;
          for(bit_count=field; bit_count<cy; bit_count++)
            { letm d(tmp); letc; setag; write; /* clear tmp */
              letmc d(bit_count); setag; compare;
              for(index=0; index<shift_count; index++) shiftag(-b);
              letmc d(tmp); write; /* move flag to tmp */
              add_bits(tmp,bit_count,cy);
            }
          tree_step++;
        }
    /*** Subtract tail field from summation ***/
    letm d(tmp); letc; setag; write; /*clear temp*/
    for (bit_count=0; bit_count<k; bit_count++)
        { letm d(tail+bit_count) d(field+bit_count) d(tmp);
          letc d(tail+bit_count); setag; compare;
          letc d(tail+bit_count) d(field+bit_count) d(tmp); write;
          letc d(field+bit_count) d(tmp); setag; compare; letc; write;
          letc d(field+bit_count) d(tail+bit_count); setag; compare;
          letc d(tail+bit_count); write; letc d(tmp); setag; compare;
          letc d(field+bit_count) d(tmp); write;
        }
    /** propagate borrow **/
    for(; bit_count(2*k; bit_count++)
        { letmc d(field+bit_count) d(tmp); setag; compare; letc ; write;
          letc d(tmp); setag; compare; letc d(field+bit_count) d(tmp); write;
        }
}
/******* ADD BITS FUNCTION *******/
add_bits(tmp,bit_count,cy)
int tmp, bit_count, cy;
```

```
{ letm d(bit_count) d(tmp) d(cy);
    letc d(cy) ; setag; compare; letc d(bit_count) ; write;
    letc d(cy) d(bit_count) setag; compare; letc d(cy) ; write;
    letc d(tmp) d(bit_count); setag; compare; letc d(cy) d(tmp) ; write;
    letc d(tmp); setag; compare; letc d(tmp) d(bit_count); write;
}
```

Execution time is given by, $$T_{cnt2t} = \frac{27}{2} + \frac{37}{2}k + \frac{69k}{4}(k+1) +$$

$$\frac{(N+b)}{4b}(L+1) + \frac{1}{2}\sum_{i=0}^{k-1}(i+1)2^i + \frac{N}{2b}\sum_{i=0}^{k-1}(i+k)2^i$$

and since $$\sum_{i=0}^{k-1} i2^i = 2(k2^{k-1} - 2^k + 1),$$

$$T_{cnt2t} = \tag{32}$$

$$14 + \frac{N}{4b} + \left(\frac{143}{4} + \frac{N}{2b}\right)k + \frac{69}{4}k^2 + (2k-1)2^{k-2} + \frac{NL}{4b}(4k-3).$$

The results are tabulated below for the three channels defined earlier.

| L  | $T_{cnt2t}$ | $T_{st-cnts}$ | $T_{stereo}$ |
|----|-------------|---------------|--------------|
| 15 | 0.038       | 0.14          | 0.33         |
| 31 | 0.085       | 0.32          | 0.75         |
| 63 | 0.191       | 0.76          | 1.72         |

Count complexity is still seen to grow as L log L in equation 32, but the table indicates an improvement of 40 percent over 2-d summation (for the largest neighborhood), and a resulting improvement in stereo complexity of 27.5 percent. The improvement stems mostly from the fact that at each level of the tree, arithmetic is carried out just to the precision required, which is known in advance.

Discussion of Stereo Results

Figure 25:
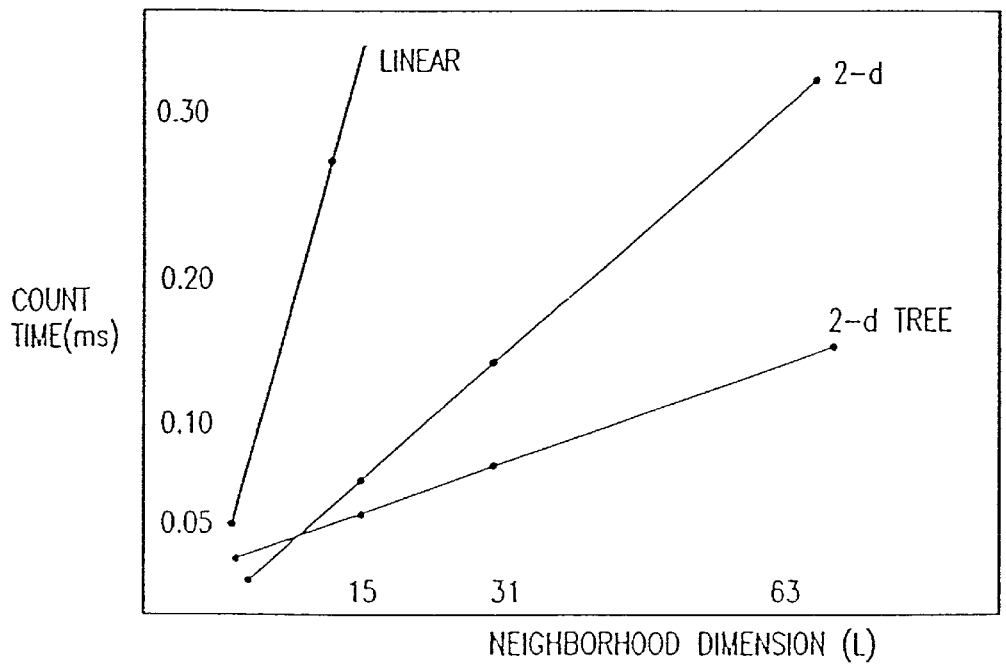
FIG. 25 is a graphical illustration of comparative execution time for alternative implementations of a stereo method utilizing the apparatus of FIG. 11.
Figure 26:
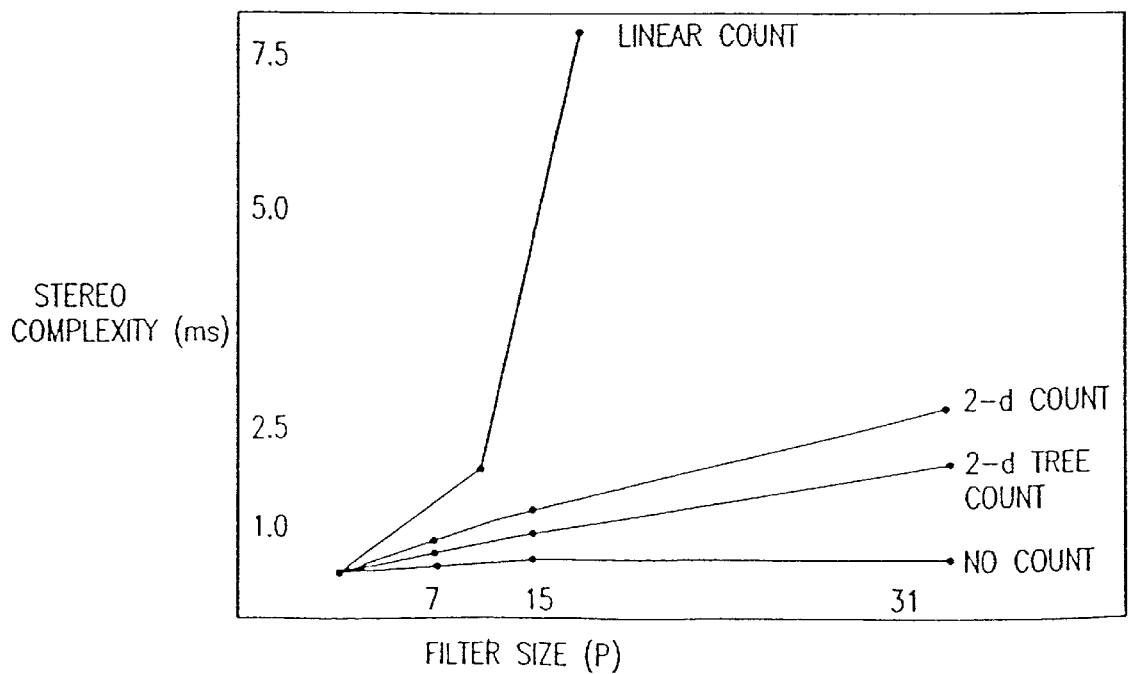
FIG. 26 is graphical illustration of comparative complexity for alternative implementations of a stereo method utilizing the apparatus of FIG. 11.

Real time stereo vision by associative processing was considered and the problematic function was identified as the counting of labeled pixels over a large neighborhood. This function occurs four times in the resolution of ambiguous matches, and once in the handling of out-of-range disparity. Implementation of the count function in a straightforward (linear) manner pushes stereo execution time beyond real-time (video) limits. It was shown how associative array and tree techniques can be applied to great advantage; indeed, they bring stereo complexity well within real-time limits. To illustrate the results graphically, we present two comparative plots. FIG. 25 gives execution time as a function of neighborhood dimension for the three implementations described: the linear, the two-dimensional, and the two-dimensional tree. FIG. 26 presents stereo complexity without neighborhood counts, and with neighborhood counts by each of the three methods, all as a function of neighborhood dimension.

Optical Flow

Optical flow assigns to every point in the image a velocity vector which describes its motion across the visual field. The potential applications of optical flow include the areas of target tracking, target identification, moving image compression, autonomous robots and related areas. The theory of computing optical flow is based on two constraints: the brightness of a particular point in the image remains constant, and the flow of brightness patterns varies smoothly almost everywhere. Horn & Schunck [45] derived an iterative process to solve the constrained minimization problem. The flow velocity has two components (u, v). At each iteration, a new set of velocities ($u^{n+1}$, $v^{n+1}$) can be estimated from the average of the previous velocity estimates ($\bar{u}^n$, $\bar{v}^n$) by, $$u^{n+1} = \bar{u}^n - E_x[E_x\bar{u}^n + E_y\bar{v}^n + E_t]/(\alpha^2 + E_x^2 + E_y^2),$$
$$u^{n+1} = \bar{v}^n - E_y[E_x\bar{u}^n + E_y\bar{v}^n + E_t]/(\alpha^2 + E_x^2 + E_y^2) \tag{33}$$

where α is a weighting factor dependent on noise in the measurement. The partial derivatives $E_x$, $E_y$ and $E_t$ in (33) are estimated as an average of four first differences taken over adjacent measurements in a cube, $$Ex \approx \frac{1}{4}[E_{i,j+1,k} - E_{i,j,k} + E_{i+1,j+1,k} - E_{i+1,j,k} + E_{i,j+1,k+1} - \tag{34}$$

$$E_{i,j,k+1} + E_{i+1,j+1,k+1} - E_{i+1,j,k+1}]$$

$$Ey \approx \frac{1}{4}[E_{i+1,j,k} - E_{i,j,k} + E_{i+1,j+1,k} - E_{i,j+1,k} + E_{i+1,j,k+1} -$$

$$E_{i,j,k+1} + E_{i+1,j+1,k+1} - E_{i,j+1,k+1}]$$

$$Et \approx \frac{1}{4}[E_{i,j,k+1} - E_{i,j,k} + E_{i+1,j,k+1} - E_{i+1,j,k} + E_{i,j+1,k+1} -$$

$$E_{i,j+1,k} + E_{i+1,j+1,k+1} - E_{i+1,j+1,k}].$$

$E_{i,j,k}$ is the pixel value at the intersection of row i and column j in frame k. Indices i,j increase from top to bottom and left to right, respectively. Local averages $\bar{u}$ and $\bar{v}$ in (33) are defined as follows:

$$\bar{u}_{i,j,k} = \frac{1}{6}[u_{i-1,j,k} + u_{i,j+1,k} + u_{i+1,j,k} + u_{i,j-1,k}] + \tag{35}$$

$$\frac{1}{12}[u_{i-1,j-1,k} + u_{i-1,j+1,k} + u_{i+1,j+1,k} + u_{i+1,j-1,k}]$$

$$\bar{v}_{i,j,k} = \frac{1}{6}[v_{i-1,j,k} + v_{i,j+1,k} + v_{i+1,j,k} + v_{i,j-1,k}] +$$

$$\frac{1}{12}[v_{i-1,j-1,k} + v_{i-1,j+1,k} + v_{i+1,j+1,k} + v_{i+1,j-1,k}]$$

There is the practical matter of how to interlace the iterations with the time steps. A good initial guess for the optical flow velocities is usually available from the previous time step (video frame time). In the case of high speed motion, one iteration per time step may not be enough to get a stabilized value of optical flow, and there is a necessity to iterate several times before advancing to the next frame.

To implement the above equations associatively, the memory word was partitioned into multiple fields, each holding input data, output data, or intermediate results. The format is given in FIG. 27.

The flow is computed from two successive video frames: $E_n$ and $E_{n1}$. Each frame contains 512×512 pixels whose grey level is given to 8-bit precision. During vertical blanking (time interval between frames), the current image is moved to $E_{n1}$, and a new image from the I/O buffer array (FIG. 15) is written into field $E_n$. During the frame time, one or more iterations of the algorithm are executed, enough to obtain a reasonable approximation of the optical flow for use with the next frame.

Equation 33 can be rewritten as, $$u^{n+1} = \bar{u}^n - D_x(E_x\bar{u}^n + E_y\bar{v}^n + E_t)$$

$$v^{n+1} = \bar{v}^n - D_y(E_x\bar{u}^n + E_y\bar{v}^n + E_t), \quad (36)$$

where $D_x = E_x/P$, $D_y = E_y/P$ and $P = \alpha^2 + E_x^2 + E_y^2$. It will be noted that the partial derivatives $E_x$, $E_y$ and $E_t$, as well as $D_x$ and $D_y$, remain fixed during a given frame and are not involved in the iterative process between frames. Hence computation of these parameters is referred to as the "fixed part" of the algorithm.

Fixed Part

The first stage computes the partial derivatives $E_x$, $E_y$ and $E_t$.

Clear fields $E_x$, $E_y$ and $E_t$.

Shift $E_n$, $E_{n1}$ one row up and one column to the left (N+1 words up) to furnish $E_{i+1,j+1,n}$ and $E_{i+1,j+1,n+1}$.

Enter $E_{n+1}$ into $E_x$, $E_y$, $E_t$; add or subtract $E_n$ into the derivative fields as indicated in the following table, step 2.

Shift $E_n$, $E_{n1}$ one column to the right (one word down), to furnish $E_{i+1,j,n}$ and $E_{i+1,j,n+1}$.

Accumulate $E_n$, $E_{n1}$ as shown in the following table, steps 3,4:

| Shift Positions of Input Images | Operation $E_x$ | $E_y$ | $E_t$ | Order Of Execution |
|---|---|---|---|---|
| $E_{i+1,j+1,n+1}$ | + | + | + | 1 |
| $E_{i+1,j+1,n}$ | + | + | − | 2 |
| $E_{i+1,j,n}$ | − | + | − | 3 |
| $E_{i+1,j,n+1}$ | − | + | + | 4 |
| $E_{i,j,n}$ | − | − | − | 5 |
| $E_{i,j,n+1}$ | − | − | + | 6 |
| $E_{i,j+1,n}$ | + | − | − | 7 |
| $E_{i,j+1,n+1}$ | + | − | + | 8 |

Shift $E_n$, $E_{n1}$ one row (N words) down, and accumulate as shown in the above table, steps 5, 6.

Shift $E_n$, $E_{n1}$ one column to the left (one word up) and accumulate as shown in the above table, steps 7, 8.

Shift $E_n$, $E_{n1}$ to their original position (one word down). The next stage in is to evaluate $D_x$ and $D_y$:

Use a look up table to compute $\alpha^2 + E_x^2$, enter it in field $S_c$.

Use another look up table to compute $E_y^2$, enter it in field $A_c$.

Add field $A_c$ into field $S_c$ to obtain P.

Divide field $E_x$ by field $S_c$ placing the quotient in field U.

Divide field $E_y$ by field $S_c$ placing the quotient in field V.

Copy $D_x$ from field U to the right side (9 least significant bits) of field $S_c$.

Copy $D_y$ from field V to the left side of field $S_c$.

Before executing another division, the dividend $E_x$ or $E_y$ is ZERO extended to the left for proper scaling with respect to divisor P. It then follows from $\alpha > 0$ that $D_x$, $D_y < 1$, hence the quotient will not overflow. The complexity of the "fixed part" was evaluated as, $$T_{fix} = 1829 + \left(337 + \frac{2N}{b}\right)M + 64M^2. \quad (37)$$

Iterative Part

Compute local average of u component (field U) as prescribed in equation 44, and place the result $(\bar{u})$ in field $U_{av}$. The neighboring values of u are accessed by shifting the U-field up and down in an optimal sequence and summing into field $A_c$. The 4-neighbors are given double weight by adding them in one place to the left. The value accumulated in $A_c$ is divided by 3 and the result placed in field $U_{av}$.

Similarly, compute local average of v component (field V) as prescribed in equation 44 and place the result $(\bar{v})$ in field $V_{av}$.

Copy $E_t$ into field $A_c$ with sign extension.

Multiply $E_x$ by $U_{av}$ placing the product in field U.

Add field U into field $A_c$

Multiply $E_y$ by $V_{av}$ placing the product in field $A_c$.

Add field U into field $A_c$ to obtain the term $E_x\bar{u} + E_y\bar{v} + E_t$.

Multiply field $A_c$ by the right side of field $S_c$ to obtain $D_x[E_x\bar{u} + E_y\bar{v} + E_t]$. Place the result in field U.

Multiply field $A_c$ by the left side of field $S_c$ to obtain $D_y[E_x\bar{u} + E_y\bar{v} + E_t]$. Place the result in field V.

Compute the u component of optical flow by evaluating $U_{av} - U$ into field U.

Compute the v component of optical flow by evaluating $V_{av} - V$ into field V.

The complexity of this part in machine cycles per iteration is given by, $$T_{itr} = 809 + 372M + 34M^2 + \frac{4N}{b}(M+1) \quad (38)$$

Hence the overall complexity of optical flow can now be evaluated as, $$T_{OF} = T_{fix} + IT_{itr} = 1829 + \left(337 + \frac{2N}{b}\right)M + 64M^2 + I\left[809 + 372M + 34M^2 + \frac{4N}{b}(M+1)\right] \quad (39)$$

where I denotes the number of iterations required for the flow to converge. Evaluating the above expression, the fixed part takes 266 μs., and each iteration requires an additional 196 μs. The execution time for different values of I is given in the following table:

| I Iter. | Cycles | Time (ms) |
|---|---|---|
| 1 | 15222 | 0.46 |
| 8 | 60981 | 1.84 |

-continued

| I Iter. | Cycles | Time (ms) |
|---|---|---|
| 16 | 113277 | 3.40 |
| 32 | 217869 | 6.54 |

Mid-Level Vision

Detection of Corners and Line Direction

An important feature for middle and higher level processing is the ability to distinguish corners and line direction. In the case of Canny Edge Detection, line orientation was generated during the process. On the other hand, the M&H algorithm is not directional, and the edge bit-map it produces must be further processed to detect line orientation. We proposed to use the edge bit-map of a 9×9 neighborhood around each pixel to distinguish segment direction. The resulting algorithm can discriminate 120 different lines and corners. The approach is outlined below.

Figures 27, 30:
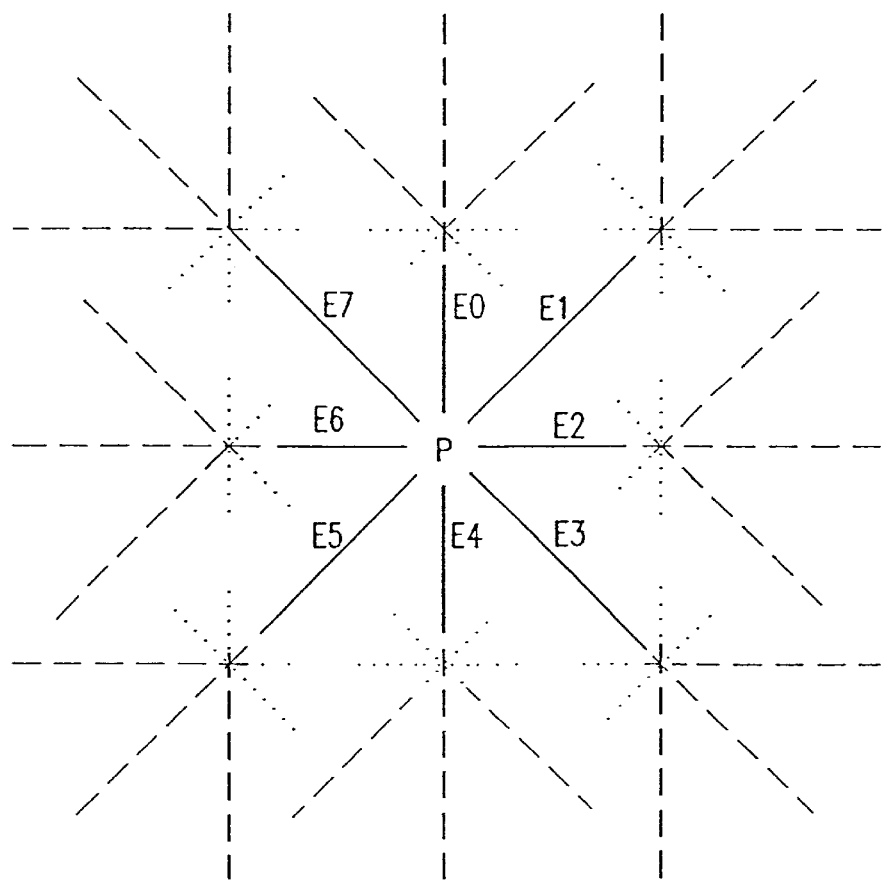
FIG. 27 is a simplified block diagram illustrating another word format of associative memory within a portion of the apparatus of FIG. 11.
FIG. 30 is a simplified pictorial illustration of pixels used within a method for processing an associative saliency network utilizing the apparatus of FIG. 11.
Figure 28:
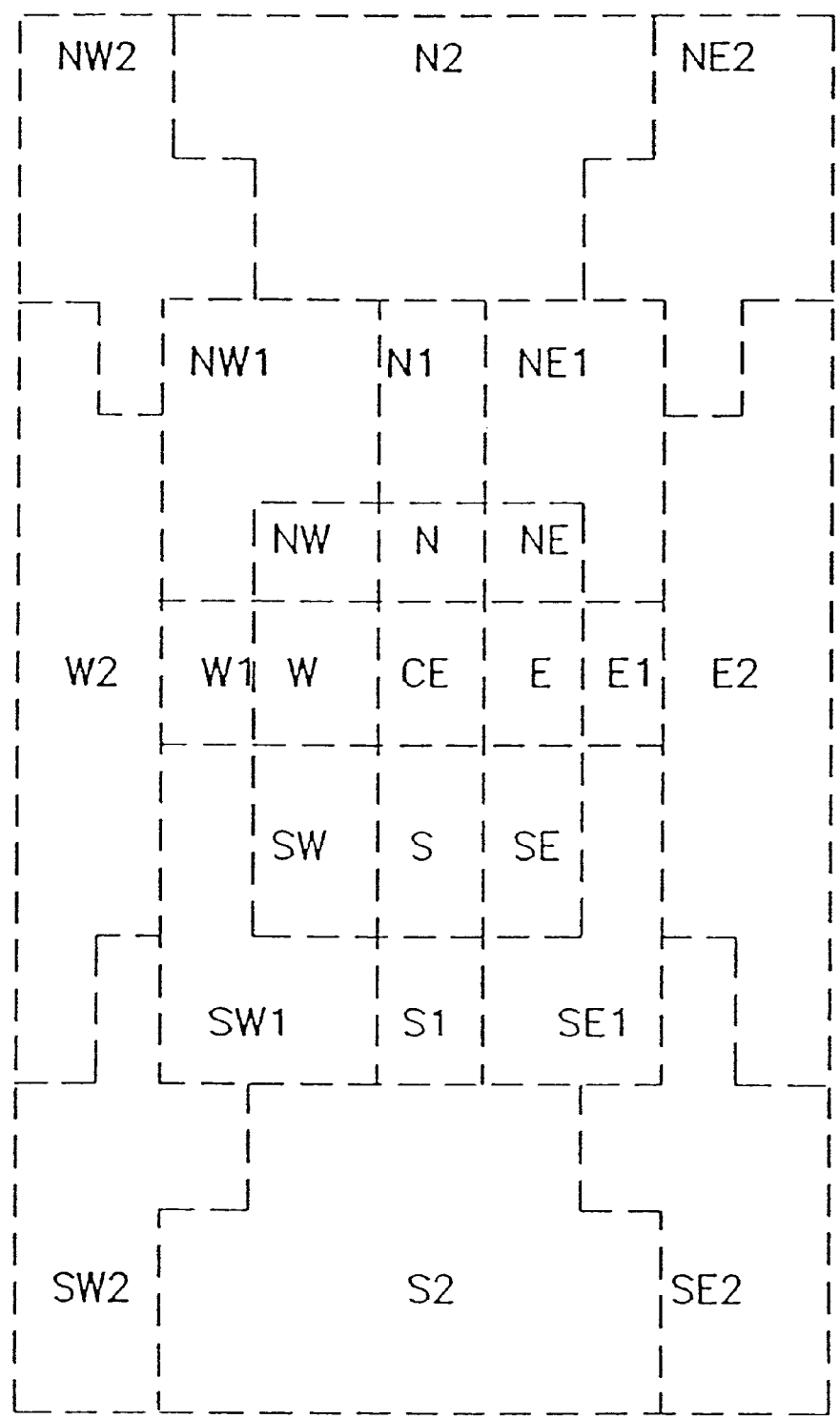
FIG. 28 is a simplified block diagram illustrating a portion of a method for edge detection utilizing the apparatus of FIG. 11.
Figure 31:
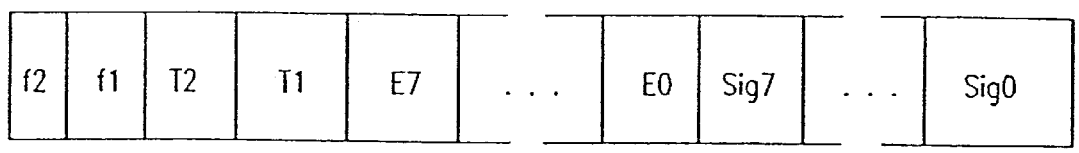
FIG. 31 is a simplified block diagram illustrating another word format of associative memory within a portion of the apparatus of FIG. 11.
Figure 32:
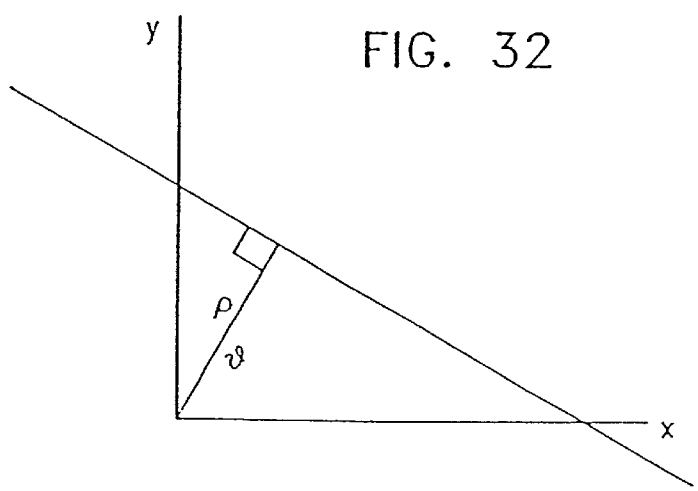
FIG. 32 is a graphical illustration of normal parameterization of a line used within a method for computing a Hough transform utilizing the apparatus of FIG. 11.

1. Since a 9×9 neighborhood involves too many patterns to handle directly, it was partitioned into 24 sectors as shown in FIG. 27. To maintain angular accuracy, sector size increases with distance from the center. The sector evaluation function is here defined as the logical OR of its edge point indicators, and a 24-bit field was assigned to the sector values. Evaluation is carried out by shifting in neighboring edge point indicators and OR'ing them directly into the corresponding sector values.
2. Sector partitioning was based on π/8 angular resolution, and defines 16 equally spaced segments or rays around the circle. Each segment (direction) is characterized by a required code in a prescribed subset of the segment values, and a maximum Hamming distance of 1 is permitted. The sector value field is now compared against each of the 16 codes and the results registered in a 16-bit field to mark the presence of each segment direction.
3. Simplification of segment characterization and testing introduces a measure of ambiguity in each triplet about one of the 8 main compass directions. Additional sector values are now used to resolve this uncertainty and the few cases of inherent ambiguity are settled arbitrarily.
4. The 16-bit segment field can now be tested for any pair of segments representing a given line or corner. The sample program selects all pairs without distinction.

From simulation, the complexity of this algorithm was found to be 1010 cycles or 30.3 μs. It should be noted that the concept of this algorithm can be extended to a broad range of functions depending on the choice of sector boundaries, of the evaluation function, and of pattern characterization.

Contour Tracing and Labeling

A preparation step labels each contour point with its x-y coordinates. The main process is iterative and operates on a 3×3 neighborhood of all contour points in parallel. Every contour point looks at each one of its 8 neighbors in turn and adopts the neighbor's label if smaller than its own. The circular sequence in which neighbors are handled appreciably enhances label propagation. Iteration stops when all labels remain unchanged, leaving each contour identified by its lowest coordinates. The point of lowest coordinates in each contour is the only one to retain its original label. These points were kept track of and are now counted to obtain the number of contours in the image. Listing 8 presents the program in associative memory. The input fields are [xy_coord] to specify pixel position and [edge] to identify contour points. The output fields are contour [label] and contour starting point [mr]. The word format is in FIG. 29.

LISTING 8: Contour Tracing and Labeling

```
main()
{
    ... declarations
    /** Clear working fields **/
    letm dseq(label,mark); letc; setag; write;
    /*** Mark and label all edge points ***/
    letmc d(edge); setag; compare;
    letmc d(mark); write;
    for(bit_count=0; bit_count<label_size; bit_count++)
    {
        letmc d(xy_coord+bit_count) d(edge); setag; compare;
        letmc d(label+bit_count); write;
    }
    while( new_condition > growth_threshold)
    {
        letm d(sf) letc; setag; write; /*clear switch flag */
        /****** CONNECTIVITY TESTING ******/
        for(window_index=0; window_index<8; window_index++)
        {
            /* Shift "edge" and "label" into "temp" and "operand" */
            letm dseq(temp,operand+label_size-1); letc; setag; write;
            for(bit_count=0; bit_count<label_size+1; bit_count++)
            {
                letmc d(edge+bit_count); setag; compare;
                letmc d(temp+bit_count);
                general_shift(window_index) ; write;
            }
            /** Test if "operand" < "label" **/
            letm d(gt) d(lt); letc; setag; write;
                            /* clear greater & less than flags */
            for (bit_count=label_size-1; bit_count>=0; bit_count--)
            {
                letm d(edge) d(temp) d(gt) d(lt)
                    d(operand+bit_count) d(label+bit_count);
                letc d(edge) d(temp) d(operand+bit_count);
                    setag; compare;
                letc d(edge) d(temp) d(gt) d(operand+bit_count); write;
                letc d(edge) d(temp) d(label+bit_count); setag;compare;
                letc d(edge) d(temp) d(lt) d(label+bit_count); write;
            }
            letmc d(lt); setag; compare;
            /* clear "label" and "mark", set switch flag */
            letm dseq(label,label+label_size-1) d(mark) d(sf);
            letc d(sf); write;
            /* copy "operand" into "label" */
            for(bit_count=0; bit_count<label_size; bit_count++)
            {
                letmc d(operand+bit_count) d(lt); setag; compare;
                letmc d(label+bit_count); write;
            }
        }
        /** Test for termination **/
        letmc d(sf); setag; compare;
        new_condition = countag;
    }
    /** Find number of contours **/
    letmc d(mark); setag; compare; countag;
}
general_shift(index)
int index;
{
    if(index<=2) shiftag(b)
    if(index>=4 && index<=6) shiftag(-b);
    if(index==0 || index==6 || index==7) shiftag(-1);
    if(index)=2 && index<=4) shiftag(1);
}
```

The time complexity of the algorithm (in machine cycles) is given by, $$T_l = 16 + 4\log_2 N + I\left[65 + \frac{3N}{b} + 2\log_2 N\left(67 + \frac{3N}{b}\right)\right]. \tag{5}$$

The upper bound of I is nearly $N^2/2$, but for a representative value of 100 iterations, execution time becomes 218 kilocycles or 6.6 milliseconds. A good approximation to the time complexity is, $$T_l = I\left(67 + \frac{3N}{b}\right)(1 + 2\log_2 N).$$

A list of contours, giving label and length (in pixels), may be generated in relatively short order (24 cycles per contour).

Associative Saliency Network

Salient structures in an image can be perceived at a glance without the need for an organized search or prior knowledge about their shape. Such a structure may stand out even when embedded in a cluttered background or when its elements are fragmented. Sha'ashu & Ullman [46] have proposed a global saliency measure for curves based on their length, continuity and smoothness. Consider the image as a network of N×N grid points, with d orientation elements (segments or gaps) coming into each point from its neighbors, and as many going out to its neighbors. A curve of length L in this image is a connected sequence of orientation elements $p_i$, $p_{i+1}, \ldots, p_{i+L}$, each element representing a line segment or a gap in the image, and the saliency measure of the curve is defined as, $$\sum_{j=i}^{i+L} c_{i,j} \rho_{i,j} \sigma_j \tag{40}$$

where the local saliency σ is assigned the value unity for an active element (real segment), and zero for a virtual element (gap). The attenuation function $\rho_{i,j}$ provides a penalty for gaps, $$\rho_{i,j} = \prod_{k=i+1}^{j} \rho_{k_1} \tag{41}$$

where the attenuation factor ρ approaches unity for an active element and is appreciably less than unity (here taken to be 0.7) for a virtual element. The first factor, $c_{i,j}$, is a discrete approximation to a bounded measure of the inverse of total curvature, $$c_{i,j} = \prod_{k=i}^{j-1} f_{k,k+1} \quad f_{k,k+1} = e^{-\frac{2\alpha_k \tan(\alpha_k/2)}{\Delta S}} \tag{42}$$

where $\alpha_k$ denotes the difference in orientation from the k-th element to its successor, and ΔS, the length of an orientation element.

It will be noted that this measure is global in nature, being evaluated over a curve of L orientation elements. any number of which may be gaps. Hence, to find the maximum value at a given segment, one must evaluate all $d^L$ possible curves starting with this segment, where d is the (discrete) number of directions considered at each point. This exponential complexity cannot be reduced by pyramid techniques, since parts of a salient curve are not necessarily salient. Nevertheless, Sha'ashua and Ullman reduced complexity to order dL by maximizing repeatedly over shorter curves. Let $E_i$ be a state variable associated with element $p_i$, then the iterative process is defined by, $$E_i^{(o)} = \sigma_i \tag{43}$$

$$E_i^{(n+1)} = \sigma_i + \rho_i \max E_j^{(n)} f_{i,j}$$

where $E_j$ is the state variable of $p_j$, one of the d possible neighbors of $p_i$; the superscript of E is the iteration number; and $f_{i,j}$ is the inverse curvature factor from $p_i$ to $p_j$. After L iterations the state variable becomes equivalent to the saliency measure defined earlier, $$E^{(L)} = \max \sum_{j=i}^{i+L} c_{i,j} \rho_{i,j} \sigma_j. \tag{44}$$

The proof is sketched in [46] and detailed in [47]. The final state variables of all the orientation elements (segments or gaps) in the N×N grid constitute a saliency map of the image.

In our associative architecture, the pixels constitute the grid points, and d=8 orientation elements connect each pixel to its neighbors (FIG. 30). In FIG. 30, the following notation is employed:

solid line: $E_i$ element for which saliency is computed
broken line: Successors used in computation
dotted line: Successors ignored in computation For d discrete directions, angle α is given in increments of 360/d=45 degrees, and $f_{i,j}$ takes on the following values:

| | α: | | | | | | | | |
|---|---|---|---|---|---|---|---|---|---|
| | −180 | −135 | −90 | −45 | 0 | 45 | 90 | 135 | 180 |
| $f_{i,j}$: | 0 | 0.000011 | 0.043 | 0.52 | 1 | 0.52 | 0.043 | 0.000011 | 0 |

It can be seen that only three values of α are significant, −45, 0, and 45, hence only successors with these values of α will be considered in the computation. Since the initial image is given as edge points, a preprocessing step is required to identify active elements as any pair of edge points that are 8-neighbors. The program outline is given in Listing 9. The memory word format is in FIG. 31.

LISTING 9: Associative Saliency Network

```
main()
{
    ... declarations
    for(i=0; i<8; i++) { /* updates Ei with first iteration */
        letmc d(Sig+i); setag; compare; letmc d(E[i]+3); write; }
    for(iteration=1; iteration<MaxIteration; iteration++)
    {
        for(i=0; i<8; i++)
        {
            letm dseq(T1,T2+8); letc; setag; write; /* clear "T1" and "T2" */
            shift_and_do(i,0,T2);    /*perform Ej*Fij-->T2 for j=0*/
            for(j=1; j(3; j++)
            {
                shift_and_do(i,j,T2);   /* Ej*Fij --> T2        */
                max_field(T2,T1);       /* maximum(T2,T1) --> T1 */
            }
            Sum_Acc(i);       /* SIGi + ROi*MAX(Ej*Fij) --> Ei */
        }
    }
}
```

It may be worth noting that as active p approaches unity, it becomes possible to distinguish between different degrees of high saliency, but a larger number of iterations is required. The algorithm requires a word length of 90 bits and its time complexity in cycles is given by, $$T_{sal} = 42 + \frac{N}{b} + I\left(12354 + 66\frac{N}{b}\right) \quad (45)$$

where I denotes the number of iterations. Evaluating the expression in parentheses, execution time becomes 0.4 ms. per iteration. An execution time of 500 ms. per iteration was reported for the Connection Machine [48].

Hough Transform

The Hough transform can detect a curve whose shape is described by a parametric equation, such as the straight line or conic section, even if there are gaps in the curve. Each point of the figure in image space is transformed to a locus in parameter space. After splitting the parameters into suitable ranges, a histogram is generated giving the distribution of locus points in parameter space. Occurrence of the object curve is marked by a distinct peak in the histogram (intersection of many loci).

In the case of a straight line (FIG. 32), we use the normal parameterization suggested by Duda & Hart [49]:

$$x \cos \theta + y \sin \theta = \rho$$

which specifies the line by $\rho$ and $\theta$, and the histogram includes a straight line in every direction of $\theta$. But if the candidate points are the result of edge detection by a method that yields direction, then $\theta$ is known. Following O'Gorman & Clowes [50], this information was applied to effect a major reduction of both hardware (word-length) and time complexity. For a 511×511 image with the origin at its center, the x-y coordinates are given by 9 bits in absolute value and sign. Angle $\theta$ from 0 to $\pi$ is given to a matching precision of 10 bits (excluding sign of gradient). The sine and cosine are evaluated by table look-up. Advantage is taken of the symmetry of these functions to reduce the table size four-fold. After comparing ρ, the histogram is evaluated and read-out element by element using the COUNTAG primitive. This algorithm requires a 52-bit word length and has a time complexity of, $$T_l = 1870 + 13t(r-1)$$

machine cycles, where t, r are the resolutions of ρ, θ respectively in the histogram. The second term accounts for histogram evaluation and dominates $T_l$ at t, r≧32. At a resolution of 16 in both θ and ρ (t, r=16), the execution time is only 150 µs per frame, and grows to just 6.4 ms at a resolution of 128.

Consider now detection of a circle with given radius R. Its equation may be written as:

$$(x-x_0)^2 + (y-y_0)^2 = R^2,$$

where $x_0$, $y_0$ are the coordinates of the center. As in the case of the straight line, we wish to use the direction of the gradient to simplify the process. Differentiating the circle equation we obtain, $$\frac{dy}{dx} = -\frac{x-x_0}{y-y_0} = \tan\left(\theta - \frac{\pi}{2}\right),$$

where θ is the gradient direction. Solving for $x_0$, $y_0$, $$x_0 = x \pm R\sin\left(\theta - \frac{\pi}{2}\right) \quad y_0 = y \pm R\cos\left(\theta - \frac{\pi}{2}\right).$$

These equations are implemented and a histogram generated for $x_0$, $y_0$. The algorithm uses gradient polarity to distinguish between bright circles on a dark background and dark circles on a light background, generating a separate histogram for each case. Assuming R less than 32 pixels, the word length required is 62 bits and the time complexity in cycles is given by, $$T_c = 1550 + 26 r_x r_y, \quad (46)$$

where $r_x$, $r_y$ are the range resolutions of $x_0$, $y_0$ in the histogram. For a resolution of 128 in both $x_0$ and $y_0$, the execution time is 10.8 ms per frame. Mixed circles that are partly black on white, partly white on black, may be detected by summing the two histograms (in the host) before thresholding. If the search is restricted to bright circles on a dark background (or vice-versa), the complexity reduces to $$T_c=1280+13r_xr_y, \qquad (47)$$

and the execution time drops to 6.4 ms.

Geometric Problems
Convex Hull

It is sometimes interesting or useful to find the boundary of a set of points in the image. When looking at such a point set, one has little trouble distinguishing the inside points from those on the boundary. These natural boundary points are the vertices of the convex hull, which is defined mathematically as the smallest convex polygon containing the point set. Equivalently, the convey hull is the (unique) convex polygon containing the point set, whose vertices belong to the point set. Hence it is also the shortest path surrounding the point set.

The approach chosen for associative implementation is known as the package-wrapping method [51]. Starting with a point guaranteed to be on the convex hull, say the lowest one in the set (smallest y coordinate), take a horizontal ray in the positive direction and swing it upward (counterclockwise) until it hits another point in the set; this point must also be on the hull. Then anchor the ray at this point and continue swinging to the next points, until the starting point is reached, when the package is fully wrapped.

Figure 33:
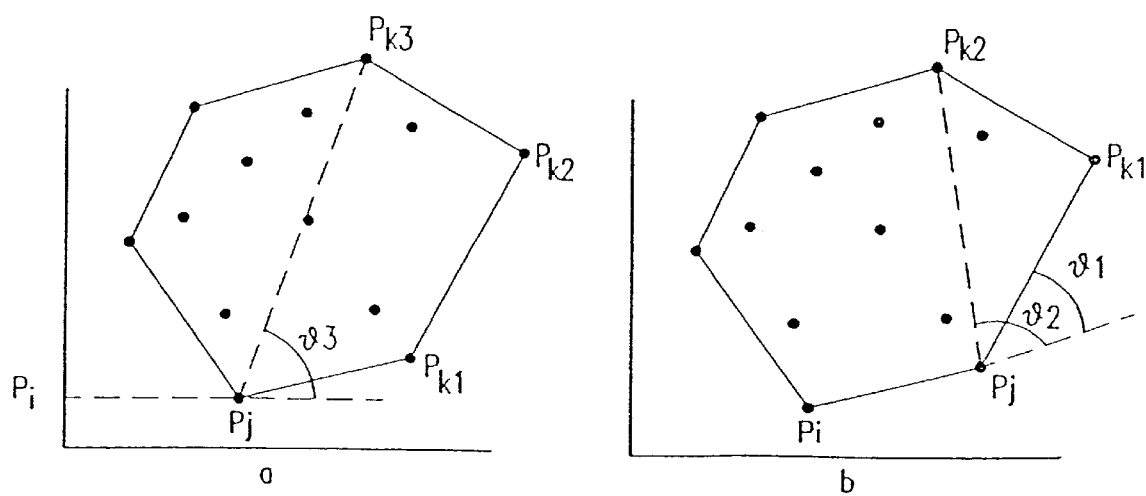
FIG. 33 is a graphical illustration of a portion of a method for Convex Hull generation utilizing the apparatus of FIG. 11.

For convenience we choose the coordinate system so that the entire image (and point set) is in the first quadrant. The lowest point $P_j$ is located by searching for the minimum y-coordinate in the set; it is on the hull and is labeled as such. We take as reference the extension of segment $P_iP_j$, such that $x_i=0$ and $y_i=y_j$, and consider the angle $\theta$ it forms with every $P_jP_k$, where $P_k$ is anyone of the other points in the set. The next point on the convex hull is the one for which $\theta$ is a minimum (FIG. 33). Denoting vector $P_iP_j$ by $V_1$ and vector $P_jP_k$ by $V_2$, their scalar product becomes, $$V_1V_2=|V_1||V_2|\cos\theta. \qquad (48)$$

Hence, $$\cos\theta = \frac{a_1a_2 + b_1b_2}{\sqrt{a_1^2+b_1^2}\sqrt{a_2^2+b_2^2}} \qquad (49)$$

Where $a_1=x_j-x_i$; $a_2=x_k-x_j$;
$b_1=y_j-y_i$; $b_2=x_k-x_j$;

To avoid taking square roots, we use $\cos^2\theta$, $$\cos^2\theta = \frac{(a_1a_2 + b_1b_2)^2}{(a_1^2+b_1^2)(a_2^2+b_2^2)} \qquad (50)$$

Since $\theta$ ranges from 0 to $\pi$, before squaring the numerator $a_1a_2+b_1b_2$, we test for any positive values. If there are, we mark them and look for the maximum $\cos^2\theta$ value among them. Otherwise, if all numerators of $\cos\theta$ are negative, we look for the minimum value of $\cos^2\theta$. The $P_k$ corresponding to the selected $\theta$ is on the hull and is labeled as such. To continue the process, $P_j$ becomes the new $P_i$, and the chosen $P_k$ becomes the new $P_j$ (FIG. 33). The process terminates when it returns to the initial (lowest) point.

Two special cases may arise. In the first step, when looking for the lowest point, we may find two or more points having the same minimum y-coordinate. We choose among them the point with highest x-coordinate as $P_j$, the one with lowest x-coordinate as $P_i$, and $P_iP_j$ becomes the first reference segment. During the iterative part, when looking for the point that makes $\theta$ a minimum, we may find two or more points, $P_{k1}, P_{k2} \ldots P_{ks}$, yielding the same minimum value. Clearly, lines $P_jP_{k1}, P_jPk_2, \ldots, P_jP_{ks}$ are collinear, and the point to be chosen is the most distant from $P_j$, the one having maximum $|x_k-x_j|$. Should all $x_k-x_j$ equal zero, the choice is made on the basis of maximum $|y_k-y_j|$.

Analysis of the algorithm implementation shows on ARTVM gives execution time in machine cycles, $$T_{C\ Hull}=60+105V \qquad (51)$$

where V is the number of vertices of the complex hull. Hence time complexity is independent of the number of points in the set. For 1000 vertices in the hull, execution time becomes 3.15 ms.

Voronoi Diagram

This is a classical mathematical object that has become an important tool in computational geometry for dealing with proximity problems. Starting with a given set of L points in the plane, $P_i$, i=1, 2, $\ldots$ L, the Voronoi diagram surrounds each point $P_i$ by a region, $R_i$, such that every point in $R_i$ is closer to $P_i$ than to any other point in the set, $P_j$, j=1, 2, $\ldots$ L and i$\neq$j. The boundaries of all these regions, $R_i$, constitute the Voronoi diagram.

An associative algorithm based on the brush fire technique is presented in Listing 10. Each of the given points acts as a source of fire that spreads uniformly in all directions. The boundaries consist of those points at which fires from two (or three) sources meet. Every point in the given set is initially marked with a different color—actually its xy-coordinates. Each point in the image looks at its 8-neighbors. A blank (uncolored) point that sees a colored neighbor will copy its color. If both are colored, the point will compare colors, marking itself as a Voronoi (boundary) point if the colors are different. This process is iterated until all points are colored.

One more cycle of color comparison with the neighbors is necessary to complete demarcation of the boundaries. The order of processing the 8-neighbors was chosen to optimize boundary precision. Not unexpectedly, it alternates between opposite compass directions: N,S,E,W,NE,SW,NW,SE. Analysis of the algorithm yields the time complexity in cycles as, $$T_{vor} = 2 + I\left(1533 + \frac{60N}{b}\right), \qquad (52)$$

or an execution time of 75 $\mu$s per iteration. The regions grow diagonally at a rate of 2 pixels per iteration, hence up to 103 iterations may be required. But for a representative value of I=20, execution time is 1.5 ms.

The algorithm yields boundaries that are almost thin. One round of thinning in all 4 directions (south, north, west, east) with the following template will suffice.

X 1 X
1 P 0
X 0 0

Note that the template is shown in its initial southern orientation and that the order within each pair of opposite directions has been reversed. This reversal appears essential for maintaining boundary precision. A pixel removed from the boundary is recolored by examining its 4-neighbors in turn and copying the first one that is not a boundary point. Since thinning and recoloring are not iterative processes, they do not affect execution time significantly. FIG. 34 is useful in understanding Listing 10.

LISTING 10: Associative Voronoi Diagram

```
main()
{
    /* . . . declarations */
    /** Mark the seed points as colored **/
    letm d(CL) d(VL); letc; setag; write;
    letmc d(S); setag; compare; letmc d(CL); write;
    /****** BRUSH FIRE ******/
    while (rsp)
    {
        for(window_index=0; window_index<8; window_index++)
        {
            /** Bring in CN and VN **/
            letm d(CN) d(VN); letc; setag; write;
            letmc d(CL); setag; compare;
            letmc d(CN); general_shift(window_index); write;
            letmc d(VL); setag; compare;
            letmc d(VN); general_shift(window_index); write;
            process();
        }
        letm d(CL) letc; setag; compare;
    }
    process();
}
process()
{
    for(i=0; i<colour_size; i++)
    {
        letm d(TM); letc; setag; write;
        letmc d(color+i); setag; compare;
        letmc d(TM); general_shift(window_index); write;
        letm dseq(CL,TM) d(color+i); letc d(CL) d(CN) d(TM); setag; compare;
        letmc d(VL); write;
        letm dseq(CL,TM) d(color+i); letc d(CL) d(CN) d(color+i); setag; compare;
        letmc d(VL) ; write;
        letm dseq(CL,TM) d(color+i); letc d(CL) d(TM); setag; compare;
        letmc d(color+i); write;
    }
}
general_shift(index)    /* 6 0 4 */
int index;              /* 3 P 2 */
{                       /* 5 1 7 */
    if(index == 4 || index == 0 || index ==6) shiftag(b);
    if(index == 5 || index == 1 || index ==7) shiftag(-b);
    if(index == 6 || index == 3 || index ==5) shiftag(1);
    if(index == 4 || index == 2 || index ==7) shiftag(-1);
}
```

The associative Voronoi algorithm was designed for quick access of statistical data. Thus it would take only 13 machine cycles to read out the length (in pixels) of the Voronoi Diagram or the area (in pixels) of any Voronoi region identified by its seed coordinates.

Word Length

This section estimates the associative memory word length (K), required to compute vision algorithms. Consider the machine model described, for monochrome computer stereo vision in three channels. Its input is M bits for each of the incoming images, left and right. The machine generates parameters in three channels for use in higher level processes. The parameters are: disparity of bit length $[\log_2(2W_i+1)]$; slope orientation and edge designation (of length 4 and 1 respectively) for the left and right images; and a one bit match label. Assuming input data is retained for further processing, the final word size is given by, $$K_{final} = 2M + \sum_{i=1}^{3}\log_2(2W_i + 1) + 3(2(4 + 1) + 1) = 64 \quad (53)$$

for M=8 and W=P=7,15,31. Additional word space is required for temporary storage of intermediate results, and this fluctuates dynamically during execution of the various algorithms. The maximum word length depends on the order of execution. The best order in our case is to compute each channel in turn, starting with the coarsest. Examination of the various processing phases indicates that maximum word length is reached during computation of disparity for the last channel. Accordingly, the maximum word length is expressed by, $$K_{max}=2M+K_{ch_{1,2}}+K_{sp} \quad (54)$$

where the first term is for the input data, and $K_{ch_{1,2}}$ accounts for the results of the first two channels.

$$K_{ch_{1,2}}=2(2(4+1)+1)+\log_2(2W_3+1)+\log_2(2W_2+1)=33 \quad (55)$$

$K_{sp}$ is the working space to compute the last channel disparity and is given by (see Stereo Vision), $$K_{sp}=3\times2+2[\log_2(2W_1+1)^2]+5[\log_2(2W_1+1)]=42 \quad (56)$$

where $K_{sp}$ does not include flag bits. Hence $K_{max}$ becomes 91 bits.

Let us expand our model to include most of the visual algorithms implemented above. As before, the minimum word length required depends on the order of execution. The recommended order is:

Optical Flow.
Edge detection and contour processing.
Hough transform, saliency mapping.
Stereo matching.

The critical process appears to be optical flow with 132 bits (including an additional byte of pixel data for stereo). By sharing or reusing fields En1, Uav and Vav, the word length required drops to 106. Providing some spare capacity for new algorithms, the ARTVM word length was fixed at 128 (four 32-bit sectors), plus an 8-bit flag bit, or 136 bits. This only considers associative storage—if the 16-bit image buffer is included, the total word length becomes 152.

Restults and Conclusions of the Akerib Thesis

A low cost, general purpose vision architecture was proposed here which could carry out any vision algorithm at video rate. The proposed machine is a classical associative structure adapted to computer vision and VLSI implementation. It is designated Associative Real Time Vision Machine (ARTVM), and uses an up-down shift mechanism in the tag register to enhance operations on a local neighborhood. An internal frame buffer virtually eliminates computer I/O time, and permits simultaneous input, output and computation. To reduce chip interface without materially affecting speed, the word is partitioned into four sectors, only one of which can be accessed at a time, and a flag field that is always accessible. The major hardware complement to handle a 512×512 image is shown to consist of 256K (words×152 bits of associative memory. Extrapolation of earlier experiments to 0.5 micron technology yields a capacity of 1M bits of associative memory on a chip area of 100 mm$^2$ and a cycle time of 30 nanoseconds. The proposed chip stores 4K words×152 bits, which is 59 percent of capacity, and 64 of these chips make up the associative memory.

A simulator of ARTVM was generated in the C language for use in developing associative micro-software and evaluating its time complexity. Convolution in the x and y directions with a 15-element filter takes 0.34 ms, hence Canny edge detection executes in 0.5 ms, and the Mar & Hildreth method runs nearly twice as long. Likewise computation of stereo disparity by the Grimson method over a range of ±15 pixels, including disambiguation and out-of-range test, completes in under one ms. This stereo performance was only attained by virtue of an array algorithm for counting labeled pixels over a neighborhood. Optical flow by the Horn & Schunck method executes in less than 0.5 ms. Curve propagation, thinning and contour tracing take 1.5, 6.4 and 66 $\mu$s per iteration, respectively. The linear Hough transform takes 150 $\mu$s for a resolution of 16 in direction and distance from the origin. An interesting result was obtained for the global saliency mapping of Sha'ashua & Ullman. It takes 0.4 ms per iteration, which is three orders of magnitude faster than the Connection Machine. Geometric problems were also implemented: the convex hull takes 3.15 $\mu$s per vertex, and the Voronoi diagram executes in 0.15 ms per iteration by the brush-fire technique.

Two methods were selected for comparative evaluation of ARTVM performance. In the first we compared our architecture to an SIMD array of up to 256 high performance processors (Inmos T800/Intel S60), and found it to have a speed advantage of 2–3 orders of magnitude. The speed advantage was lowest for neighborhood arithmetic operations of higher precision, such as convolution (factor of 97), and reached a peak for neighborhood logic operations such as curve propagation (factor of 2500). The second method was the Abingdon cross benchmark for which test results were available on several of the better known vision architectures. The ARTVM was found to lead by 2–6 orders of magnitude in price-performance.

The ARTVM configuration used throughout this investigation assumed a long shift of 32 places (b=32). This added 64 pins to the associative chip, for a total interface of 160 pins. Reducing b to 16 would save 32 pins at the expense of a 17% loss in average speed. It was indicated earlier that the architecture is flexible with respect to advances in technology and can take full advantage of higher chip density. There is equal flexibility in image resolution if memory chip count is varied linearly with this parameter. Thus for a 1024×1024 image, the chip count will grow by a factor of 4, with a small loss in speed and, perhaps, a minor increase in word length.

In the vision algorithms described above, which the data base is inherently pixel oriented or such orientation offers a decided advantage. Exceptions are the Hough transforms and convex hull. For higher level vision functions, dealing with more complex image elements, an associative architecture is expected to offer even greater advantages.

This work has important commercial implications.

The apparatus and methods shown and described above are useful in a variety of applications, such as but not limited to: video telephony implementing the H.261 standard; video teleconferencing for CIF resolution and QCIF resolution; compression and decompression of video games; color image enhancement and manipulation for desk top publishing; optical character recognition (OCR); virtual reality; image animation such as computer generated cartoons; 2 or 3 dimensional B/W or color image inspection and processing; video detecting for traffic control; medical imaging such as 3D reconstructions and back projection filtering; real time normalized gray scale correlation; TV tracking of more than one object such as tracking of vehicles for traffic control purposes; other traffic applications such as identification of license numbers; inspection of manufactured objects such as agricultural produce; wood and metal products and microelectronic products; acceleration of computer arithmetics; neural network applications; fuzzy logic applications; post processing the quality of compressed images; photography with video, digital or analog cameras, with or without image compression, with or without special effects such as autofocus, gamma correction, photomontages, bluescreen, aperture correction, exposure correction, real time morphing, and correction of geometrical distortions; television applications such as HDTV (high definition television), satellite TV, cable TV; infotainment; speech recognition; kiosks for banking, travel, shopping and other purposes; special effects and enhancement of automated office equipment such as facsimile machines, printers, scanners, and photocopiers; compression applications such as compression of faces, fingerprints or other information onto smart cards for driver licenses, ID cards and membership cards; communication applications such as digital filtering, Viterbi decoding and dynamic programming; and training, educational, and entertainment applications.

Video and picture editing applications include acceleration of desk top publishing functions such as blurring, sharpening, rotations and other geometrical transformations, and median filtering.

CD ROM (compact disc read-only-memory) uses include compression such as MPEG-I, MPEG-II, JPEG, fractal compression, and wavelet compression, with or without enhancement such as video sharpening, for a wide variety of applications such as archiving images for medical, real estate, travel, research, and journalistic purposes.

Examples of facsimile applications include canceling out a colored background so as to sharpen the appearance of a text superimposed on the colored background, filling in gaps in letters such as Kanji characters, OCR, facsimile data compression.

An example of a photocopier application is automatically superimposing a template stored in memory, such as a logo, onto a photocopy.

Security applications for home, workplace, banks, and receptacles for valuables and proprietary information, include the following: recognition of personnel, as by face recognition, fingerprint recognition, iris recognition, voice recognition, and handwriting recognition such as signature recognition;

Camera features which may be accelerated by use of the embodiments shown and described herein include the following:

1. Gamma correction: A LUT (look up table) is employed which includes 256 cells, respectively including a value i (i=0, . . . , 255) raised to the power of gamma. Gamma may, for example, be 0.36 or 0.45. The same LUT may be employed for all three color components (R, G and B) and gamma correction may be performed in parallel for all three components.
2. Rapid color-base conversions such as color transformation in which luminance and chrominance are separated before further processing. For example, it is often desirable to transform RGB values or CMYK values into YCrCb values which can be compressed by reducing the number of bits devoted to the Cr and Cb components. Eventually, the compressed YCrCb values are transformed back into RGB or CMYK.
3. Low pass filtering of luminance chrominance signals with 5–15 tap filters.
4. Aperture correction. For example, the following stages may be performed:
   a. Extract a high frequency component of the original signal representing the photographed scene;
   b. Apply two separable filters, each of which may, for example, be: [−0.25 0.5 −0.25] to the columns and rows respectively.
   c. Generate a correction signal by shifting the horizontal point signal by K=0, 1, 2 or 4 pixels.
   d. Generate corrected output by adding the correction signal to the original signal.
5. Autofocus and autoexposure computations:
   For example, the focus of the camera may be adjusted by a predetermined amount in a first direction. Then, the proportion of high frequency components may be computed using the embodiments shown and described above to determine whether this proportion has increased or decreased as a result of the adjustment. If there is an increase, the focus is again adjusted by a predetermined amount in the first direction. If there is a decrease, the focus is adjusted by a predetermined amount in the second direction.
6. Auto color correction computations, such as auto gain control and auto white balance. For example, the following stages may be performed:
   a. Adjust black levels until the darkest parts of each R, G or B signal reaches a predetermined level.
   b. Adjust differential gains so as to equalize the means of the three signals.
   c. Adjust overall gain such that the most positive of the peaks of the three waveforms just reaches white level. This may be done by computing the maximum, minimum and mean levels of each color.
7. Chroma-keying:
   a. Key generator: X=Cb cos(z)+Cr sin(z); Z=Cr cos(z)s+ Cb sin(z)

$K=X-a|Z|$, $K=0$ if $Z<a|Z|$, $a=½, 1, 2, 4$ b. Foreground suppression:
   Cb'=Cb−K cos(z)
   Cr'=Cr−K sin(z)
   Y'=Y−YsK, Y'=0 if YsK>Y. Ys−adjustable constant
   c. Key processing:
   Kbg=0 for wanted foreground, Kbg=1 for wanted background picture.
   Kbg=(K−K1)Kg for the transition band.
   c. Mixer
8. Noise Reduction
   Weighted averaging of two successive images with weights 1/K, 1−1/K, K=2,4,8
9. Movement Protection (Avoid smearing of moving objects).
10. Creation of composite and S-video signals:
    Chrominance modulation and alternating lines: U sin (wt)+V sin(wt) U sin(wt)−V sin(wt) done for frequencies of 13.5 MHz.

It will be appreciated by persons skilled in the art that the present invention is not limited to what has been particularly shown and described hereinabove. Rather, the scope of the present invention is defined only by the claims that follow.

What is claimed is:

1. Associative signal processing apparatus for processing an incoming signal comprising a plurality of samples, the apparatus comprising:
   a two-dimensional array of processors, each said processor including a multiplicity of content addressable memory cells, each sample of an incoming signal being processed by at least one of said processors; and
   a register array including at least one register operative to store responders arriving from the processors and to provide communication, within a single cycle, between non-adjacent processors, said at least one register providing communication between processors which are processing non-adjacent samples;
   wherein the register array is operative to perform at least one multicell shift operation.
2. Apparatus according to claim 1 which is operative in video real time.
3. Apparatus according to claim 1 wherein the signal comprises an image.
4. Apparatus according to claim 3 wherein the image comprises a color image.
5. Apparatus according to claim 1 wherein at least one sample is processed by two or more of the processors.
6. Apparatus according to claim 1 wherein at least one of the processors processes more than one sample.
7. Apparatus according to claim 1 wherein the register array comprises a plurality of registers.
8. Apparatus according to claim 1 wherein the register array includes a plurality of registers operative to store responders arriving from the processors.
9. Apparatus according to claim 1 and also comprising all I/O buffer register operative to input and output a signal.
10. Apparatus according to claim 9 wherein the processor array, the register array and the I/O buffer register are arranged on a single module.

11. Apparatus according to claim 9 wherein the processor array, the register array and the I/O buffer register are arranged on a single silicon die.

12. Apparatus according to claim 11 wherein the I/O buffer register includes a plurality of buffer register cells whose number is at least equal to the number of processors in said two-dimensional processor array.

13. Associative signal processing apparatus comprising:
an array of processors, each processor including a multiplicity of associative memory cells, at least one of said processors being operative to process a plurality of samples of an incoming signal;
a register array including at least one register operative to store responders arriving from the processors and to provide communication between processors; and
an I/O buffer register operative to input an incoming signal and to output an outgoing signal;
wherein the order in which the I/O buffer inputs an image differs from the row/column order of the image and wherein the register array is operative to perform at least one multicell shift operation.

14. Apparatus according to claim 13, wherein the processor array, the register array and the I/O buffer register are arranged on a single chip.

15. Apparatus according to claim 13, wherein said I/O buffer register and said processors are operative in parallel.

16. Apparatus according to claim 13, wherein the word length of the I/O buffer register is increasable by decreasing the wordlength of the associative memory cells.

17. Apparatus according to claim 13 which is operative in video real time.

18. Apparatus according to claim 13 wherein the signal comprises an image.

19. Apparatus according to claim 18 wherein the image comprises a color image.

20. Associative signal processing apparatus comprising:
an array of processors, each processor including a multiplicity of associative memory cells, at least one of said processors being operative to process a plurality of samples of an incoming signal;
a register array including at least one register operative to store responders arriving from the processors and to provide communication between processors; and
an I/O buffer register operative to input an incoming signal and to output an outgoing signal;
wherein the order in which the I/O buffer inputs the samples differs from the order of the samples within the incoming signal and wherein the register array is operative to perform at least one multicell shift operation.

21. Apparatus according to claim 20, wherein the processor array, the register array and the I/O buffer register are arranged on a single chip.

22. Apparatus according to claim 20, wherein said I/O buffer register and said processors are operative in parallel.

23. Apparatus according to claim 20, wherein the word length of the I/O buffer register is increasable by decreasing the wordlength of the associative memory cells.

24. Apparatus according to claim 20 which is operative in video real time.

25. Apparatus according to claim 20 wherein the signal comprises an image.

26. Apparatus according to claim 25 wherein the image comprises a color image.

27. Associative signal processing apparatus comprising:
an array of processors, each processor including a multiplicity of associative memory cells, at least one of the processors being operative to process a plurality of samples of an incoming signal;
a register array including at least one register operative to store responders arriving from the processors and to provide communication between processors;
an I/O buffer register operative to input all incoming signal and to output an outgoing signal; and
an image correction system whereby:
(i) a multiplicity of pixels from a distorted image are provided to a respective multiplicity of said associative memory cells;
(ii) a transformation for an output of said image to compensate for said distortion is provided; and
(iii) said transformation is executed in parallel for a plurality of said pixels via said register array.

28. The associative signal procession apparatus of claim 27, wherein said distorted image is provided by a High Definition Television (HDTV) lens.

29. Associative signal processing apparatus for processing, an incoming signal comprising a plurality of samples, the apparatus comprising:
two-dimensional array of processors each processor including a multiplicity of content addressable memory cells, each sample of an incoming signal being processed by at least one of the processors;
a register array including at least one register operative to store responders arriving from the processors and to provide communication, within a single cycle, between non-adjacent processors; and
image correction system whereby:
(i) a multiplicity of pixels from a distorted image are provided to a respective multiplicity of said content addressable memory cells;
(ii) a transformation for an output of said image to compensate for said distortion is provided; and
(iii) said transformation is executed in parallel for a plurality of said pixels via said register array.

30. The associative signal processing apparatus of claim 29, wherein said distorted image is provided by a High Definition Television (HDTV) lens.

31. Associative signal processing apparatus for processing an incoming signal comprising a plurality of samples, the apparatus comprising:
a two-dimensional array of processors, each said processor including a multiplicity of content addressable memory cells, each sample of an incoming signal being processed by at least one of said processors;
a register array including at least one register operative to store responders arriving from the processors and to provide communication, within a single cycle, between non-adjacent processors, said at least one register providing communication between processors which are processing non-adjacent samples; and
an I/O buffer register operative to input and output a signal;
wherein the processor array, the register array and the I/O buffer register are arranged on a single silicon die and wherein the I/O buffer register includes a plurality of buffer register cells whose number is at least equal to the number of processors in said two-dimensional array.

32. Associative signal processing apparatus comprising:
an array of processors, each processor including a multiplicity of associative memory cells, at least one of said processors being operative to process a plurality of samples of an incoming signal;

a register array including at least one register operative to store responders arriving from the processors and to provide communication between processors; and an I/O buffer register operative to input an incoming signal and to output an outgoing signal;

wherein the order in which the I/O buffer inputs an image differs from the row/column order of the image and wherein the word length of the I/O buffer register is increasable by decreasing the word length of the associative memory cells.

33. Associative signal processing apparatus comprising:

an array of processors, each processor including a multiplicity of associative memory cells, at least one of said processors being operative to process a plurality of samples of an incoming signal;

a register array including at least one register operative to store responders arriving from the processors and to provide communication between processors; and an I/O buffer register operative to input an incoming signal and to output an outgoing signal;

wherein the order in which the I/O buffer inputs the samples differs from the order of the samples within the incoming signal and wherein the word length of the I/O buffer register is increasable by decreasing the word length of the associative memory cells.

* * * * *

UNITED STATES PATENT AND TRADEMARK OFFICE
CERTIFICATE OF CORRECTION

PATENT NO.     : 6,460,127 B1
DATED          : October 1, 2002
INVENTOR(S)    : Akerib It is certified that error appears in the above-identified patent and that said Letters Patent is hereby corrected as shown below:

Column 68,
Line 63, the last word appears as "all" instead of -- an --

Column 70,
Line 17, the fourth word appears as "procession" instead of -- processing --
Line 23, the first word "a" was omitted
Line 31, the first word "an" was omitted.

Signed and Sealed this

Fourth Day of February, 2003

JAMES E. ROGAN
*Director of the United States Patent and Trademark Office*